United States Patent [19]
Nakamura

[11] Patent Number: 5,388,013
[45] Date of Patent: Feb. 7, 1995

[54] DATA STORAGE FORMAT CONVERSION METHOD AND SYSTEM, DATA ACCESS METHOD AND ACCESS CONTROL APPARATUS

[75] Inventor: Yoichi Nakamura, Kamakura, Japan

[73] Assignee: Mitsubishi Denki Kabushiki Kaisha, Tokyo, Japan

[21] Appl. No.: 24,724

[22] Filed: Mar. 1, 1993

[30] Foreign Application Priority Data

Mar. 6, 1992 [JP] Japan .................................. 4-049833
Jan. 22, 1993 [JP] Japan .................................. 5-009002

[51] Int. Cl.$^6$ ........................ G11B 5/09; G11B 15/18; G11B 17/00; G11B 19/02
[52] U.S. Cl. ...................................... 360/48; 360/50; 360/72.1; 360/72.2
[58] Field of Search ...................... 360/13, 39, 48, 50, 360/55, 49, 71.2, 72.2

[56] References Cited

U.S. PATENT DOCUMENTS 5,034,914 7/1991 Osterlund .............................. 360/48
5,200,864 4/1993 Dunn et al. .......................... 360/48

FOREIGN PATENT DOCUMENTS 1-306917 3/1989 Japan .
4021041 1/1992 Japan .

*Primary Examiner*—Donald Hajec
*Assistant Examiner*—T. N. Forbus, Jr.
*Attorney, Agent, or Firm*—Wolf, Greenfield & Sacks

[57] ABSTRACT

A record storage format conversion method and a system which is capable of mitigating a load imposed on the memory by decreasing the number of accesses to the memory for finding out a CKD record of concern upon format conversion of the CKD records into FBA records while allowing the capacity of a memory required for holding the track data to be decreased. All gaps inclusive of inter-record gaps and inter-field gaps are deleted from variable length records of one track recorded in a variable length format employed in an external storage device of a general-purpose computer. The track data thus obtained is divided into management units each of a predetermined size corresponding to an integral multiple of the size of the fixed length block of the fixed length record. Position information indicating the positions of all the variable length records included in the management unit as well as position information indicating relative positions of the variable length records from the start of the track in the variable length format are written, whereon the management unit is divided into fixed length record blocks each having a predetermined fixed block size for storage thereof. Each CKD record holds information indicating the relative position thereof from the start of the track of the CKD format.

13 Claims, 35 Drawing Sheets

GENERAL ARRANGEMENT OF CKD-FBA FORMAT CONVERSION

FIG. 4
(d) AFTER ADDITION OF CKD RECORD POSITION INFORMATION, ETC.
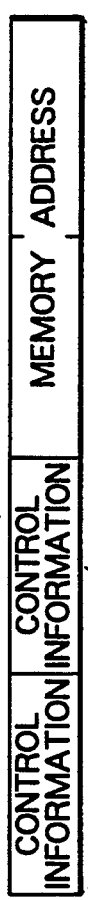
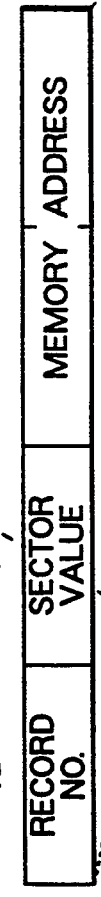

FIG. 5
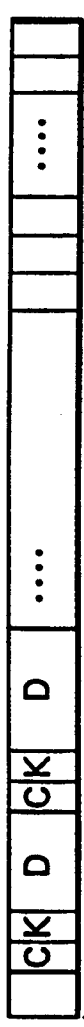
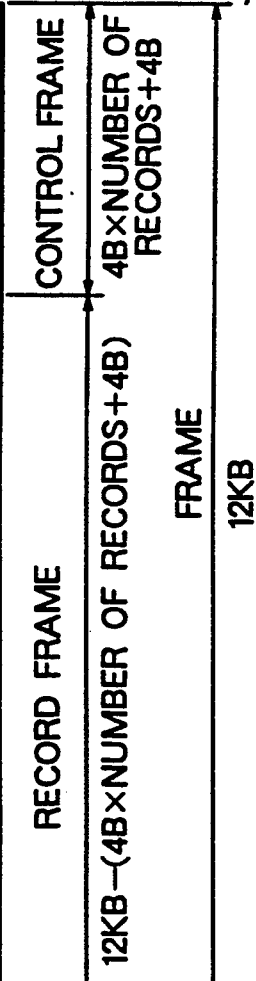
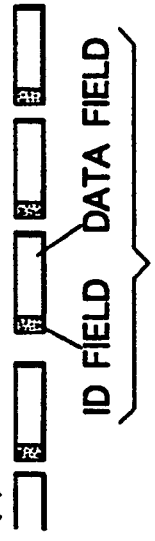
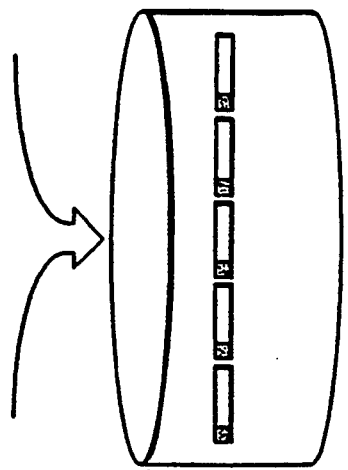
(d) AFTER ADDITION OF CKD RECORD POSITION INFORMATION, ETC.
C K | D | C K | D | ...
RECORD FRAME
CONTROL FRAME
12KB−(4B×NUMBER OF RECORDS+4B)
4B×NUMBER OF RECORDS+4B
FRAME
12KB
(e) AFTER DIVISION TO FBA BLOCK SIZE
(f) FORMAT IN FBA
ID FIELD — DATA FIELD
ONE BLOCK IN FBA
(g) FBA DISK

FIG. 6
<ORIGINAL CKD TRACK FORMAT>
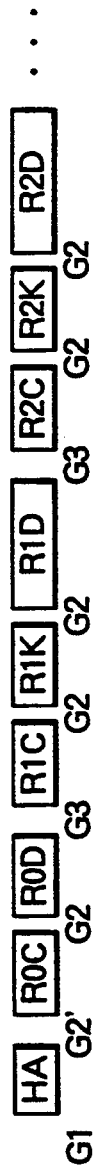
<CASE I-1>
<CASE I-2>
<CASE I-3>
METHOD OF LEAVING GAPS

FIG. 8
<CASE III-1>
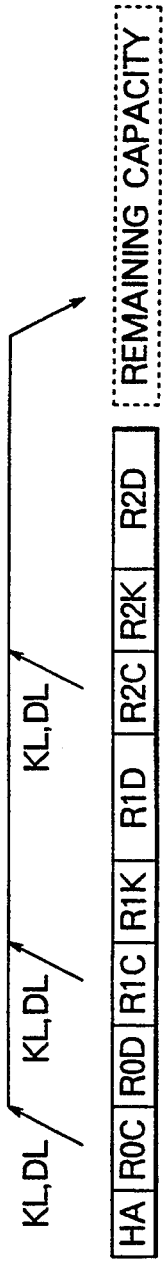
<CASE III-2>
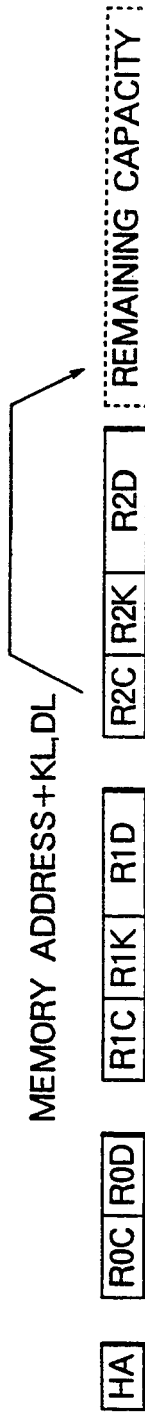
<CASE III-3>
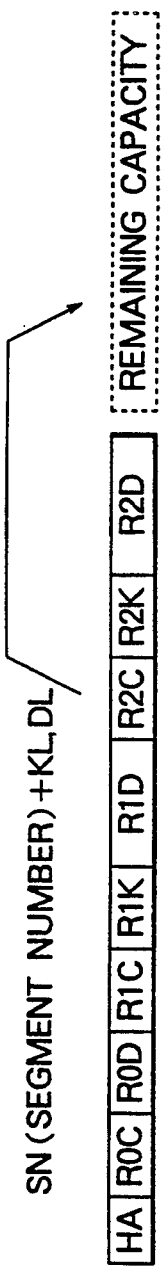
CHECK METHOD OF TRACK CAPACITY

FIG. 9

TABLE OF COMPARISON OF CKD-TO-FBA CONVERSION METHODS

| METHOD OF LEAVING GAPS | | METHOD NO. | RECORD POSITION DETERMINING METHOD | | | CHECK METHOD OF TRACK CAPACITY | | | ITEMS FOR COMPARISON | | | | GRADES OF ITEMS FOR COMPARISON |
|---|---|---|---|---|---|---|---|---|---|---|---|---|---|
| | | | CASE II-1 SEQUENTIAL READ OUT OF ALL RECORDS | CASE II-2 RETENTION OF POSITION INFORMATION OF FIRST RECORD IN FBA BLOCK | CASE II-3 RETENTION OF POSITION INFORMATION OF ALL RECORDS | CASE III-1 SEQUENTIAL READ OUT OF ALL RECORDS | CASE III-2 MAINTENANCE OF RELATIVE POSITION INFORMATION OF RECORDS IN CKD FORMAT EVEN ON MEMORY | CASE III-3 RETENTION OF RELATIVE POSITION INFORMATION OF RECORDS IN CKD FORMAT | a. 3 MEMORY CAPACITY | b. 2 EASINESS OF DATA TRANSFER | c. 5 PROCEDURE FOR FINDING AIMED RECORD | d. 4 FORMAT WRITE PROCEDURE | TOTAL SCORE |
| CASE I-1 DELETION OF ALL GAPS | | <1,1,1> | ○ | | | ○ | | | 5 | 5 | 1 | 1 | 34 |
| | | <1,2,3> | | ○ | | | | ○ | 4 | 3 | 3 | 4 | 49 |
| | | <1,3,3> | | | ○ | | | ○ | 3 | 3 | 5 | 4 | *56 |
| CASE I-2 DELETION OF ONLY INTER-FIELD GAPS, WHILE INTER-RECORD GAPS BEING LEFT | | <2,1,1> | ○ | | | ○ | | | 3 | 5 | 1 | 1 | 28 |
| | | <2,2,2> | | ○ | | | ○ | | 2 | 3 | 4 | 5 | *52 |
| | | <2,2,3> | | ○ | | | | ○ | 2 | 3 | 3 | 4 | 43 |
| | | <2,3,2> | | | ○ | | ○ | | 1 | 3 | 5 | 5 | *54 |
| | | <2,3,3> | | | ○ | | | ○ | 2 | 3 | 5 | 4 | *53 |
| CASE I-3 RETENTION OF BOTH INTER-RECORD GAPS AND INTER-FIELD GAPS | | <3,1,1> | ○ | | | ○ | | | 2 | 2 | 1 | 1 | 19 |
| | | <3,2,2> | | ○ | | | ○ | | 2 | 1 | 4 | 5 | 48 |
| | | <3,2,3> | | ○ | | | | ○ | 2 | 1 | 3 | 4 | 39 |
| | | <3,3,2> | | | ○ | | ○ | | 1 | 1 | 5 | 5 | *50 |
| | | <3,3,3> | | | ○ | | | ○ | 2 | 1 | 5 | 4 | 49 |

DIVISION OF CKD TRACK IN RAID

FIG. 12

ESTIMATION OF MEMORY CAPACITY

| CASES OF ESTIMATION | RECORD SIZE (R0) | | RECORD SIZE (Rn) | | NUMBER OF RECORDS/TRACK R0 Rn | REMARKS |
|---|---|---|---|---|---|---|
| | KL | DL | KL | DL | | |
| FORMAT 1 | 0B | 1B | 0B | 1B | 1+93 | CASE OF GREATEST NUMBER OF RECORDS |
| FORMAT 2 | 0B | 8B | 0B | 200B | 1+68 | TYPICAL OF JOURNAL FILE |
| FORMAT 3 | 0B | 8B | 0B | 4096B | 1+10 | PAGING,SWAPPING,VSAM |
| FORMAT 4 | 0B | 47988B | — | — | 1+0 | CASE OF SMALLEST NUMBER OF RECORDS |

FIG. 13

● FORMAT 1 (CASE OF GREATEST NUMBER OF RECORDS)
R0 : KL=0 , DL=1
Rn : KL=0 , DL=1

SIZE OF R0 = G2C + R0C + G2 + R0D
= 248 + 40 + 224 + 32
= 544 (BYTE)

SIZE OF Rn = G3 + RnC + G2 + RnD
= 216 + 40 + 224 + 32
= 512 (BYTE)

SINCE TRACK CAPACITY SUCCEEDING TO HA IS 48512 BYTES AS SHOWN, THE NUMBER OF RECORDS OF Rn IS GIVEN BY FOLLOWING EXPRESSION : (QUOTIENT IS ROUNDED)

$$\text{NUMBER OF RECORDS OF Rn} = \frac{48512 - \text{SIZE OF R0}}{\text{SIZE OF Rn}}$$

$$= \frac{48512 - 544}{512} = 93$$

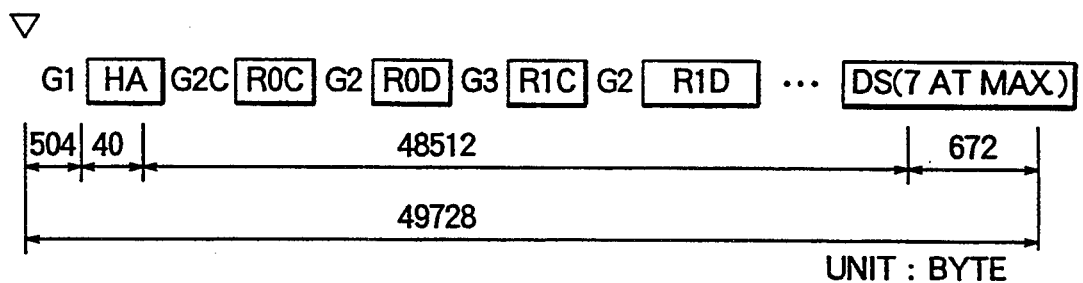

TRACK FORMAT

FIG. 14

- FORMAT 2 (TYPICAL OF JOURNAL FILE)
R0 : KL=0 , DL=8
Rn : KL=0 , DL=200

SIZE OF R0 = G2C + R0C + G2 + R0D
= 248 + 40 + 224 + 32
= 544 (BYTE)

SIZE OF Rn = G3 + RnC + G2 + RnD
= 216 + 40 + 224 + 224
= 704 (BYTE)

SINCE TRACK CAPACITY SUCCEEDING TO HA IS 48512 BYTES AS SHOWN IN FIG.13, THE NUMBER OF RECORDS OF Rn IS GIVEN BY FOLLOWING EXPRESSION (QUOTIENT IS ROUNDED):

$$\text{NUMBER OF RECORDS OF Rn} = \frac{48512 - \text{SIZE OF R0}}{\text{SIZE OF Rn}}$$

$$= \frac{48512 - 544}{704} = 68$$

FIG. 15

● FORMAT 3 (PAGING, SWAPPING, VSAM)
R0 : KL=0, DL=8
Rn : KL=0, DL=4096

SIZE OF R0 = G2C + R0C + G2 + R0D
 = 248 + 40 + 224 + 32
 = 544 (BYTE)

SIZE OF Rn = G3 + RnC + G2 + RnD
 = 216 + 40 + 224 + 4128
 = 4608 (BYTE)

SINCE TRACK CAPACITY SUCCEEDING TO HA IS 48512 BYTES AS SHOWN IN FIG.13, THE NUMBER OF RECORDS OF Rn IS GIVEN BY FOLLOWING EXPRESSION (QUOTIENT IS ROUNDED):

$$\text{NUMBER OF RECORDS OF Rn} = \frac{48512 - \text{SIZE OF R0}}{\text{SIZE OF Rn}} = \frac{48512 - 544}{4608} = 10$$

FIG. 16

- FORMAT 4 (CASE OF MINIMUM NUMBER OF RECORDS)
  R0 : KL=0 , DL=47988
  Rn : NONE

IN THIS CASE, VALUE OF DL OF R0 CAN BE DETEMINED AS FOLLOWS. AS SHOWN IN FIG.13, THE NUMBER OF BYTES CAPABLE OF USE AS DATA FIELD OF R0 IS :
$$48512 - G2C - R0C - G2 =$$
$$48512 - 248 - 40 - 224 = 48000$$
OF 48000 BYTES, 12 BYTES ARE OCCUPIED BY ECC AND SPACE (X',FF'). ACCORDINGLY, MAXIMUM VALUE OF R0D CAPABLE OF USE AS DATA IS :
$$48000 - 12 = 47988$$

FIG. 17

ESTIMATION OF MEMORY CAPACITY

|  | FORMAT 1<br>GREATEST NUMBER OF RECORDS | FORMAT 2<br>RnD=200B | FORMAT 3<br>RnD=4096B | FORMAT 4<br>SMALLEST NUMBER OF RECORDS |
|---|---|---|---|---|
| <CASE 1-1> DELETION OF ALL GAPS | 2754 | 15568 | 41304 | 48044 |
| <CASE 1-2> DELETION ONLY OF INTER-FIELD GAPS | 23594 | 31008 | 44216 | 48796 |
| <CASE 1-3> RETENTION OF ALL GAPS | 44650 | 46464 | 46680 | 49020 |

PROFIT OBTAINED BY DECREASING IMAGE DATA BY ONE TRACK

FIG. 20

| 1 BYTE | 1 BYTE | 2 BYTES |
|---|---|---|
| RECORD NUMBER | SECTOR VALUE | MEMORY ADDRESS |

INFORMATION HELD PER ONE RECORD

FIG. 21

CASE OF MANAGEMENT UNIT OF POSITION INFORMATION

|  | MANAGEMENT UNIT FOR POSITION INFORMATION | SIZE |
|---|---|---|
| MANAGEMENT UNIT 1 | FBA BLOCK (SECTOR) | 2 KB |
| MANAGEMENT UNIT 2 | UNIT FOR DIVISION TO DATA DISK (1/4 TRACK) | 12 KB |

FIG. 22

ESTIMATION OF MEMORY CAPACITY FOR POSITION INFORMATION

|  | SIZE OF MANAGEMENT UNIT | RECORD POSITION DETERMINING METHOD | NUMBER OF RECORDS IN MANAGEMENT UNIT | POSITION INFORMATION PER MANAGEMENT UNIT | POSITION INFORMATION PER TRACK |
|---|---|---|---|---|---|
| MANAGEMENT UNIT 1 | 2KB | <CASE II-2> | 70 AT MAX | 4B | 96B |
| | | <CASE II-3> | 62 AT MAX | 248B | 5952B |
| MANAGEMENT UNIT 2 | 12KB | <CASE II-2> | 94 AT MAX | 4B | 16B |
| | | <CASE II-3> | 94 AT MAX | 376B | 1504B |

MAXIMUM MEMORY CAPACITY REQUIRED FOR RECORDS

| METHOD OF DELETING GAPS | FORMAT 4 |
|---|---|
| | SMALLEST NUMBER OF RECORDS |
| <CASE I-1> DELETION OF ALL GAPS | 48044B |
| <CASE I-2> DELETION OF ONLY INTER-FIELD GAPS | 48796B |
| <CASE I-3> RETENTION OF ALL GAPS | 49020B |

METHOD OF HOLDING POSITION INFORMATION IN PRECEDING HFL (HFL-BDH01417-02)

IMPROVED RECORD POSITION DETERMINING METHOD <CASE II-3>

FIG. 27

ESTIMATION OF MEMORY CAPACITY FOR POSITION INFORMATION

| | SIZE OF MANAGEMENT UNIT | RECORD POSITION DETERMINING METHOD | NUMBER OF RECORDS WITHIN MANAGEMENT UNIT | POSITION INFORMATION PER MANAGEMENT UNIT | POSITION INFORMATION PER TRACK |
|---|---|---|---|---|---|
| MANAGEMENT UNIT 2 | 12KB | <CASE II-2> | 94 AT MAX | 4B | 16B |
| | | <CASE II-3> | 94 AT MAX | 376B | 1504B |
| | | <IMPROVED II-3> CASE | 94 AT MAX | 380B | 380B |

FIG. 28

MAXIMUM MEMORY CAPACITY REQUIRED FOR RECORDS

| METHOD OF DELETING GAPS | FORMAT 4 |
|---|---|
| | SMALLEST NUMBER OF RECORDS |
| <CASE I-1> DELETION OF ALL GAPS | 48044B |
| <CASE I-2> DELETION OF ONLY INTER-FIELD GAPS | 48796B |
| <CASE I-3> RETENTION OF ALL GAPS | 49020B |

[NOTE] ASN : ABSOLUTE SEGMENT NUMBER

SEGMENT NUMBER

FIG. 30
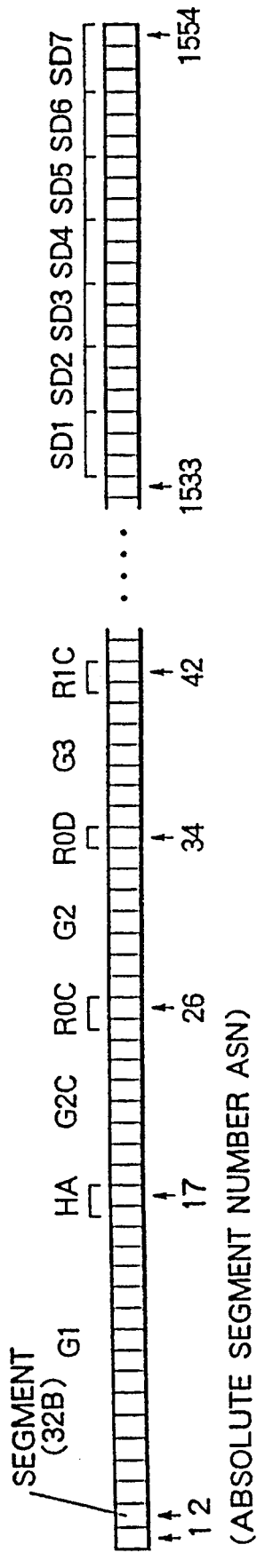
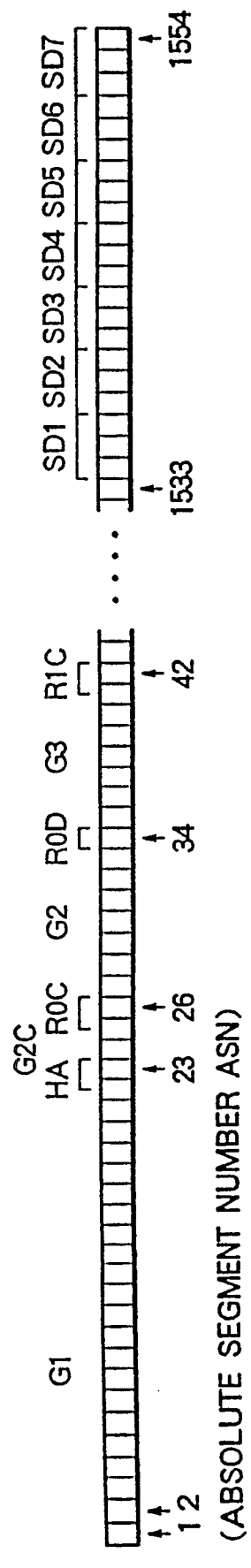
(a) WHEN HA IS NOT MOVED
(ABSOLUTE SEGMENT NUMBER ASN)
(b) WHEN HA IS MOVED
(ABSOLUTE SEGMENT NUMBER ASN)
FORMAT IMAGE ON VIRTUAL CKD TRACK

FIG. 31

MAXIMUM NUMBER OF BYTES DELETED PER FIELD

| G1 | HA | G2C | R0C | G2 | R0D | G3 | RnC | G2 | RnK | G2 | RnD |
|---|---|---|---|---|---|---|---|---|---|---|---|
| 504 | 12 | 248 | 26 | 224 | 24 | 216 | 26 | 224 | 31 | 224 | 31 |
| | TOTAL 1038 | | | | | | TOTAL 752 | | | | |

(a)

SET SECTOR

SEARCH ID

TRANSFER IN CHANNEL (TIC)

READ DATA / WRITE DATA (b)

DATA STORAGE FORMAT CONVERSION METHOD AND SYSTEM, DATA ACCESS METHOD AND ACCESS CONTROL APPARATUS

BACKGROUND OF THE INVENTION

1. Field of the Invention

The present invention relates to data storage format conversion method and a system for converting data stored in a variable length record format adopted in a magnetic disk system of a general-purpose computer into data of a fixed length format which is adopted in a commercially available miniature type magnetic disk device. The invention also relates to a data access method for making accessing the data which have undergone the format conversion and an apparatus for controlling the access to the data.

2. Description of the Related Art

Heretofore, as an external data storage device for a general-purpose (or universal-purpose) computer system, a fixed disk drive system of a variable length record format type (also known as the count key data type or CKD-type in abbreviation) was widely used. With the term "variable length record format type disk or CKD-type disk", it is intended to mean a magnetic disk which is formatted in such a manner that the length as well as the number of physical records to be recorded on one track of the magnetic disk is variable.

In general, in the magnetic disk of the variable length record format type, any given one of the tracks on the disk begins with an index mark, in succession to which there are provided firstly a home address (HA) area and then a record-zero (R0) area, as is shown in FIG. 33. The area HA R0 are dedicated for storing in addition to the address information such as a cylinder address and a head address for that track such information as the locations of magnetic defects on the track, defectiveness of the track as a whole and control information such as an address of a candidate track which is reserved for replacing the defective track. These areas HA and R0 have to necessarily be provided.

On the other hand, record areas R1 et seq. which are provided in succession to the areas HA and R0 are used for recording the ordinary data. These record areas can arbitrarily be formatted for use by a software running on a host computer so long as an overall amount of any given number of records of variable lengths can fall within the available recording capacity of the track. Each of the data record areas (R1) includes three fields. They are a count field (COUNT), a key field (KEY) and a data field (DATA). From the capitals "C", "K" and "D" of the names of these fields, this format is also referred to as the CKD-type format.

The count field (COUNT) has a fixed length and is adapted to store not only the address information such as the cylinder address (CC), head address (HA), record ID number (R), etc. but also such control information as a key field length (also referred to as KL in abbreviation), a data field length (DL), etc. of the relevant record for the purpose of allowing lengths of the succeeding key field and the data field to be arbitrarily altered or varied. The key field and the data field are destined for recording the intrinsic data of relevant record. However, unless the key field for recording the key of the associated record is required, it is also possible to create a record in which no key field is present. In that case, the key field length or KL may simply be set to zero (i.e., KL=0).

Provided between the record fields such as the fields HA, R0, R1, R2 and so forth are inter-record gaps G1, G2, and G3, each having an appropriate size, wherein there is recorded in each of the gaps (G3) which precede to the records R1, R2, etc., respectively, a specific magnetic mark termed "address mark (AM)" so that the beginning of a record of concern can be identified by detecting this address mark (AM), regardless of the location on the track where the read operation is started.

Furthermore, in each of the records, there are provided the inter-field gaps (G2) for the purpose of identifying discriminatively the individual fields within the record.

In contrast, in the case of an external data storage system for a computer system of a relatively small scale such as mini-computers, office computers, personal computers, work stations and the like, there is employed a fixed magnetic disk device of a fixed length record type (also known as the magnetic disk system of a fixed block architecture type or FBA-type in abbreviation). In case of the fixed length record type or FBA-type disk, one record (often referred to as the sector in the field of the FBA-type disk drive system) is ordinarily composed of an ID field for storing address information and a data field for storing intrinsic data, wherein the length of any field is fixedly or invariably determined previously. Consequently, the number of records (or the number of sectors) per track is also fixed, i.e., invariable.

Heretofore, the magnetic disk of the variable length record (CKD) type and that of the fixed length record (FBA) type have been used separately or distinctively in dependence on the computer systems for which the use of the magnetic disks mentioned above are destined. In general, the fixed length record type magnetic disk destined for use in the small scale computers has been limited not only in the storage capacity but also in the data transfer rate, the seek speed and other performances when compared with the variable length record (CKD) type magnetic disk. In recent years, however, there arises a great demand for implementation of the variable length record (CKD) type magnetic disk in a miniature size. On the other hand, remarkable progress has been made in implementation of the fixed length record (FBA) type magnetic disk having a large capacity while enjoying a high data transfer rate as well as a high seek speed. Under the circumstances, differences in the specifications between the CKD type disk and the FBA type disk become lessened more and more.

In respect to the manufacture efficiency on a mass-production basis and hence the cost as involved, the variable length record (CKD) type magnetic disk is inferior to the fixed length record type disk which can find extensive applications in various computers inclusive of the personal computers, the office computers and so forth, because the former is limited to the use only for the general-purpose computer systems. Under the circumstances, the fixed length record type magnetic disk is comparatively high in price, and thus the difference in the cost/performance ratio between the CKD type magnetic disk and the FBA type disk is increasing more and more. Consequently, there arises a strong demand for the availability of the less expensive fixed length record type magnetic disk of a high cost/p- erformance ratio even in the general-purpose computer system.

In the CKD type fixed disk system, there has been adopted such a servo-plane servo system in which a servo plane (or surface) for recording servo control information to be used for positioning a magnetic head is provided separately from the data surface area destined for recording the data. With this system, the head positioning accuracy is determined in dependence on the accuracy of the mechanical or physical positions of the data areas and the servo information area. In an effort to avoid this inconvenience and to increase the track recording density, there has been proposed and developed for practical applications a data-area servo system in which the servo control information is written in the ID field of the data area. In the case where the data-area servo system is adopted, however, another problem is encountered that the head positioning accuracy is degraded when compared with the fixed length record type disk system where the servo information can be obtained at a constant interval without fail, because the availability of the servo information constantly at a predetermined time interval can not be ensured in the variable length record type disk system although the latter allows the recording of even a single record on a track in an extreme case.

At present, a so-called disk array technique attracts attention, according to which the data are recorded dispersely or distributively among a plurality of magnetic disks while providing a redundant disk for storing and managing the parity information and the like for the distributively stored data, to thereby enhance the performance and the reliability of the magnetic disk system as a whole, in view of the fact that limitation is unavoidably imposed on the attempt for improving the performance and the reliability on a disk-by-disk basis. However, difficulty is encountered in applying the disk array technique to the variable length record (CKD) type disk system in which the length and the number of the records are variable.

Besides, in the field of the general-purpose computer system where an enormous amount of software resources have been developed, it is very difficult to convert the variable length record format into the fixed length record format.

Under the circumstances, there has also been proposed such an access system which allows the access to the variable length (CKD) data recorded by the variable length record systems known heretofore. This accesses method will be described by reference to FIGS. 34 and 35. Referring first to FIG. 34 which illustrates schematically a magnetic disk system in which the servo-plane servo system described previously is adopted, it will be seen that a servo plane S and data areas D are provided, wherein the servo plane S is logically assigned with a plurality of sectors (which conceptually differ from the sector employed in the FBA-type disk system). FIG. 35 is a diagram for illustrating an array of the sectors. It is now assumed that one track has a storage capacity of 48 KB (kilobytes), the track is divided into a plurality of sectors each having a capacity or size of 244 bytes and that each sector is divided into seven segments S1 to S7 each of which has a size of 32 bytes. When data is recorded on a data plane D in the magnetic disk system of the configuration mentioned above, the value or the number identifying the sector in which the data has been recorded (this value is also referred to as the sector value) is stored so that the retrieval of the data can be performed with the aid of the sector value. In this case, retrieval of the data can be performed at a high speed. FIG. 36 is a flow chart showing, by way of example, an access sequence performed by a software running on a host computer when data is retrieved by using the sector value defined above. As can be seen in this figure, the software running on the host computer designates the sector in which data to be accessed is recorded by issuing a set sector command "SET SECTOR". In response to this set sector command, the magnetic disk system is disconnected from the host computer and the magnetic disk controller and then searches autonomously the designated sector. Upon finding of the designated sector, the magnetic disk system issues a connection request to the host computer via the magnetic disk controller, whereby the connection between the magnetic disk system and the host computer is reestablished. Subsequently, a search ID (identifier) command is issued by the software, whereby ID information of the data to be searched is sent to the magnetic disk system. The ID information includes, for example, a cylinder ID number, a track ID number and a record ID number of the record to be searched. Upon reception of this search ID command, the magnetic disk system compares the ID information as received with the ID of a record located at the start of the sector designated by the set sector command, the result of which comparison is then messaged to the host computer. Unless the comparison results in coincidence, return is made to the set sector command step from the command execution step through a succeeding transfer-in-channel (TIC) command step, whereupon the search ID command is again issued for a next or succeeding record. On the other hand, when the above-mentioned comparison results in coincidence, the host computer skips the succeeding transfer-in-channel command to issue finally a read command or a write command, whereby the read or write instruction is executed for the data as retrieved.

As is apparent from the above description, the software used in the general-purpose computers is prepared on the basis of the variable length record scheme, and thus an attempt for altering or modifying the software resources already developed will involve not a little difficulty. Such being the circumstances, there is proposed a technique which allows the magnetic disk of the variable length record type known heretofore to be used by a software running on a host computer by emulating the variable length record type scheme in the magnetic disk controller while using actually the fixed length record type disk.

An approach for the CKD-to-FBA format conversion is described in detail in Japanese Unexamined Patent Application Publication No. 30691/1989 (JP-A-1-30691) entitled "STORAGE CONTROL METHOD AND APPARATUS". Additionally, general discussion of the CKD-to-FBA format data conversion is found in an IBM publication "IBM4321/4331 PROCESSOR COMPATIBLE FUNCTION", GA33-1528, third edition, (September 1982). The CKD-to-FBA format conversion disclosed in these literatures will briefly be reviewed below.

According to the method described in the IBM publication, all the gaps are eliminated in order to compress the data or records upon conversion of data of the CKD format data to the FBA format data.

In the case of the conversion described in the IBM publication cited above, the set sector command described above in conjunction with FIG. 36 can not be used or supported. More specifically, when the set sector command is issued, no operation therefor is performed, but the record search is carried out in response to issuance of the search ID command. Although the record search can be accomplished with the aid of the search ID command only, it is noted that a lot of time is taken for finding out the record having the same ID as the one designated by the search ID command, by checking sequentially all the records, starting from the forefront or leading one in the track. Accordingly, the record search based on the search ID command is extremely disadvantages when compared with the search in which the set sector command designating the sector containing the record of concern is a prerequisite and in which the search is performed in response to the search ID command for the sectors which are located in succession to that designated by the sector set command, inclusive thereof.

On the other hand, in the case of the conversion scheme disclosed in the Unexamined Patent Application Publication mentioned above, it is proposed that (1) the inter-field gaps (G2), ECC (abbreviation of Error Checking and Correcting) codes, padding data and physical parameters are eliminated, (2) the inter-record gaps (indicated by reference numerals 131, 133, 137, 163 in FIG. 37) are left or retained, (3) the inter-record gaps are stretched or extended correspondingly for filling or compensating for the interfield gaps as eliminated so as to maintain or retain the relative positions of the count fields in the individual records relative to or from the start of the record as they are (although the relative positions of the key fields and the data fields are deviated, the position of the record of concern can be determined so long as the relative position of the count field is known), (4) the track data is divided into FBA fixed blocks (sectors) with the position information (156 in FIG. 37) of the count field in the first record contained in each fixed block being added to each fixed block to thereby permit direct and random addressing to the CKD records stored in the FBA format type magnetic disk, and (5) a corresponding mark bit is recorded in the block including no count field.

In brief, it is taught in the Publication that (1) only the inter-record gaps are left with other extra gaps being eliminated in order to maintain or retain the relative positions of the counter fields in the records, and (2) a header indicating the position of the first count field is affixed at the beginning of the FBA fixed block in which the counter field is record.

With the arrangements described above, it is possible to address directly and in random the CKD records stored in the disk formatted in the FBA scheme.

However, the hitherto known techniques described above suffer various problems and shortcomings which will be mentioned below.

In the case of the technique described in the IBM publication, the CKD-to-FBA format conversion is executed while compressing the data or records by deleting all the gaps. However, because the set sector command can not be supported, a lot of time is required for making access to the record of concern.

On the other hand, in the case of the technique disclosed in JP-A-1-30691, according to which all the inter-record gaps are deleted, the inter-field gaps are however left or retained and extended by a length corresponding to the deleted inter-record gaps. Consequently, when a large number of records each of a small size or capacity is to be handled, the memory therefor is used wastefully.

Because there is available only the information concerning the position of the leading one of the CKD records included in each FBA fixed block, search of a CKD record other than the leading one requires repetitive execution of a procedure of reading first the count field of the leading or forefront CKD record, determining the length of the leading record on the basis of the key field length (KL) and the data field length (DL) in the count field, then reading the key field length (KL) and the data field length (DL) of the succeeding record, and subsequently searching the count field of the succeeding record. Consequently, not only a lot of time is involved in the processing but also the number of accesses made to the memory increases remarkably, in particular when the track images are concentratively managed in a disk cache memory, as a result of which the performance of the system as a whole is eventually degraded.

It should further be mentioned that in the course of data transfer through or with a channel, temporary interruption of the data transfer takes place frequently, incurring degradation of the data transfer efficiency because of presence of the position information of the CKD record in every small unit of the FBA block.

SUMMARY OF THE INVENTION

In the light of the state of the art, it is an object of the present invention to provide an improved record storage format conversion method and a system therefor which can avoid the problems or disadvantages of the techniques known heretofore as mentioned above and which is capable of mitigating a load imposed on the memory by decreasing the number of accesses required to be made to the memory for finding out the CKD record of concern upon format conversion of the CKD records into the FBA records while allowing the capacity of a memory required for holding the track data to be decreased.

In view of the above and other objects which will become more apparent as description proceeds, there is provided according to an aspect of the present invention a data storage format conversion system for converting records stored in a variable length format (CKD) into records of a fixed length format (FBA) for storage thereof, in which all gaps inclusive of the inter-record gaps and the inter-field gaps are deleted from variable length records of one track recorded in a variable length format employed in an external storage device of a general-purpose computer, the track data thus obtained is divided into units for management (also referred to management units) each of which has a predetermined size corresponding to an integral multiple of the size of the fixed length block of the fixed length record, and in which position information indicating the positions of all the variable length records included in the unit for management as well as position information indicating the relative positions of the variable length records from the start of the track in the variable length format are written, and thereafter the unit for management is divided into fixed length record blocks each having a predetermined fixed block size for storage thereof.

According to a second aspect of the present invention, there is provided an apparatus for controlling the access to a memory or storage in which data created through the data storage format conversion described above are stored, with the aid of the information obtained by interpreting an access instruction of a variable length record issued by a software and created on the basis of a variable length record scheme known heretofore, to thereby make access to a record stored in the aforementioned fixed length record format, wherein the apparatus includes

- (a) read/write means for reading data from and/or writing in the storage on a management unit basis,
- (b) a memory for storing the data read from and/or written by the read/write means on a management unit basis;
- (c) input means for inputting an access instruction to a variable length record stored in the variable length format,
- (d) position calculating means for estimating roughly a position of the management unit which is considered as including therein the variable length record to be accessed on the basis of the access instruction inputted through the input means, and
- (e) record search means for reading the management unit located at the position estimated by the position calculating means from the storage into the memory through the read/write means, to thereby search the record to be accessed and designated by the access instruction inputted through the input means.

According to a further aspect of the present invention, there is provided a data storage format conversion method in which gaps are deleted from variable length records prepared in a variable length record format, whereon the records are arrayed in a frame constituting a unit for management with the information for access such as position information of the data being also arrayed within the frame, and then the frame is divided into blocks each of a fixed length for storage in a fixed length format, wherein the format conversion method includes

- (a) a gap deletion step of deleting the inter-record gaps and the inter-field gaps from a variable length format including fields which contain data, the inter-record gaps and the inter-field gaps, to thereby interconnect the fields of the individual variable length records to one another,
- (b) a record arraying step of arraying the individual variable length records interconnected in the gap deleting step in a sequential order within the frame having a predetermined size and storing within the frame the access information for making access to the individual variable length records in correspondence with the variable length records, respectively, and
- (c) a fixed-length block storing step for storing the frame by dividing it into a plurality of blocks each of a fixed length for storing the same in a fixed length format.

According to yet another aspect of the present invention, there is provided a data access method for making access to the data divided into blocks each of a fixed length or size through the aforementioned data storage format conversion method in response to an access instruction of a variable length record scheme known heretofore, wherein the data access method includes

- (a) an access command input step of inputting commands for accessing records of a variable length format and search information for searching a record to be accessed,
- (b) a position information estimating step of estimating position information of the frame in which the record to be accessed is stored, on the basis of the search information inputted in the access command input step, and
- (c) a record search step of regenerating from a plurality of fixed length blocks stored in the fixed length format the frame succeeding to the one having the position information as estimated in the position information estimating step, to thereby search the record to be accessed.

With the arrangement of the data format conversion system according to the invention described above, the storage capacity of a magnetic disk required for storing the data can be reduced because the inter-record gaps as well as the inter-field gaps are all eliminated from the data in precedence to the storage thereof by the gap deleting means, to an advantage. Furthermore, because the record array means stores within the unit for management (management unit) the first position information indicative of the position of the variable length records and the second position information indicative of the relative positions of the records stored as the variable length records, it is possible to search the management unit for the record of concern by using the second position information indicating the relative position in the variable length record format in response to an access instruction of the variable length record scheme known heretofore, to thereby retrieve an aimed record (i.e., a record of concern) by using the first position information indicative of the position of the variable length records held within the management unit as searched. Thus, the number of accesses as required can be decreased to a minimum.

In the access control apparatus according to another aspect of the invention, the position calculation means roughly estimates the position of the management unit in the fixed length record format on the basis of the relative position information of the records which accompanies the access instruction of the variable length record scheme issued from any conventional software. Thus, the record search means can make access to the data recorded in the fixed length record format on the basis of the position information estimated by the position calculation means. In this manner, by providing the access control apparatus with the position calculation or computation means and the record search means according to the invention, the set sector command described previously in conjunction with the related art of the invention can be supported.

The data storage format conversion method according to the present invention is characterized in that after elimination of the inter-record and inter-field gaps in the gap deleting step, the individual variable length records are arrayed in a sequential order within a frame together with the access information for these records in the record arraying step, whereon the frame is divided into blocks each of a fixed length record format.

Further, according to the data access method taught by the present invention, the position information of a record of concern stored in the fixed length record format can be estimated on the basis of the search information inputted together with the access command in the position information estimating step, which is then followed by the record search or retrieving step in which the frame is searched on the basis of the position information obtained from the estimation. By virtue of this arrangement, the number of times the frames are checked for the search or the number of times the memory is accessed, to say in another way, can be decreased to a minimum, making it possible to effectuate the access operation at a high speed, to a further advantage.

The above and other objects, features and attendant advantages of the present invention will easily be understood from the following description taken in conjunction with the preferred or exemplary embodiments thereof by reference to the drawings.

BRIEF DESCRIPTION OF THE DRAWINGS

FIG. 4 is diagram for illustrating operation involved in the format conversion according to the present invention;

FIG. 5 is diagram for illustrating operation involved in the format conversion according to the present invention;

FIG. 6 is a diagram for illustrating a method of leaving or retaining gaps;

FIG. 8 is a diagram for explaining a method of checking the capacity of a track;

FIG. 9 is a view showing a table listing results of comparisons of various types of CKD-to-FBA format conversions;

FIG. 12 is a diagram for explaining estimation of a memory capacity;

FIG. 13 is a diagram showing a number of records per track;

FIG. 14 is a diagram showing a number of records per track;

FIG. 15 is a diagram showing a number of records per track;

FIG. 16 is a diagram showing a number of records per track;

FIG. 17 is a diagram for explaining estimation of a memory capacity;

FIG. 20 is a diagram showing record pointer holding information;

FIG. 21 is a diagram showing a unit for management of position information;

FIG. 22 is a diagram for explaining a method of estimating a memory capacity for the position information;

FIG. 27 is a diagram for explaining estimation of a memory capacity for the position information;

FIG. 28 is a diagram for explaining a maximum memory capacity which is required for records;

FIG. 30 is a view showing a format image on a virtual CKD track;

FIG. 31 is a view showing a maximum number of bytes deleted per field;

DESCRIPTION OF THE PREFERRED EMBODIMENTS

Now, the present invention will be described in detail in conjunction with the preferred or exemplary embodiments thereof by reference to the drawings.

EMBODIMENT 1

Figure 1:
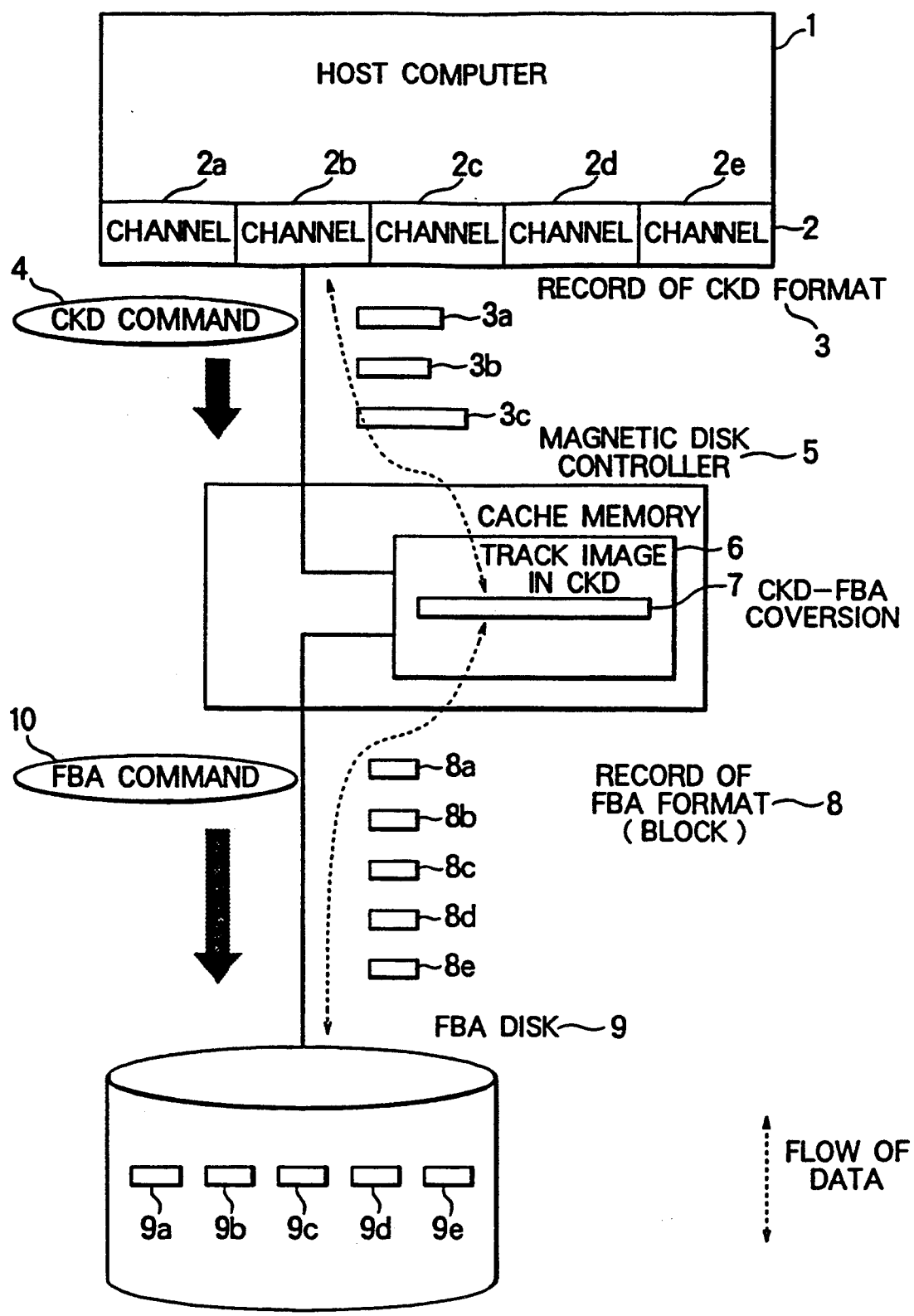
FIG. 1 is a schematic block diagram showing a general arrangement of a format conversion system according to a first embodiment of the present invention.

FIG. 1 is a schematic block diagram showing a general arrangement of a format conversion system according to a first embodiment of the present invention. Referring to the figure, a host computer 1 has a channel system denoted collectively by a reference numeral 2. The channel system 2 includes a plurality of channels 2a to 2e, wherein there is connected to one of these channels, e.g., the channel 2b a magnetic disk controller 5 which incorporates a cache memory 6. The magnetic disk controller 5 performs data transactions, i.e., data read/write operations with a magnetic disk of a fixed byte architecture type (or FBA type in abbreviation) through the medium of the cache memory 6. The FBA-type magnetic disk 9 has blocks 9a to 9e each of a fixed block size or a fixed length. Data on the FBA-type magnetic disk 9 are thus adapted to be read out or written on a block-by-block basis.

At first, description will briefly be made of the principle underlying the CKD-to-FBA format conversion (i.e., variable length to fixed-length format conversion). It is assumed that a software is running on the host computer 1 for making access to data recorded in a CKD (Count Key Data) or variable-length format. To this end, a CKD command 4 is issued from the software to the magnetic disk controller 5 via the channel 2b. It is assumed, by way of example, that the CKD command 4 is a write command, and that records 3 of the CKD format are outputted in the form of variable-length records 3a, 3b and 3c. Then, the magnetic disk controller 5 stores these variable-length records 3a, 3b and 3d in the cache memory 6. In that case, a track image 7 in the CKD or variable length format is reconstituted on the cache memory 6. More specifically, the CKD track image 7 is constituted by an array of the variable-length records 3a, 3b and 3c disposed sequentially in this order from the start or forefront of the track. According to the hitherto known method, the inter-field gaps as well as the inter-record gaps have been generated and added or inserted into the track image. On the contrary, according to the teachings of the invention incarnated in the instant embodiment, these gaps are all removed. The magnetic disk controller 5 converts the CKD track image 7 formed on the cache memory 6 to a record 8 of the FBA format (fixed length or fixed byte architecture format). This record of the FBA format is composed of blocks 8a to 8e each of a fixed length. When this record 8 of the FBA format is to be written on the FBA type magnetic disk 9, the magnetic disk controller 5 outputs a FBA write command 10. The blocks 8a to 8e are then recorded as blocks 9a to 9e, respectively, on the FBA type magnetic disk 9.

Figure 2:
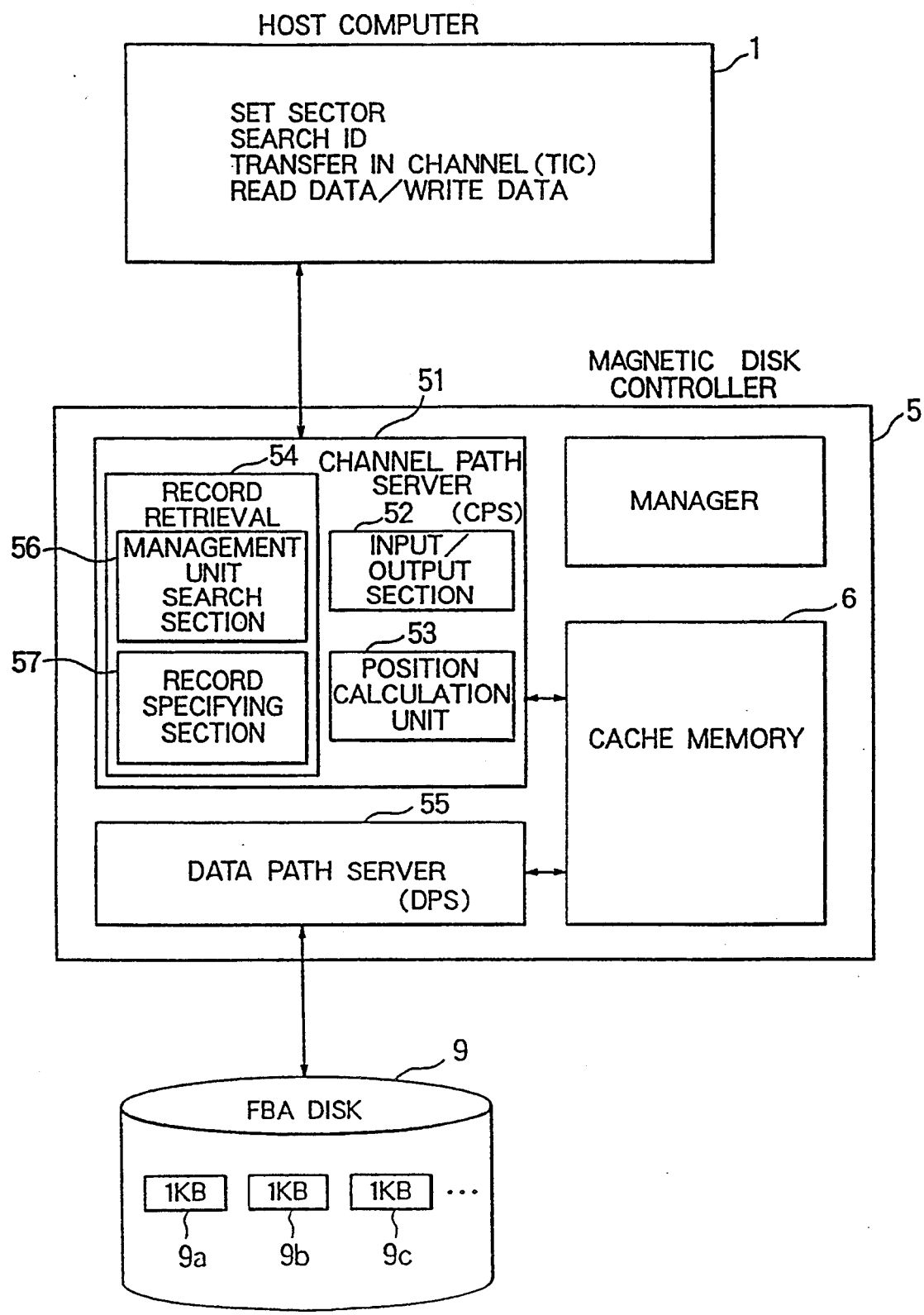
FIG. 2 is a block diagram for explaining in more detail the concept of the format conversion according to the present invention.

FIG. 2 is a block diagram for explaining in more detail the concept of the CKD-to-FBA format conversion briefed above. In this figure, a host computer 1, a magnetic disk controller 5, a cache memory 6 and a FBA type magnetic disk 9 are same as those described above in conjunction with FIG. 1. Accordingly, repeated description of these components will be unnecessary. The following description will be directed to details of operation of the magnetic disk controller 5 by reference to FIGS. 3, 4 and 5.

Figure 3:
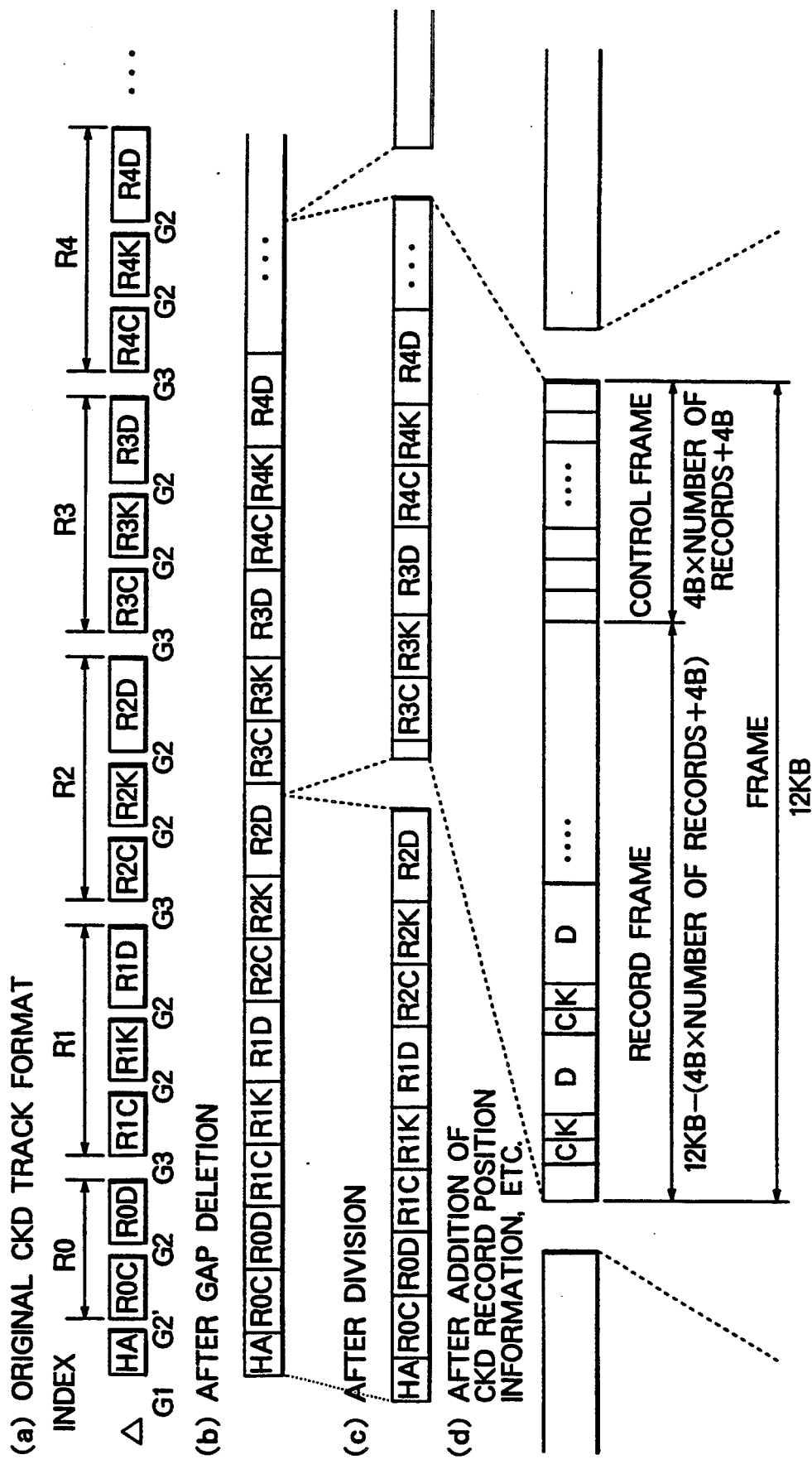
FIG. 3 is diagram for illustrating operation involved in the format conversion according to the present invention.

FIG. 3, 4 and 5 are diagrams for illustrating a record storage format conversion scheme. Initially, all gaps G1, G2 and G3 including the inter-record gap, the inter-field gap and so forth are eliminated from original records or data of the CKD format shown in FIG. 3 at (a), in such a manner as illustrated in FIG. 3 at (b).

Next, one track data of the CKD records, for example of 48 KB (kilo bytes) undergoes the gap elimination processing as shown in FIG. 3 at (b) and is divided into units for management (also referred to as management unit(s) for convenience of description), each of which has a size equivalent to an integral multiple of the fixed block length or size of the FBA record (i.e., integral multiple of one record) so that each management unit is realized, for example, with 12 KB or less inclusive of the control information mentioned below, as is shown in FIG. 3 at (c).

Subsequently, for each of the units for management shown in FIG. 3 at (c), the control information indicating the positions of all the CKD records contained in each management unit is written in a sequential order, starting from the rearmost end of the management unit, as can be seen from FIG. 3 at (d) and FIG. 4 at (d).

In conjunction with FIG. 4 at (d), it should be noted that by making variable the size of the position information to be stored within the recorded management unit, there arises the necessity of securing previously some location for storing the position information in such a manner that the storage capacity for the position information can be reduced as a whole.

In other words, because the variable-length records are sequentially written from the forefront of the management unit, while the position information is arrayed sequentially, starting from the rearmost end of the management unit, the number of the position information coincides with that of the variable-length records as a result of both the variable-length records and the position information can be accommodated within the management unit sequentially in the opposite directions, respectively, until the storage areas of the variable-length records and the position information, respectively, collide against each other. In this manner, such storage control can be realized that the area used for storing the position information is limited to a size corresponding to only the number of the records actually placed within the management unit.

However, when the size of the position information storage area is made variable, controls involved in the data transfer and the format write operation are likely to become difficult. Accordingly, as an attempt to cope with this problem, there is proposed a scheme mentioned below according to an aspect of the present invention.

In the following description made with reference to FIG. 4 at (d), the unit for management for the record position information will be referred to as a frame, the region or area in which the CKD records are actually held will be termed a record frame, the area or region for recording the control information will be called a control frame and the record position information will be referred to as a record pointer, for convenience of elucidation only.

The number of the record pointers which can be used is limited to the number of the records actually stored. Consequently, the size of the record pointer storage area is calculated to be 376 bytes = 4 bytes × 94 for each of the CKD tracks at maximum, on the assumption that the size of the unit for management is 12 KB, and that the number of the CKD records each requiring the position information of 4 bytes is 94 at maximum.

The position information of 4 bytes is shown as the record pointers in FIG. 4 at (d), wherein each record pointer is composed of a record ID number of 1 byte, a sector value of 1 byte and a memory address of 2 bytes, respectively. Parenthetically, the record ID number represents the identification number of the variable-length record as stored. The memory address represents an intra-frame address of the record stored within the frame. The sector value is utilized for comparison with a sector value designated by a set sector command (SET SECTOR Command), which will be described later on. Similarly, the record ID number is utilized for comparison with a record number designated by a search identification or ID command. The memory address indicates an address of an actual record stored within the record frame. In response to the set sector (SET SECTOR) command and the search ID command, the sector value of the record pointer and the record ID number are compared with each other, wherein when coincidence results from the comparison, the record is read out by using the above-mentioned memory address information.

At this juncture, it should be mentioned that the size of the control frame inclusive of the record pointer is also held as one of the control information, i.e., as a control frame pointer. Owing to this control frame pointer information, the control involved in the data transfer and other operations or processings can be simplified notwithstanding of the fact that the size of the control frame is variable.

The control frame pointer which is destined to serve as the control information, as mentioned above, is recorded at the rearmost end of the frame rather than at the start or forefront thereof. Further, the record pointers within the control frame are sequentially arrayed in the direction from the rearmost end toward the forefront of the frame. More specifically, for those actual records which are located more closely to the forefront of the record frame, the corresponding record pointers are located more rearwardly within the control frame, i.e., more closely to the rearmost end of the control frame. By virtue of such dispositions or arrays of the records and the record pointers, respectively, difficulty otherwise encountered upon format write operation can be avoided satisfactorily.

After the addition of the position information and others of the CKD records, as shown in FIG. 4 at (d), the record frame of 12 KB is divided into blocks each having the block size of the FBA format, e.g., 1024 bytes (1 KB) in such a manner as illustrated in FIG. 5 at (e). Subsequently, an ID field is provided in the data field of each record, as shown in FIG. 5 at (f). Thus, there is obtained a magnetic disk formatted in the FBA record scheme, as shown in FIG. 5 at (g).

It is also taught according to the present invention that the information which indicates a relative position of each of the records relative to or from the forefront of the track in the CKD format, e.g. segment number, is retained for each CKD record stored within the fixed block. By virtue of this arrangement, the track capacity already consumed for the records in the CKD format can straightforwardly be derived on the basis of the information indicating the relative positions of the records included in the frame, so far as the positions of these records can be known.

Turning back to FIG. 2, description will now be directed to operation of the magnetic disk controller 5. As is seen in the figure, the magnetic disk controller 5 includes a channel path server (hereinafter also referred to as CPS in abbreviation) which is adapted to serve for the data format conversion and the data transfer between the host computer 1 and the FBA magnetic disk 9. The channel path server or CPS includes an input-/output unit 52 which serves for receiving the commands and the data from the host computer 1 and for outputting the data from the FBA magnetic disk 9 to the host computer 1. Upon reception of an access command to a variable-length record from a program or software running on the host computer 1 through the input/output unit 52, a position calculation or arithmetic unit 53 incorporated in the CPS 51 arithmetically determines the position of the unit for management which is expected to store the variable-length record on the basis of the sector value designated, for example, by the set sector command. In this conjunction, it should be recalled that the data are recorded on the FBA magnetic disk 9 in a forwardly packed state because of deletion of all the gaps when compared with the state in which the data are recorded on the CKD magnetic disk 10. Accordingly, the position calculation unit 53 determines through estimation the management unit which is considered as storing the variable-length record to be accessed. A record search unit 54 also incorporated in the CPS 51 searches the management unit on the basis of the position thereof as arithmetically determined by the position calculation unit 53 to thereby fetch and place it in the cache memory 6, for allowing the record of concern to be retrieved. A management unit retrieval section 56 which constitutes a part of the record search unit 54 then compares the relative position information (sector value) of the record to be accessed with the relative position information (sector value) held by the retrieved management unit. In this way, the units for management existing on the FBA disk 9 are sequentially fetched into the cache memory until the relative position information of the record to be accessed has been detected. A record specifying section 57 also included in the record retrieval unit 54 responds to the retrieval of the aimed management unit by the management unit retrieval section 56 to thereby specify (or identify discriminatively) the variable-length record of concern by making use of the address information contained in the relevant management unit. Execution of the data transfer between the FBA disk 9 and the cache memory 6 in response to the FBA command is performed by a data path server (also referred to simply as DPS) 55. A manager serves for the management of the cache memory 6 and the magnetic disk controller 5 as a whole.

In carrying out the CKD-to-FBA format conversion, three important points mentioned below will have to be considered. They are:

I. Which portion of the CKD track format is to be left or retained and which portion thereof is to be deleted?

II. In what manner can the positions of the original records be found or searched after the above-mentioned processing of the track format?

III. How can the CKD track capacity be checked or in what manner should the detection of occurrence of a track overrun be performed?

When the three points mentioned above are taken into consideration, there can be conceived numerous variations of modes, which will be discussed below sequentially point by point.

In the first place, with regard to the point I, it is of no use to generate by the magnetic disk controller (DKC) such information as ECC (Error Checking and Correcting) information, padding data or the like which has inherently been added at the side of the magnetic disk apparatus. Accordingly, the question "which portion is to be left and which portion is to be deleted?" virtually means "which of the gaps is to be left and which of the gaps is to be deleted?". In this conjunction, the control information managed by the magnetic disk controller (DKC) such as defect information exclusive of the ECC and the padding data as well as physical parameters may be considered as being included within the gaps.

Concerning the method of leaving the gaps, there can be conceived various methods inclusive of methods known heretofore (see FIG. 6), which will be mentioned below.

Method <Case I-1>: A method disclosed in the previously mentioned literature "IBM 4321/4331 Processor Compatible Functions", according to which all the gaps inclusive of the inter-record gaps are deleted.

Method <Case I-2>: A known method according to which the inter-field gaps are eliminated with the inter-record gaps being left or retained.

Method <Case I-3>: A method according to which not only the inter-record gaps but also all the inter-field gaps are left (with the ECC and the padding data being eliminated).

Each of the methods mentioned above is further susceptible to numerous variations in dependence on the manners in which the detail information other than the gaps is to be handled.

Figure 7:
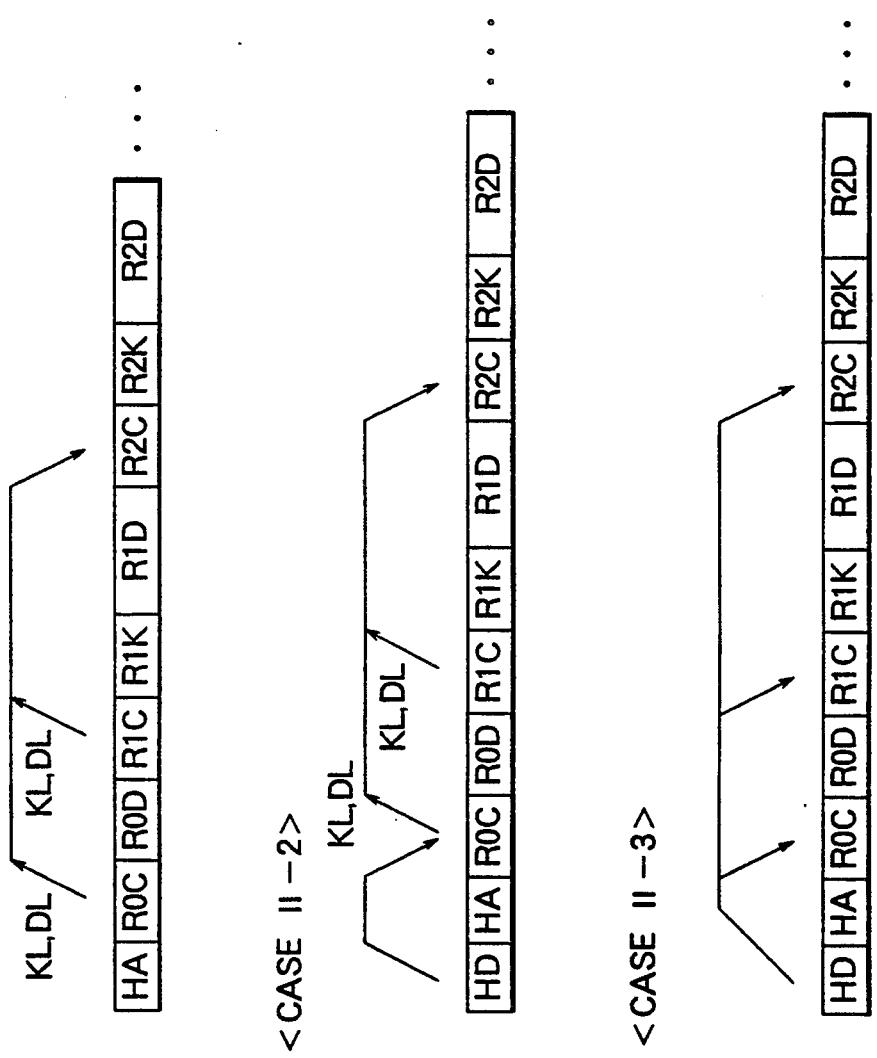
FIG. 7 is a diagram for explaining a method of determining positions of records.

Further, each of the above-mentioned methods has to be combined with some method directed to the aforementioned point II (method of finding out the record position). To this end, there may be conceived several methods inclusive of the known ones, as mentioned below (refer to FIG. 7). Of course, there do not always exist one-to-one correspondence relations between the methods <Case I-1>, <Case I-2> and <Case I-3> mentioned above and methods <Cases II-1>, <Case II-2> and <Case II-3> which are described below.

Method <Case II-1>: Any specific information indicating the record position is not provided at all. Upon searching a record of concern, the records on a track are all read out sequentially, beginning with the leading record located at the forefront of the track, wherein the position of the count field in any succeeding record is arithmetically determined on the basis of values of KL (Key field Length) and DL (Data field Length) contained in the count field of the preceding record.

Method <Case II-2>: By adopting a known method, a part of the information indicating the record position is held separately from the record itself. According to one of the methods known heretofore, the position of the count field of the record located at the forefront of each FBA block is held or retained. Those records which are located in succession to the record the position of which is indicated are sequentially read out, starting from the record whose position is known, to thereby arithmetically determine the position of the next record on the basis of the values of KL and DL of each record.

Method <Case II-3>: All information indicating the positions of the records are held separately from the records themselves. The positions of all the records are searched with the aid of the above-mentioned information. Concerning the means for holding the record position information, there may be conceived a method of holding or retaining the record position information en bloc at one place (e.g. at a starting area of a track) and a method of holding the record position information distributively or dispersedly (e.g. holding the information indicating the position of a record contained in a FBA block at the start of that block).

Method <Case II-4>: An address mark (also referred to AM in abbreviation) is generated on a logical track image obtained as a result of the CKD-to-FBA format conversion and a record of concern is searched with the aid of this address mark or AM (i.e., an AM search is performed on the memory as well). This method is however put aside from the consideration because no concrete means for generating the address mark in a satisfactory manner is available yet and because the operation of reading out all the data sequentially for effectuating the AM search on the memory will involve a significant increase in a load imposed on the memory, giving rise to degradation in efficiency.

Concerning the aforementioned point III, i.e., the check of the track capacity, there are conceived methods mentioned below (refer to FIG. 8). Some of the undermentioned methods may not apply valid in dependence on the methods <Case I-> of leaving the gaps described hereinbefore in conjunction with the point I.

Method <Case III-1>: The track capacity already consumed in the CKD format, inclusive of all the gaps and padding data (the sizes of which have definitely been determined), is computed on the basis of the values of KL and DL of all the records, beginning with the leading record on the track.

Method <Case III-2> (known method): Deletion of the ECC and padding data is compensated for or filled by stretching or extending the sizes or lengths of the remaining gaps (e.g. inter-record gap according to the known method). In this manner, the relative positions of the individual records relative to or from the forefront of the track can be maintained same as they are on the original CKD track. Thus, since the positions of the individual records can be determined, the track capacity already consumed in the CKD format can straightforwardly be determined on the basis of the addresses of the memory assigned to the records, respectively.

Method <Case III-3>: Information indicating the relative position from the start of track in the CKD format (e.g. segment number) is left or retained in each record. Accordingly, the track capacity consumed already in the CKD format can immediately be determined from the information indicating the relative position and stored in the associated record when the position of that record is known.

In FIG. 8, the aforementioned methods <Case III-1> and <Case III-3> are represented by the method <Case I-1> where all the gaps have been removed. It should however be noted that these methods can equally apply valid independent of whether the gaps are eliminated or left in any manner.

On the other hand, although the method <Case III-2> is represented by the method <Case I-2> in which only the inter-record gaps are left, the former may equally be represented by <Case I-3> where all the gaps are retained. It is however noted that, in reality, the method <Case III-2> can not basically be realized by the method <Case I-1> where all the gaps are removed because it is impossible to maintain the relative positions of the original records intactly as the memory addresses by adjusting the gap lengths.

Through combinations of the methods <Cases I-, II- and III-> (inclusive of impractical combinations or meaningless combinations as described previously), there are considered to be available several types of CKD-to-FBA format conversion schemes or methods.

At this juncture, it can be said that the known CKD-to-FBA format conversion method is based on combination of the methods <Case I-2>, <Case II-2> and <Case III-2>.

FIG. 9 is a view showing a table listing valid combinations of the aforementioned methods or cases while omitting those combinations which are impractical and meaningless.

In FIG. 9, the contents of a column labeled "ITEMS FOR COMPARISON" will be described latter on.

As the impractical combinations, there can be mentioned:

(1) Combination of the methods <Case I-1> and <Case III-2>:

In the method <Case I-1>, all the gaps are eliminated. Consequently, it is impractical to combine the method <Case I-1> with the track capacity check method <Case III-2> according to which the memory address is maintained intactly at the original relative position of the relevant record by adjusting the gap length correspondingly.

Further, the undermentioned combinations are of no use for the reasons mentioned below, although the combinations themselves are possible.

(2) Combination of the methods <Case II-2> and <Case III-1>.

(3) Combination of the methods <Case II-3> and <Case III-1>.

In both the methods <Case II-2> and <Case II-3>, the record is searched from the record position information held separately from the record. Accordingly, when a certain record of concern is to be retrieved, it is necessary to read out sequentially the records on the track, starting from the leading one. On the other hand, in the case of the method <Case III-1>, data of all the count fields on the track are required in order to check the track capacity. Accordingly in either of the combination (2) or (3), the records on the track have to be sequentially read out at least once, starting from the leading one. Thus, adoption of the method <Case II-2> or <Case II-3> will be meaningless.

In other words, the method <Case III-1> is a track capacity check method which is meaningful only when the method <Case II-1> of reading out all the records on the track for determining the record position is adopted.

All combinations except those (1), (2) and (3) are listed in the table of FIG. 9. In this figure, each of the rows shows a CKD-to-FBA format conversion which can be realized by one combination, wherein the methods adopted in the combination are identified by circular marks, respectively. By way of example, the method listed in the table of FIG. 9 at the first row is a CKD-to-FBA format conversion method in which the method <Case I-1> is adopted as a method of leaving the gaps, the method <Case II-1> is adopted as a record position determination method and the method <Case III-1> is adopted as a method of checking the track capacity.

Hereinafter, the combination of the methods <Case I-1>, <Case II-1> and <Case III-1> will be represented by <1, 1, 1> only for the purpose of convenience of description. Similar notations are also adopted for the other combinations. Thus, according to this notation method, the known conversion method can be represented by <2, 2, 2>.

In the following, the individual CKD-to-FBA format conversions will be described while comparing them with one another. To this end, items for comparisons are mentioned below.

a) Size of a memory capacity required for developing the track image of the CKD format on the cache memory (also referred to simply as the memory) of the magnetic disk controller (DKC):

Since this memory capacity exhibits remarkable dependence not only on the format conversion schemes but also the capacity of one track in the relevant track format (e.g. number of records on the track), the memory capacity should be selected greater than a value which would be encountered in the worst case as expected. Besides, writing of the memory image on a physical disk formated in the FBA requires a memory capacity which corresponds to an integral multiple of a block (sector) capacity of the FBA magnetic disk. This memory capacity is primarily determined in dependence on the manner in which the gaps are left, the quantity or amount of additional information required for determination of the record positions and other relevant factors.

b) Easiness of data transfer:

Data portion which is to undergo data transfer with the host or channel in a continuous manner should preferably be in a continuous form on the memory as well in order to ensure easiness of the data transfer. However, for those portions which inherently correspond to the gaps, some measures must be taken for filling them, because otherwise overrun would take place in the channel. Thus, the high transfer rate will be put aside from the consideration for the time being.

c) Procedure for searching out an aimed record:

A procedure of finding or searching an aimed record (or record of concern) from a track image of the CKD format on the memory is also a matter of concern. In that case, consideration should be paid not only to the number of times the procedure is executed but also to the number of times of the accesses to the memory as involved. Since the track image is developed on the cache memory which constitutes a common memory area, it is advantageous for the system on the whole that the number of times of memory access is smaller even though overhead involved in the procedure itself (e.g. quantity of calculation) increases by some extent. The number of times of the memory accesses is primarily determined in dependence on the method of positioning the records.

d) Format write procedure:

For the format update writing operation, the write operation may be performed by making reference to KL and DL of the record formatted already. However, for writing the format, there arises a necessity of checking the matchability between the remaining track capacity on the memory and the KL and DL of the record sent from the host system. In other words, it is necessary to check the possibility of occurrence of track overrun. Besides, maintenance of the control formation in addition to the records is also required although it depends on the scheme or method as adopted. Accordingly, the procedure, the number of times of the memory accesses as involved in the execution of the procedure and the like factor should be taken into account as well.

In this regard, analysis will be made in detail of individual features of the various types of CKD-to-FBA format conversion schemes while taking into consideration the items for comparison mentioned above.

<1, 1, 1>-Type CKD-FBA Format Conversion

In this type CKD-FBA format conversion, all gap are deleted. For determination of record position, all the records starting from the leading one of the track are read out. For checking the track capacity, all the records starting from the leading one of the track are read out.

a) Memory capacity

With this conversion, the highest availability or utilization efficiency of the memory can be assured, because no control information is present at all.

b) Easiness of data transfer

Since individual fields are in contiguous, it is sufficient to count up only the memory address for realizing the data transfer with the channel(s) on a field continuation basis.

c) Procedure for searching an aimed record

For searching or finding out a record of concern, it is necessary to make access to the memory a number of times equal to the number of records which intervene between the start or leading record of the track and the record of concern, inclusive thereof. In other words, the count fields of the individual records have to be read out. After acquisition of the count fields of the individual records, the position of the record of concern is arithmetically determined on the basis of KL and DL, which can easily be carried out simply by addition of KL and DL.

d) Format write procedure

For checking the track capacity as well, it is necessary to make access to the memory a number of times equal to the number of the records which are present between the forefront or leading record on the track and the record of concern. In order to check the track capacity, it is required to take into account the capacity of the gaps deleted. For the format write operation, there is no control information to be updated.

<1, 2, 3>-Type CKD-FBA Format Conversion

In this type of format conversion, all the gaps are deleted. For determination of the position of a record of concern, the position of the forefront or first record included in the FBA block is held. For the track capacity check, relative position information such as the segment number and the like are held in each record.

a) Memory capacity

Although all the gaps are deleted, memory areas are used in excess for holding the position information of the leading record included in the FBA block and the control information for holding the segment numbers and others of the individual records when compared with the <1, 1, 1>-type format conversion described above.

b) Easiness of data transfer

Since the individual fields exist in continuation to one another on the memory, it is sufficient to count up only the memory address for performing the data transfer with the channel(s) on a field continuation basis. However, in case data exists across the FBA blocks even within a single field, the data may be interrupted by the position information of the first record included in the FBA block even on the memory. Accordingly, it is necessary to perform the data transfer by skipping the position information, as is in the case of a defect skipping.

c) Procedure for searching an aimed record

For searching a record of concern, it is necessary to make access to the memory a number of times equal to a number of records which intervene between the first one of the FBA block and the record of concern. Accordingly, the number of time the memory is accessed is smaller than that required in the case of the <1, 1, 1>-type format conversion. The method of arithmetically determining the position of the aimed record on the basis of the position information of the first record of the FBA block is simple and can be carried out substantially in a same manner as in the case of the <1, 1, 1>-type format conversion, requiring only sequential addition of the sizes of the count fields and KL and DL.

d) Format write procedure

For checking the track capacity, the remaining capacity which allows the records of a given size to be written in succession is arithmetically determined on the basis of the segment number of the record which precedes to the record subjected to the format write operation (i.e., the information indicating the relative position of that record on the track in the intrinsic CKD format), and KL and DL.

Upon completion of the format write operation, the segment number of the record which has undergone the format write operation must be written in that record itself. At the same time, when a new count field is produced in a new FBA block, information indicative of the position of the count field of the leading or first record must be written in the FBA block.

<1, 3, 3>-Type CKD-FBA Format Conversion

In this type format conversion, all the gaps are deleted. For determining the position of a record, the relative position information of all the records is held. For the check of the track capacity, relative position information such as the segment number, etc. is held in each record.

a) Memory capacity

Although all the gaps are deleted, the memory capacity as required increases when compared with the <1, 2, 3>-type format conversion where only the position information of the first record included in the FBA block is held, because the position information of all the records have to be held separately in the case of this conversion method. Further, the segment number is held in each record similarly to the case of the <1, 2, 3>-type format conversion.

b) Easiness of data transfer

The data transfer is performed in a substantially same manner as in the case of the <1, 2, 3>-type format conversion.

Since the individual fields exist in continuation to one another on the memory, it is sufficient to count up or increment only the memory addresses for transferring data of the consecutive fields with the channel(s). When the position information of the records are dispersed or distributed among the FBA blocks, the data may be intercepted by the record position information included in the FBA block even on the memory, if the data within a single-field exists across more than one FBA blocks. In that case, the data transfer has to be performed by skipping the position information as in the case of a defect skipping.

c) Procedure for searching an aimed record

For finding out the record of concern, it is sufficient to read only once the record position information. Accordingly, the number of times the memory is accessed is smallest in all the format conversion schemes. The position of the record of concern can be determined straightforwardly from the position information as read out.

d) Format write procedure

Since the track capacity check method is same as in the case of the <1, 2, 3>-type format conversion, the format write procedure is substantially same as the latter.

For checking the track capacity, the remaining capacity which allows the records of a given size to be written in succession is arithmetically determined on the basis of the segment number of the record which precedes to the record subjected to the format write operation (i.e., the information indicating the relative position of that record on the track in the intrinsic CKD format), and KL and DL.

Upon completion of the format write operation, the segment number of the record is computed and written in the record itself that has undergone the format write operation. At the same time, information indicating the position of the count field of the record of concern must be added to the control information holding the position information of that record without fail.

<2, 1, 1>-Type CKD-FBA Format Conversion

In this type CKD-FBA format conversion, only the inter-field gap are deleted, while the inter-record gaps are left as they are. For determination of record position, all the records starting from the leading one of the track are read out. For checking the track capacity, all the records starting from the leading one of the track are also read out.

a) Memory capacity

Although no extraneous control information is added, a greater memory capacity than the <1, *, *>-type format conversion schemes (where * represents an integer in a range of "1" to "3") is required, because the inter-record gaps are left as they are. However, since the relative position information of the records are not to be maintained in the inter-record gaps as left, there arises no need for stretching the inter-record gaps. Consequently, when compared with the <*, *, 2>-type format conversion schemes where the inter-record gaps are forcibly stretched to maintain the relative position information of the records, as described hereinafter, the memory capacity can be reduced. However, this in turn means that the inter-record gaps as left are of no use (i.e., they are left in vain).

b) Easiness of data transfer

For the transfer of data of continuous fields (C→K→D) with the channel(s), it is sufficient only to count up or increment the memory addresses since the inter-field gaps are absent even though the inter-record gaps are present. Besides, because of absence of any extraneous control information, the field existing across the FBA blocks can never be broken or divided on the memory either.

c) Procedure for searching an aimed record

This procedure is substantially same as in the case of the <1, 1, 1>-type format conversion method.

For searching or finding a record of concern, it is necessary to make access to the memory equal to the number of records which intervene between the leading record of the track and the record of concern, inclusive thereof. In other words, the count fields of the individual records have to be read out. After acquisition of the count fields of the individual records, the position of the record of concern is arithmetically determined on the basis of the KL and DL data, which can easily be carried out simply by adding the inter-record gaps in addition of KL and DL.

d) Format write procedure

This procedure is also substantially same as in the case of the <1, 1, 1>-type format conversion.

For checking the track capacity too, it is necessary to make access to the memory a number of times equal to the number of the records which intervene between the first record on the track and the record of concern. In order to check the track capacity, it is required to take into account the capacity of the inter-field gaps as deleted. In the format write operation, there is no control information to be updated.

<2, 2, 2>-Type CKD-FBA Format Conversion (known method)

In this format conversion, only the inter-field gaps are deleted with the inter-record gaps being left as they are. For determination of the record position, the position of the first record included in the FBA block is held. For the purpose of the track capacity check, relative positions of the individual records are maintained by adjusting the gap lengths.

a) Memory capacity

Although the inter-field gaps are deleted, the memory capacity corresponding to the track capacity in the original CKD format is required, because the inter-record gap is stretched or lengthened in order to maintain the relative position information of the individual records to be same as those in the original CKD format. Furthermore, a memory capacity for storing the position information of the first record included in the FBA block is additionally required.

b) Easiness of data transfer

Because of the absence of the inter-field gaps notwithstanding of the presence of the inter-record gaps, it is sufficient to count up or increment only the memory address for continuous transfer of the field data with the channel (C→K→D). However, when data exists across the FBA blocks even within a single field, the data is broken or divided by the position information of the first record included in the FBA block on the memory as well, differing from the <2, 1, 1>-type format conversion. Accordingly, it is necessary to perform the data transfer by skipping the position information as in the case of the defect skipping.

c) Procedure for searching an aimed record

In order to search an aimed record (i.e., record of concern), it is required to make access to the memory a same number of times as the number of the records which intervene between the forefront record of the FBA block and the aimed record. Accordingly, when compared with the <2, 1, 1>-type format conversion, the number of times the memory is accessed is small. The method of computing the position of the aimed record on the basis of the position information of the first record in the FBA block is simple and essentially same as in the case of the <2, 1, 1>-type format conversion. (Namely, it is sufficient to add sequentially the size of the count field, KL and DL and additionally the inter-record gap.)

Besides, since the relative positions of the individual records in the CKD format are maintained on the memory as well, it is possible to determine accurately the FBA block including the aimed record on the basis of the value of the sector set.

d) Format write procedure

Because the relative position information of the individual records in the CKD format is also maintained even on the memory, it can easily be determined by computation in conjunction with the track capacity to check how many records are allowed to be subsequently written, so far as the address of the memory for the record subjected to the format write operation can be known (from the processing step c).

When a new count field is created in a new FBA block as a result of the format write operation, information indicating the position of the count field of the first or leading record must be written in the new FBA block.

<2, 2, 3>-Type CKD-FBA Format Conversion

In this format conversion, only the inter-field gaps are deleted with the inter-record gaps being left as they are. For determination of the record position, the position information of the first record included in the FBA block is held. For the check of track capacity, relative position information such as the segment number, etc. is held in each record.

a) Memory capacity

As in the case of the <2, 2, 2>-type format conversion, the inter-field gaps are deleted while the inter-record gaps are left. However, since no attempt is made to maintain the relative position information of the records by making use of the inter-record gaps as left, there is no necessity of extending or stretching forcibly the inter-record gaps (which in turn means that the role of the inter-record gaps as left are of less significance). An additional or excess memory capacity is required for storing the position information of the first record included in the FBA block. Besides, the memory capacity increases by an amount for storing the segment number information included in the individual records. Consequently, the memory capacity is greater than in the case of the <2, 1, 1>-type format conversion and smaller than that required in the <2, 2, 2>-type format conversion.

b) Easiness of data transfer

This procedure is utterly the same as in the case of the <2, 2, 2>-type format conversion.

Because of the absence of the inter-field gaps notwithstanding of the presence of the inter-record gaps, it is sufficient to count up or increment only the memory address for continuous transfer of the field data with the channel (C→K→D). (The segment number, etc. held in each record provide no obstacle to the data transfer C→K, since they are included in the count field.)

However, when data exist across the FBA blocks even within a single field, the data is broken or divided by the control information such as the position information of the first record included in the FBA block on the memory as well. Accordingly, it is necessary to perform the data transfer by skipping the control information as is in the case of the defect skipping.

c) Procedure for searching an aimed record

This procedure is utterly the same as in the case of the <2, 2, 2>-type format conversion. In order to search an aimed record, it is required to make access to the memory a same number of times as the number of the records which intervene between the first record of the FBA block and the aimed record. Accordingly, when compared with the <1, 1, 1>-type format conversion, the number of times the memory is accessed is small. The method of computing the position of the aimed record on the basis of the position of the first record in the FBA block is simple and essentially same as in the case of the <1, 1, 1>-type format conversion. (Namely, it is sufficient to add sequentially the size of the count field, KL and DL and additionally the inter-record gap.)

d) Format write procedure

For the purpose of checking the track capacity, it is determined by computation how many records can subsequently be written on the basis of the segment number of the record which immediately precedes to the record to be formatted (i.e., the information indicating the relative position of the aimed record on the track in the inherent CKD format) and information of KL and DL. Upon completion of the format write procedure, the segment number of the record as written must be arithmetically determined and held in that record. At the same time, when a new count field is created in a new FBA block as a result of the format write operation, information indicating the position of the count field of the first or leading record must be written in the new FBA block.

<2, 3, 2>-Type CKD-FBA Format Conversion

In this format conversion, only the inter-field gaps are deleted with the inter-record gaps being left as they are. For determination of the record position, the relative position information of all the records is held. For checking the track capacity, relative position information of the individual records is maintained by adjusting the gap length correspondingly.

a) Memory capacity

Because the relative positions of the individual records are maintained as they are in the original CKD format by adjusting the inter-record gap lengths as left, the memory capacity required is basically same as the track capacity in the original CKD format, as in the case of the <2, 2, 2>-type format conversion. However, since the record position information added as the control information includes not only that of a first record in the FBA block but also that of all the other records, the memory capacity increases when compared with the <2, 2, 2>-type format conversion. More specifically, the memory capacity required in this format conversion is maximum in all the varieties of the format conversion schemes.

b) Easiness of data transfer

This procedure is utterly the same as in the cases of the <2, 2, 2>-type and <2, 2, 3>-type format conversions.

Because of the absence of the inter-field gaps notwithstanding of the presence of the inter-record gaps, it is sufficient to count up or increment only the memory address for continuous transfer of the field data with the channel (C→K→D).

However, when the record position information is held, distributed on a FBA block basis, the data is broken or divided by the position information of the record included in the FBA block on the memory as well, in case the data exist across the FBA blocks even within a single field. Accordingly, it is necessary to perform the data transfer by skipping the position information as in the case of the defect skipping.

c) Procedure for searching an aimed record

This procedure is utterly the same as in the case of the <1, 3, 3>-type format conversion.

For finding the record of concern, it is sufficient to read only once the record position information. Accordingly, the number of times the memory is accessed is smallest in all the format conversion schemes. The position of the record of concern can be determined straightforwardly from the position information as read out.

Furthermore, because the relative position of each record in the CKD format is maintained on the memory as well, it is possible to determine precisely the FBA block included in the record of concern on the basis of the sector set value.

d) Format write procedure

This procedure is a compromise between the <2, 2, 2>-type and <1, 3, 3>-type format conversions described hereinbefore.

Since the relative positions of the individual records in the CKD format are also maintained even on the memory, it can easily be determined how many records are allowed to be subsequently written, by computation in conjunction with the track capacity check, so far as the addresses of the memory for the records subjected to the format write operation can be known (from the process c).

Upon completion of the format write procedure, information indicating the position of the count field of the record which has undergone this processing must necessarily be added to the control information which holds the position information of that record.

<2, 3, 3>-Type CKD-FBA Format Conversion

In this format conversion, only the inter-field gaps are deleted with the inter-record gaps being left as they are. For determining the record position, the relative position information of all the records is held. For the purpose of track capacity check, the relative position information such as the segment number, etc. is held in each record.

a) Memory capacity

The inter-field gaps are deleted while the inter-record gaps are left as in the case of the <2, 3, 2>-type format conversion scheme. However, since no effort is made to maintain the relative positions of the records by making use of the inter-record gaps as left, there is no necessity of stretching or extending forcibly the inter-record gaps. (Of course, significance of leaving the inter-record gaps is thereby lessened.) Besides, the memory capacity for the segment number information included in each record is additionally required. Consequently, the memory capacity becomes slightly greater than that for the <2, 2, 3>-type format conversion scheme, both of which bear a high similarity to the instant conversion scheme.

b) Easiness of data transfer

This procedure is utterly the same as in the case of the <2, 3, 2>-type format conversion.

Because of the absence of the inter-field gaps notwithstanding of the presence of the inter-record gaps, it is sufficient to count up or increment only the memory address for continuous transfer of the field data with the channel (C→K→D). (The segment number, etc. held in each record provide no obstacle to the data transfer C→K, since they are included in the count field.)

However, in the case where the record position information is held, being distributed on a FBA block basis and when data exist across the FBA blocks even within a single field, the data is broken or divided by the position information of the record included in the FBA block on the memory as well. Consequently, it is necessary to perform the data transfer by skipping the position information as in the case of the defect skipping.

c) Procedure for searching an aimed record

This procedure is also utterly the same as in the case of the <2, 3, 2>-type format conversion.

In order to search an aimed record, it is sufficient to read only once the record position information. Accordingly, the number of memory access times as required is minimum in all the format conversion schemes. The position of the aimed record can be determined directly from the record position information.

d) Format write procedure

For the purpose of checking the track capacity, it is determined by computation how many records can subsequently be written, on the basis of the segment number of the record immediately preceding to the record to be formatted (i.e., the information indicating the relative position of the aimed record on the track in the inherent CKD format) and information of KL and DL.

Upon completion of the format write procedure, the segment number of the record as written must be arithmetically determined and held in that record. At the same time, the information indicating the position of the count field of that record must be additionally written to the control information holding the record position information without fail.

<3, 1, 1>-Type CKD-FBA Format Conversion

In this type CKD-FBA format conversion, inter-record gaps and the inter-field gaps are left as they are. For determination of the record position, all the records starting from the leading or first one of the track are read out. For checking the track capacity, all the records starting from the first one of the track are read out.

a) Memory capacity

Since both the inter-record gaps and the inter-field gaps are left and hence the track image in the CKD format is left essentially as it is, the memory capacity as required is close to a maximum value notwithstanding of no addition of any extra control information. However, it is not attempted to maintain positively the relative positions of the records in the CKD format. Accordingly, the capacity for the ECC and the padding data need not be taken into account in determination of the memory capacity. Of course, the significance of leaving the gaps is lessened.

b) Easiness of data transfer

Since both the inter-record gaps and the inter-field gaps exist on the memory as well, it becomes necessary to rearray the memory addresses by skipping those corresponding to the gaps instead of simply counting up or incrementing the memory address for carrying out continuously the field data transfer with the channel.

It is however noted that because of the absence of any extra control information, any field extending across the FBA blocks is protected from being divided on the memory.

c) Procedure for searching an aimed record

This procedure is substantially same as in the case of the <1, 1, 1>-type format conversion.

For searching or finding out an aimed record, it is necessary to make access to the memory equal to the number of records which intervene between the first record of the track and the record of concern, inclusive thereof. In other words, the count fields of the individual records have to be read out. After acquisition of the count fields of the individual records, the position of the record of concern is arithmetically determined on the basis of the data of KL and DL, which can easily be carried out simply by adding serially the inter-record gaps and the inter-field gaps in addition to the KL and DL.

d) Format write procedure

This procedure is also substantially the same as in the case of the <1, 1, 1>-type format conversion.

For checking the track capacity, it is necessary to make access to the memory equal to the number of the records which intervene between the first record on the track and the record of concern. In order to check the track capacity, it is necessary to take into account the capacity for the ECC and the padding data even though the gaps are left as they are. By modifying the gap length so that the same track capacity as that in the CKD format can be obtained, inclusive of those for the ECC and padding data, the remaining track capacity can straight-forwardly be determined from the memory address, as in the case of the <3, 2, 2>-type format conversion. In the format write operation, there exists no control information to be updated.

<3, 2, 2>-Type CKD-FBA Format Conversion

In this format conversion, both the inter-record gaps and the inter-field gaps are left. For determination of the record position, the position information of the first record included in the FBA block is held. For the purpose of the track capacity check, relative positions of the individual records are maintained by adjusting the gap lengths.

a) Memory capacity

Because the relative positions of the individual CKD format is held by adjusting the gap lengths of the inter-record gaps and the inter-field gaps both being left, the memory capacity as required is same as in the case <2, 2, 2>-type format conversion and corresponds to a sum of the track capacity in the original CKD format and the position information of the first block included in the FBA block.

b) Easiness of data transfer

Since both the inter-record gaps and the interfield gaps exist on the memory, it becomes necessary to rearray the memory addresses by skipping those corresponding to the gaps instead of simply counting up the memory address for carrying out continuously the field data transfer with the channel, as is in the case of the <3, 1, 1>-type format conversion.

Furthermore, when data exists across the FBA block even within a single field, the data is divided by the position information of the first record included in the FBA block also on the memory, differing from the <3, 1, 1>-type format conversion. Accordingly, it is necessary to perform the data transfer by skipping the position information as in the case of the defect skipping.

c) Procedure for searching an aimed record

This procedure is utterly the same as in the case of the <2, 2, 2>-type format conversion.

In order to search an aimed record, it is required to make access to the memory a same number of times as the number of the records which intervene between the first record of the FBA block and the aimed record. Accordingly, when compared with the <3, 1, 1>-type format conversion, the number of times the memory is accessed is small. The method of computing the position of the aimed record on the basis of the position of the first record in the FBA block is simple and essentially same as in the case of the <3, 1, 1>-type format conversion. (Namely, it is sufficient to add sequentially the size of the count field, KL and DL and additionally the inter-record gap and the inter-field gap.)

Besides, since the relative position information of the individual records in the CKD format is maintained on the memory as well, it is possible to determine accurately the FBA block including the aimed record on the basis of the value of the sector set.

d) Format write procedure

This procedure is also utterly the same as in the case of the <2, 2, 2>-type format conversion.

Since the relative positions of the individual records in the CKD format are also maintained even on the memory, it can easily be determined by computation in conjunction with the track capacity to check how many records are allowed to be subsequently written, so far as the address of the memory for the record subjected to the format write operation can be known (from the process c).

When a new count field is created in a new FBA block as a result of the format write operation, information indicating the position of the count field of the first or leading record must be written in the new FBA block.

<3, 2, 3>-Type CKD-FBA Format Conversion

In this format conversion, both the inter-record gaps and the inter-field gaps are left. For determination of the record position, the position of the first record included in the FBA block is held. For the track capacity check, the relative position information such as the segment number, etc. is held in each record.

a) Memory capacity

Since both the inter-record gaps and the inter-field gaps are left, the track image of the CKD format is maintained substantially as it is. Besides, the position information of the first record included in the FBA block is retained. For this reason, the memory capacity as required is close to a maximum. However, because the relative positions of the records in the CKD format are not positively to be maintained, the memory capacity for the ECC and the padding data may be put aside from the consideration. In this case, the effect of leaving the gaps is of less significance.

b) Easiness of data transfer

Since both the inter-record gaps and the inter-field gaps exist even on the memory, it becomes necessary to rearray the memory addresses by skipping those corresponding to the gaps instead of simply counting up or incrementing the memory address for carrying out continuously the field data transfer with the channel, similarly to the <3, 1, 1>-type format conversion.

Furthermore, when data exists across the FBA block even within a single field, the data is divided by the position information of the first record included in the FBA block equally on the memory, differing from the <3, 1, 1>-type format conversion. Accordingly, it is necessary to perform the data transfer by skipping the position information as in the case of the defect skipping.

c) Procedure for searching an aimed record

This procedure is utterly the same as in the case of the <3, 2, 2>-type format conversion.

In order to search a record of concern, it is required to make access to the memory a same number of times as the number of the records which intervene between the first record of the FBA block and the aimed record. Accordingly, when compared with the <3, 1, 1>-type format conversion, the number of times the memory is accessed is smaller. The method of computing the position of the aimed record on the basis of the position of the first record in the FBA block is simple and essentially same as in the case of the <3, 1, 1>-type format conversion. (Namely, it is sufficient to add sequentially the size of the count field, KL and DL and additionally the inter-record gap and the inter-field gap.)

d) Format write procedure

For the purpose of checking the track capacity, it is determined by computation how many records can subsequently be written on the basis of the segment number of the record immediately preceding to the record to be formatted (i.e., the information indicating the relative position of the aimed record on the track in the inherent CKD format) and the data of KL and DL.

Upon completion of the format write procedure, the segment number of the record as written must be arithmetically determined and held in that record. At the same time, it is necessary to add to the control information holding the position information of the record the information indicating the position of the count field of that record.

<3, 3, 2>-Type CKD-FBA Format Conversion

In this format conversion, both the inter-field gaps and the inter-record gaps are left as they are. For determination of the record position, the relative position information of all the records is retained. For checking the track capacity, relative positions of the individual records are maintained by adjusting the gap lengths.

a) Memory capacity

Because the relative position information of the individual records is maintained as they are in the original CKD format by adjusting the inter-record gap lengths as left, the memory capacity as required is basically same as the track capacity in the original CKD format, as in the case of the <3, 2, 2>-type format conversion. However, since the record position information added as the control information includes not only that of a first record in the FBA block but also that of all the other records, the memory capacity increases when compared with the <3, 2, 2>-type format conversion. More specifically, the memory capacity required in this format conversion is close to a maximum in all the varieties of the format conversion schemes, as in the case of the <2, 3, 2>-type format conversion.

b) Easiness of data transfer

This procedure is utterly the same as in the cases of the <3, 2, 2>-type and <3, 2, 3>-type format conversions.

Since both the inter-record gaps and the inter-field gaps exist on the memory as well, it becomes necessary to rearray the memory addresses by skipping those corresponding to the gaps instead of simply counting up or incrementing the memory address for carrying out continuously the field data transfer with the channel, similarly to the <3, 1, 1>-type format conversion.

Furthermore, when the record position information is held, being distributed on a FBA block basis and when data exists across the FBA block even within a single field, the data is divided by the position information of the record included in the FBA block also on the memory, differing from the <3, 1, 1>-type format conversion. Accordingly, it is necessary to perform the data transfer by skipping the position information as in the case of the defect skipping.

c) Procedure for searching an aimed record

This procedure is utterly the same as in the cases of the <1, 3, 3>-type format conversion, the <2, 3, 3>-type format conversion, etc.

For finding out the record of concern, it is sufficient to read only once the record position information. Consequently, the number of times the memory is accessed is smallest in all the format conversion schemes. The position of the record of concern can be determined straightforwardly from the position information as read out.

Furthermore, because the relative position of each record in the CKD format is maintained on the memory as well, it is possible to determine precisely the FBA block included in the record of concern on the basis of the sector set value.

d) Format write procedure

This procedure is utterly the same as in the case of the <2, 3, 2>-type format conversion.

Since the relative positions of the individual records in the CKD format are also maintained even on the memory, it can easily be determined how many records are allowed to be subsequently written by computation in conjunction with the track capacity check, so far as the addresses of the memory for the records subjected to the format write operation can be known (from the process c).

Upon completion of the format write procedure, information indicating the position of the count field of the record which has undergone this procedure must be added to the control information holding the position information of that record without fail.

<3, 3, 3>-Type CKD-FBA Format Conversion

In this format conversion, both the inter-field gaps and the inter-record gaps are left as they are. For determination of the record position, the relative position information of all the records is held. For checking the track capacity, the relative position information such as the segment number, etc. is held in each record.

a) Memory capacity

Since both the inter-record gaps and the inter-field gaps are left, the track image of the CKD format is maintained substantially as it is. Besides, the position information of all the records is held. For this reason, the memory capacity as required becomes much greater than that for the <3, 2, 3>-type format conversion scheme, to be close to a maximum. However, because the relative position information of the records in the CKD format is not positively to be maintained, the memory capacity for the ECC and the padding may be put aside from the consideration. In this case, the effect of leaving the gaps is of less significance.

b) Easiness of data transfer

This procedure is utterly the same as in the cases of the <3, 2, 2>-type, <3, 2, 3>-type and <3, 3, 2>-type format conversions.

Since both the inter-record gaps and the inter-field gaps exist on the memory as well, it becomes necessary to rearray the memory addresses by skipping those corresponding to the gaps instead of simply counting up or incrementing the memory address for carrying out continuously the field data transfer with the channel, similarly to the <3, 1, 1>-type format conversion.

Furthermore, when the record position information is held, being distributed on a FBA block basis and when data exists across the FBA block even within a single field, the data is divided by the position information of the record included in the FBA block on the memory as well, differing from the <3, 1, 1>-type format conversion. Accordingly, it is necessary to perform the data transfer by skipping the position information as in the case of the defect skipping.

c) Procedure for searching an aimed record

This procedure is utterly the same as in the case of the <3, 3, 2>-type format conversion.

For finding out the record of concern, it is sufficient to read only once the record position information. Accordingly, the number of times the memory is accessed is smallest in all the format conversion schemes. The position of the record of concern can be determined straightforwardly from the position information as read out.

d) Format write procedure

This procedure is utterly the same as in the case of the <2, 3, 3>-type format conversion.

For the purpose of checking the track capacity, it is determined by computation how many records can subsequently be written on the basis of the segment number of the record immediately preceding to the record to be formatted (i.e., the information indicating the relative position of the aimed record on the track in the inherent CKD format) and the values of KL and DL.

Upon completion of the format write procedure, the segment number of the record as written must be held in that record without fail. At the same time, the information indicating the position of the count field of that record must be additionally written to the control information holding the record position information.

Results of the comparisons of the various types of format conversions described above are summarized in FIG. 9 at a right half portion.

In the column labeled "ITEMS FOR COMPARISON", there are listed the four items for comparison mentioned hereinbefore with five levels of grade in dependence on the degrees of importance put on the items, wherein the level or score "5" represents the most important item while the level or score "1" indicates the item of the least significance.

For each of the items for comparison, the various conversion schemes are evaluated with five levels of rating, wherein scores of "1" to "5" are assigned to the conversion schemes, respectively. More specifically, the conversion scheme which is the best for a given one of the items is assigned with the score of "5" while the conversion scheme worst to that item is marked with the score "1".

The scores are then summed for each of the format conversion schemes. As a method of summing the scores, the comparison item is multiplied with the grade value assigned to that item, whereon the total sum of the products determined for all the items of comparison is determined for evaluation of the relevant format conversion scheme. Thus, the format conversion scheme having a higher total score is considered to be more excellent. In the table shown in FIG. 9, an asterisk mark "*" is inserted in a column labeled "TOTAL SCORE" for those format conversion schemes which has gained a higher total score than that of the hitherto known conversion scheme.

It should however be noted that the total score shown in FIG. 9 includes more or less a subjective factor and thus represents only a reasonable yardstick or reference. For trial, allocation of the scores and the grade values assigned to the items for comparison have been changed. It has however been found that the format conversion schemes gained the total scores higher than the hitherto known scheme remain same as those shown in FIG. 9. It is thus believed that the total score determined as mentioned above can provide a standard of high quality for the valuation, so far as the items for comparison now under consideration are concerned.

The reason why the hitherto known format conversion scheme has not obtained a high score can primarily be explained by the fact that a large number of memory accesses is required in finding the aimed record (or record of concern). In the conventional scheme, the first (leading) record in the FBA block could be found at once. However, those records which succeed to the leading one must be read out by checking one by one the count fields thereof. It is considered that the hitherto known format conversion method suffers from two undermentioned problems among others.

(1) Problem concerning a unit having record position information

Figure 10:
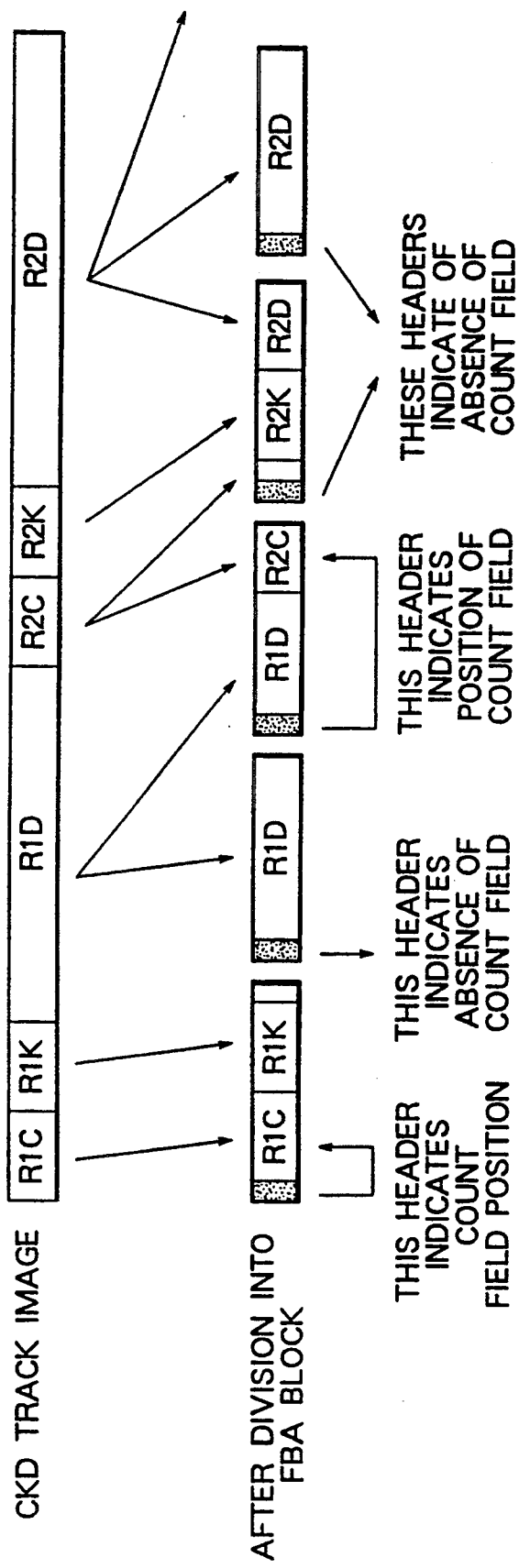
FIG. 10 is a diagram for illustrating an example of division of a CKD record into FBA blocks.

According to the known method, each of the blocks (approximately equivalent to the sectors) of the FBA disk (i.e., disk of the fixed length record or fixed byte architecture format) has the position information of the first record included in the block. In the case of an SCSI (Small Computer System Interface)-type disk used in actual applications, the size of this block is in a range of 1 KB to 2 KB at the greatest. In contrast, most of the CKD records to be stored on the disk are of a size on the order of 4 KB. Consequently, it is rare that a number of CKD records are included in one FBA block. Rather, one CKD record is more likely to be stored over a plurality of FBA blocks, as shown in FIG. 10. It is thus believed that in most cases, the number of the CKD records included in one block can not exceed is one.

Accordingly, so far as the FBA block including the aimed record can be identified on the basis of the information of the sector set, the record of concern could be found out within a single memory access even in the case of the conventional scheme.

(2) Problem concerning the location of a track buffer

According to the conventional format conversion method, the emulator for effectuating the CKD-to-FBA format conversion may be placed at any location between the channel processor and the FBA disk (inclusive of the DKC (magnetic disk controller)). However, as a matter of fact, the emulation is executed by the channel processor itself. In other words, it is deemed that the conventional method can not assume a large scale system based on the disk cache.

Thus, the memory area for the track buffer which serves for developing the track image is reserved in a main memory of a host CPU (Central Processing Unit) or a local memory incorporated in the channel processor itself. In this conjunction, it is noted that so far as the track buffer is afforded by the local memory of the channel processor itself or alternatively the channel processor emulates the CKD-to-FBA format conversion, increase of more or less significance in the number of memory accesses presents no practical problem.

For the reasons described above, the number of times the memory is accessed is not considered to be a problem of great importance in the case of the conventional method. However, for the same reasons, difficulties mentioned below are encountered.

(1) Problem concerning the unit for storing the record position information

Figure 11:
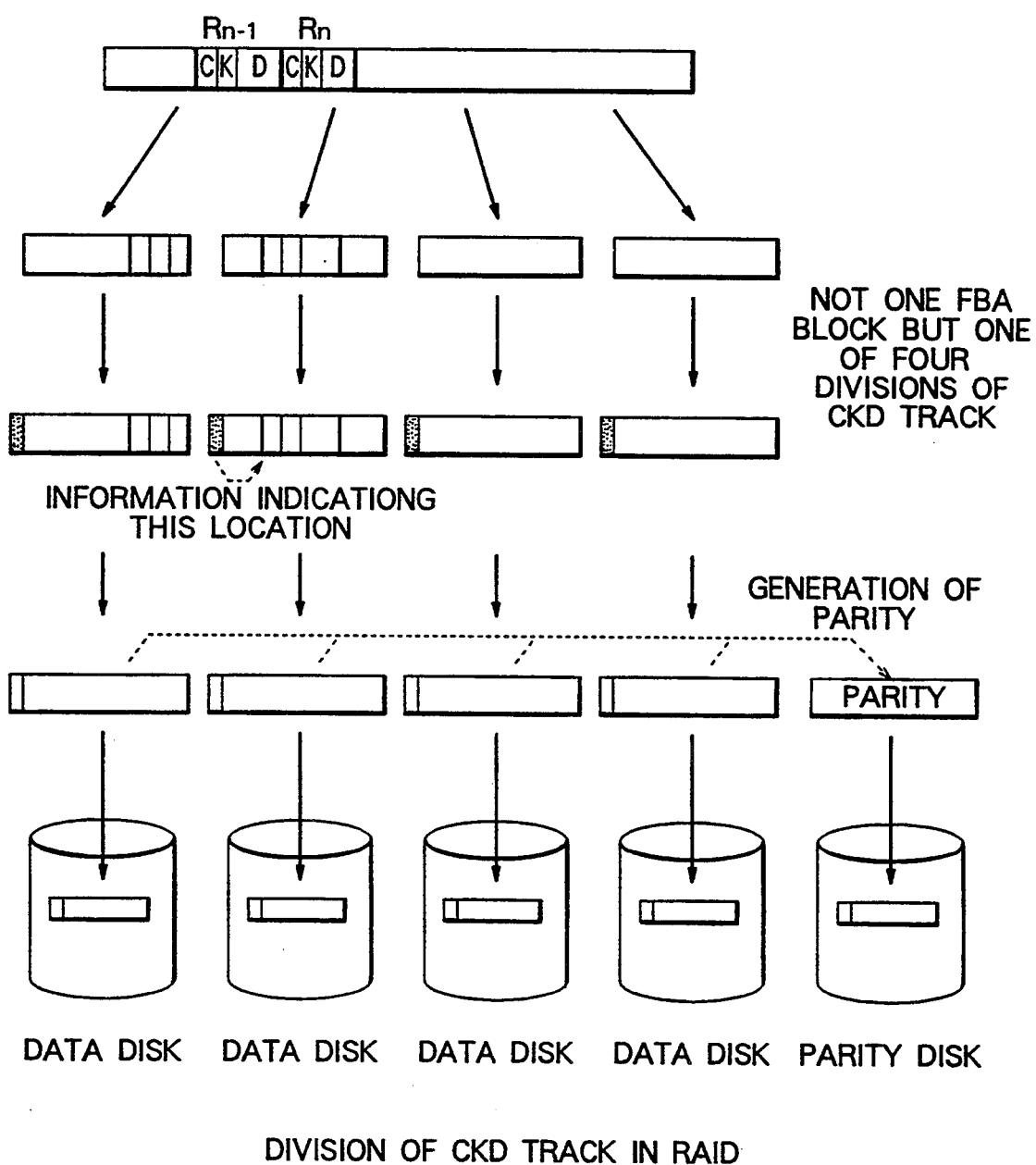
FIG. 11 is a diagram showing an example of division of a CKD track in a RAID system.

As described previously, in the case of the conventional scheme, each block (substantially equivalent to the sector) has the position information of the first or leading record included in that block, which however means serious inefficiency or ineffectiveness. At this juncture, let's suppose an array type disk system (RAID) which includes four data disk drives each based on a disk cache and one redundant disk drive, as is illustrated in FIG. 11. In that case, the read/write operation to the physical disks is performed on a ¼-track basis by dividing one CKD track (e.g., of 48 KB) to the four data disks rather than on a FBA-block basis. Accordingly, the record position information should preferably be held for every ¼-track instead of every FBA block (refer to FIG. 11).

When the position information is held for every ¼ track, the position information for one track is collected at four locations, which in turn means that the number of divisions or interruptions of the CKD record by the position information on the memory is four at maximum. In contrast, when the record position information is stored for every FBA block, the number of the interruptions of the CKD record in one track amounts to the number of the FBA blocks included in one track. Assuming, by way of example, that the size of one block is 2 KB, the number of interruptions of the CKD blocks in one track is about 24. More specifically, one CKD record of 4 KB will be interrupted at one or two points.

The interruption of the CKD record must be processed by a firmware of the magnetic disk controller unless any dedicated hardware is provided to this end. Assuming that the processing takes several ten microseconds and that the channel transfer rate is 4.5 MB/sec., it takes about 889 $\mu$sec., for transferring the record of 4 KB, which in turn means that the data transfer performance is degraded approximately by several to ten percents for one record.

On the other hand, when the position information is held for every ¼ track, as shown in FIG. 11, in an effort to evade degradation of the performance mentioned above, then the number of the CKD records as included will increase, resulting in that the number of memory accesses increases correspondingly.

(2) Problem of location of the track buffer

When the track buffer exists in the local memory of the channel processor itself and when the channel processor executes emulation of the CKD-to-FBA format conversion, as in the case of the known system, an increase more or less in the number of times the local memory is accessed provides no serious problem.

On the contrary, in the case of a large scale system for which the presence of a disk cache is a prerequisite, the track buffer is naturally secured on the cache memory. Transfer of the track image on the cache memory with a channel or with another track buffer involves significantly large overhead by itself. On the other hand, because the emulation of the CKD-to-FBA format conversion has to be executed on a real time basis during the data transfer with the channel, the emulation is performed by the channel path server (CPS) incorporated in the DKC which is in charge of controlling the data transfer with the individual channels. Thus, in order to find out a record of concern, each of the channel path servers or CPSs will have to frequently make access to the track buffer secured on the shared cache memory in the case of the known scheme.

The access to the cache memory is also performed from the disk device in addition to the channel path server (CPS). In this manner, the cache memory constitutes a so-called bottle neck in the system where the read/write operation is to be performed at a high speed. In other words, frequent access to the cache memory on a bit-by-bit basis provides by itself a cause for remarkable degradation in the data transfer capability of the inner bus. Thus, it is apparent that the read/write operation of the cache memory should preferably be accomplished with a single access even when the amount of data involved in the access increases more or less.

For the reasons described above, the score of the hitherto known system in which no consideration is made to the number of times of the access remains low. The conversion systems gaining higher scores than the known system are those which adopt the method <Case II-3> mentioned hereinbefore which is advantageous in respect to the number of the memory access times.

Next, discussion will be directed to methods of deleting the gaps and evaluation of the memory capacity. In this conjunction, it is assumed that a track image in the CKD format is developed on the cache memory (serving as the track buffer) before being recorded in a disk of the FBA format and evaluation is made as to difference in the memory capacity required for the development of the track image, inclusive or exclusive of the gaps, among the three methods described hereinbefore.

More specifically, when the track image of the CKD format is developed on the cache memory (track buffer) for storage in a disk of the FBA format, there are conceivable the following three methods in depending on whether or not the image development includes the gaps. They are:

Method <Case I-1>, according to which all the gaps inclusive of the inter-record gaps are deleted.

Method <Case I-2>, according to which the inter-field gaps are eliminated with the inter-record gaps being left.

Method <Case I-3>, according to which not only the inter-record gaps but also all the inter-field gaps are left (with the ECC and the padding data being eliminated).

In conjunction with each of the above-mentioned methods, the memory capacity (i.e., the number of blocks on the FBA disk) required for developing the track image of one track in the CKD format will comparatively be evaluated.

It should first be mentioned that the memory capacity for the development of the track image is always equal to that of the original image in the CKD format when the method <Case I-2> or <Case I-3> is combined with the track capacity check method <Case III-2> described hereinbefore (i.e., the method according to which the inter-record gaps are extended or stretched for a length corresponding to the inter-field gaps, and the ECC as well as the padding bytes are deleted to thereby maintain the relative position of the individual records from the starts of the track as they are in the original CKD track).

Accordingly, the following analyses will be made on the assumption that the adjustment of the gap length as mentioned above is not performed.

In the CKD format, the number of gaps depends on the number of records in one track as well as the presence or absence of the key field in the track. Thus, for evaluation of the requisite memory capacity, it is necessary to prescribe the track format factors such as the number of records contained in the track to be evaluated.

Figure 33:
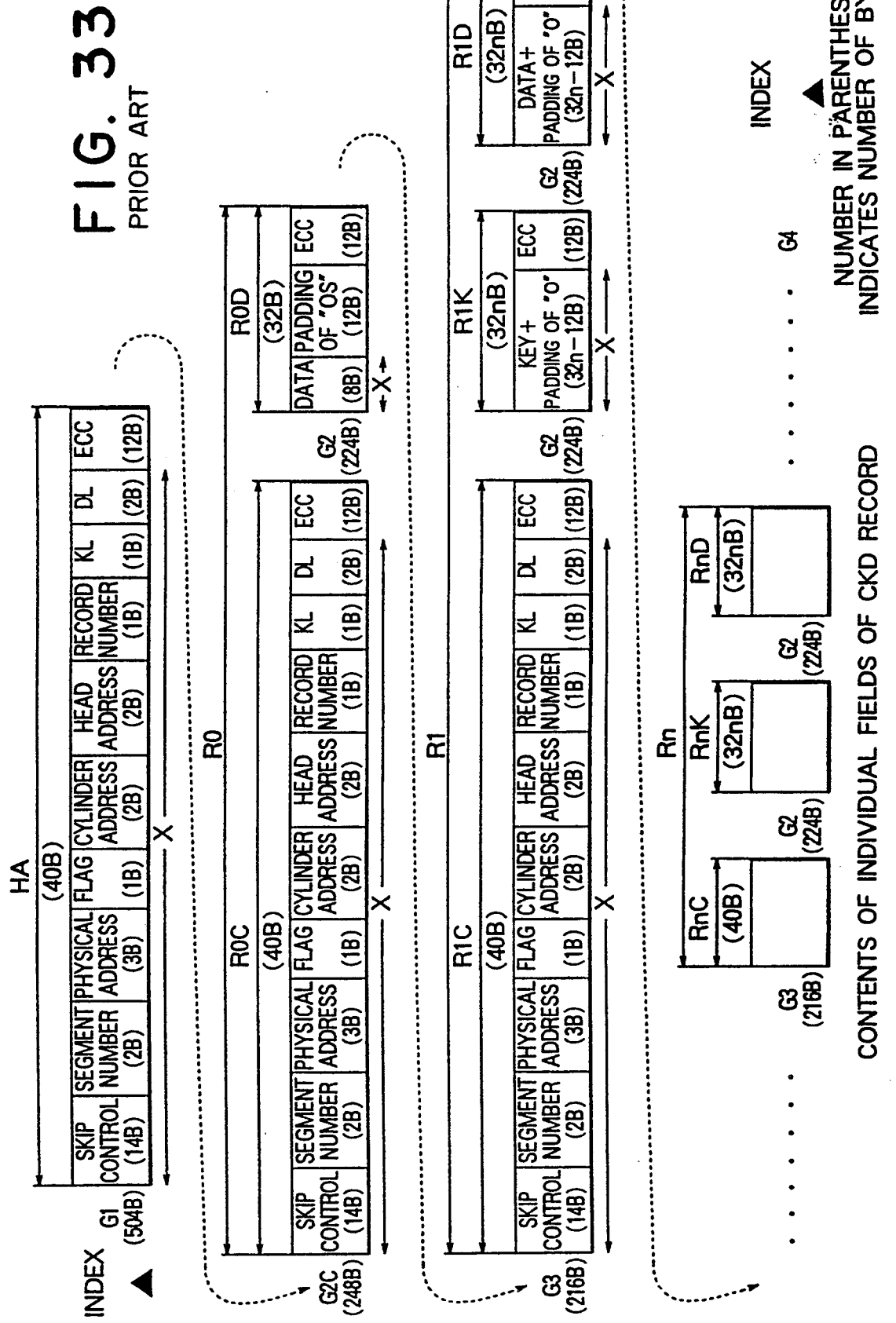
FIG. 33 is a view showing the field contents of a CKD record.
Figure 34:
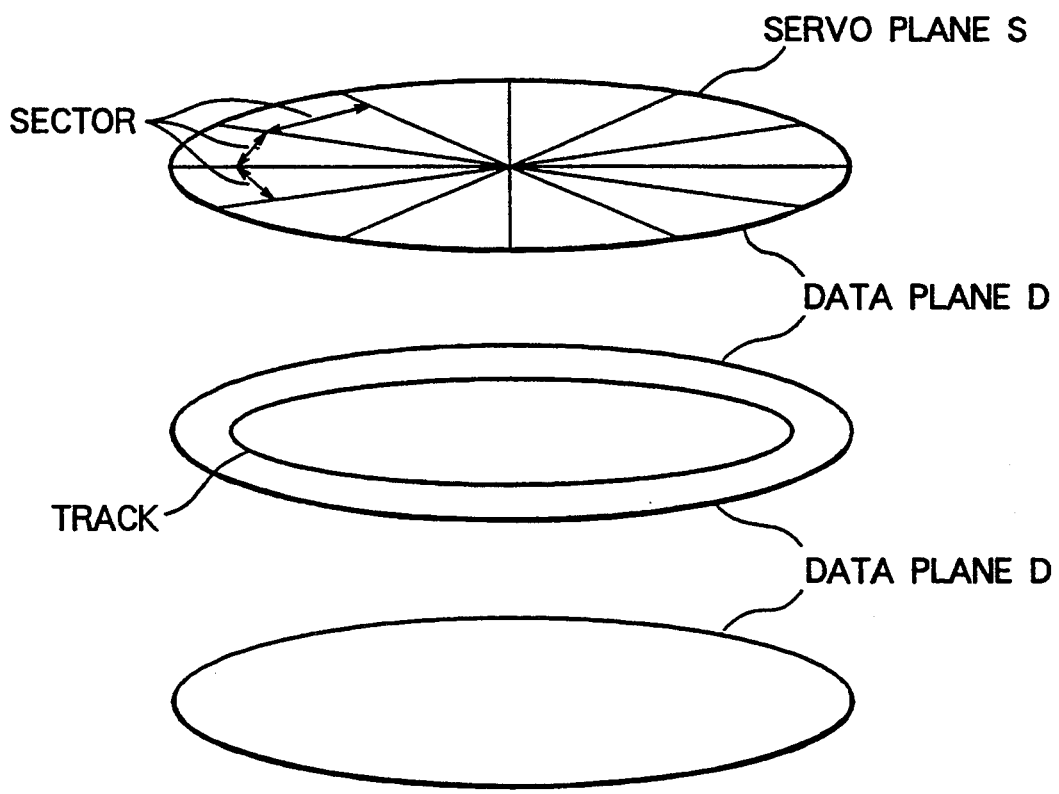
FIG. 34 is a schematic diagram of a magnetic disk drive in which a servo-plane servo system is employed.

For the purpose of illustration, let's suppose four exemplary cases shown in FIG. 12, which includes extreme cases where the record numbers are greatest and smallest, respectively, and standard cases as well. In any case, the CKD format such as shown in FIG. 33 is presumed. Calculation of the number of records per track in each case is performed, as illustrated in FIGS. 13, 14, 15 and 16.

Format 2 and format 3 listed in the table of FIG. 12 are defined on the basis of a work load type research of disk accesses, which is not described herein. Further, the record size of a journal file is ordinarily in a range of 200 bytes to 32 KB, wherein the most popular file size ranges from 200 bytes to 300 bytes. In the case of the example shown in FIG. 12, the journal file having a size of 200 bytes is presumed.

Estimation of the memory capacity is made on the conditions mentioned below.

(1) The track format as used is such as shown in FIG. 33.

(2) ECC of the individual field and "0" padding data for justification to the 32-B boundary are deleted.

(3) Home address field (HA), the count field and other parameters are all left as they are.

(4) The capacity or amount of control information for the CKD-to-FBA conversion such as the record position information is not subject to the estimation. The estimation of the capacity required for the control information is performed separately on the utterly different conditions.

After all, the estimation will be performed on the assumption that the contents of the individual fields excluding of the gaps on the memory are such as shown in an area indicated by "X" in FIG. 33. The number of records per track for each case of the estimation can be determined in such manners as illustrated in FIGS. 13 to 16.

The memory capacity estimations for the various gap deletion methods are as follows.

<Case I-1>

All the gaps inclusive of the inter-record gaps are deleted.

Format 1 (case of maximum record numbers)
Size of $HA = 40 - 12 = 28$
Size of $R0 = R0C + R0D = (40 - 12) + 1 = 29$
Size of $Rn = RnC + RnD = (40 - 12) + 1 = 29$
Accordingly, the capacity of one track is:

$$HA + R0 + Rn \times 93 = 28 + 29 + 29 \times 93 = 2754$$

Format 2 (typical of journal file)
Size of $HA = 40 - 12 = 28$
Size of $R0 = R0C + R0D = (40 - 12) + 8 = 36$
Size of $Rn = RnC + RnD = (40 - 12) + 200 = 228$
Accordingly, the capacity of one track is:

$$HA + R0 + Rn \times 68 = 28 + 36 + 228 \times 68 = 15568$$

Format 3 (paging, swapping, VSAM (Virtual Storage Access Method))
Size of $HA = 40 - 12 = 28$
Size of $R0 = R0C + R0D = (40 - 12) + 8 = 36$
Size of $Rn = RnC + RnD = (40 - 12) + 4096 = 4124$
Accordingly, the capacity of one track is:

$$HA + R0 + Rn \times 10 = 28 + 36 + 4124 \times 10 = 41304$$

Format 4 (case of minimum record numbers)
Size of $HA = 40 - 12 = 28$
Size of $R0 = R0C + R0D = (40 - 12) + 47988 = 48016$
Accordingly, the capacity of one track is:

$$HA + R0 = 28 + 48016 = 48044$$

<Case I-2>

The inter-field gaps are eliminated with the inter-record gap only being left (The ECC, the padding information, etc. are also eliminated). When the deletion of the inter-field gaps, ECC, and the padding is compensated for by extending or expanding correspondingly the gap length, the memory capacity remains utterly the same as in the case of the CKD format. Accordingly, no compensation for deletion of the inter-field gaps and so forth are not performed.

Format 1 (case of maximum record numbers)
Size of $HA = G1 + HA = 504 + (40 - 12) = 532$
Size of $R0 = G2C + R0C + R0D = 248 + (40 - 12) + 1 = 277$
Size of $Rn = G3C + RnC + RnD = 216 + (40 - 12) + 1 = 245$
Accordingly, the capacity of one track is:

$$HA + R0 + Rn \times 93 = 532 + 277 + 245 \times 93 = 23594$$

Format 2 (typical of journal file)
Size of $HA = G1 + HA = 504 + (40 - 12) = 532$
Size of $R0 = G2C + R0C + R0D = 248 + (40 - 12) + 8 = 284$
Size of $Rn = G3C + RnC + RnD = 216 + (40 - 12) + 200 = 444$
Accordingly, the capacity of one track is:

$$HA + R030 \ Rn \times 68 = 532 + 284 + 444 \times 68 = 31008$$

Format 3 (paging, swapping, VSAM)
Size of $HA = G1 + HA = 504 + (40 - 12) = 532$
Size of $R0 = G2C + R0C + R0D = 248 + (40 - 12) + 8 = 284$
Size of $Rn = G3C + RnC + RnD = 216 + (40 - 12) + 4096 = 4340$
Accordingly, the capacity of one track is:

$$HA + R0 + Rn \times 10 = 532 + 284 + 4340 \times 10 = 44216$$

Format 4 (case of minimum record numbers)
Size of $HA = G1 + HA = 504 + (40 - 12) = 532$
Size of $R0 = G2C + R0C + R0D = 248 + (40 - 12) + 47988 = 48264$
Accordingly, the capacity of one track is:

$$HA + R0 = 532 + 48264 = 48796$$

<Case I-3>

Not only the inter-record gaps but also all the inter-field gaps are left (with the ECC and the padding information etc. being eliminated as well). In this case, when the deletion of the inter-field gaps, ECC, and the padding is compensated for by extending or expanding correspondingly the gap length, the memory capacity remains utterly the same as in the case of the CKD format. Accordingly, no compensation for deletion of the inter-field gaps and so forth are not performed.

Format 1 (case of maximum record numbers)
Size of $HA = G1 + HA = 504 + (40 - 12) = 532$
Size of $R0 = G2C + R0C + G2 - R0D = 248 + (40 - 12 + 224 + 1 = 501$
Size of $Rn = G3C + RnC + G2 + RnD = 216 + (40 - 12) + 224 - 1 = 469$
Accordingly, the capacity of one track is:

$$HA + R0 + Rn \times 93 = 532 + 501 + 469 \times 93 = 44650$$

Format 2 (typical of journal file)
Size of $HA = G1 + HA = 504 + (40 - 12) = 532$
Size of $R0 = G2C + R0C + G2 + R0D = 248 + (40 - 12) + 224 + 1 = 508$ Size of
Rn=G3C+RnC+G2+RnD=216+(40−12)+224+200=668

Accordingly, the capacity of one track is:

$$HA+R0+Rn\times 68=532+508+668\times 68=46464$$

Format 3 (paging, swapping, VSAM)
Size of HA=G1+HA=504+(40−12)=532
Size of
R0=G2C+R0C+G2+R0D=248+(40−12+224+8=508
Size of
Rn=G3C+RnC+G2+RnD=216+(40−12)+224+4096=4564

Accordingly, the capacity of one track is:

$$HA+R0+Rn\times 10=532+508+4564\times 10=46680$$

Format 4 (case of minimum record numbers)
Size of HA=G1+HA=504+(40−12)=532
Size of
R0=G2C+R0C+G2+R0D=248+(40−12)+224+47988=48488

Accordingly, the capacity of one track is:

$$HA+R0=532+48488=49020$$

Figure 18:
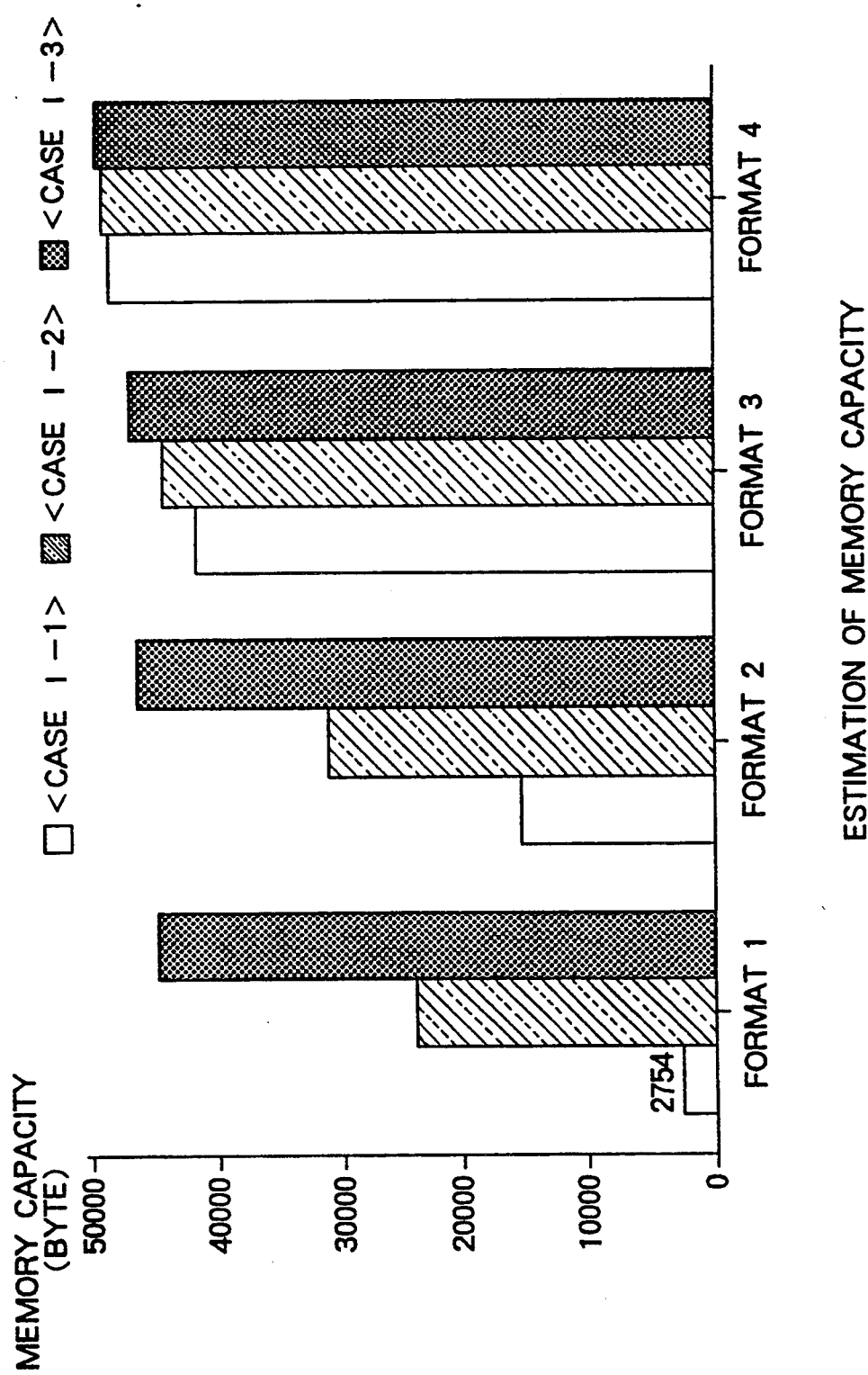
FIG. 18 is a view for illustrating graphically estimation of a memory capacity.

FIG. 17 shows the memory capacities occupied when the four track formats "Format 1" to "Format 4" are developed on the memory, respectively, in conjunction with the three types of gap deletion methods <Case I-1>, <Case I-2> and <Case I-3>. FIG. 18 is a graphical view showing the same.

As can be seen from FIGS. 17 and 18, the memory capacity as required increases, as the amount of the gaps to be left increases in any one of the track formats. In the case of the method <Case I-3>, all the gaps are left or retained. Accordingly, a memory capacity which is approximately equal to the capacity for the original CKD format is required in any one of the formats "Format 1" to "Format 4". Even in the case of the method <Case I-2> where the inter-field gaps are deleted, the requisite memory capacity is approximately same as in the case of <Case I-3>, when the track capacity check method is adopted in which the inter-record gaps are extended by a proportion corresponding to the inter-field gaps, ECC and the padding as deleted to thereby retain the relative positions of the individual records from the start of the track as they are in the original CKD track.

In contrast, in the case of the method <Case I-1> decrease in the memory capacity is remarkable particularly in the case of the formats "Format 1" and "Format 2" where the record is of small size. In the format "Format 1" containing 93 records, the memory capacity as required is only 1/6 or 1/17 of that required in the other formats. The memory capacity in "Format 2" is about ⅓ when compared with the memory capacity required in other formats.

Reduction or decrease in the memory capacity required for developing the track image, as described above, brings about numerous advantages or profits mentioned below (refer to FIG. 9).

(1) When the unit for management of the cache memory is selected to be a smaller unit (e.g. unit on the basis of which one data disk is written, which is equal to ¼ of one track or 12 KB) instead of one CKD track (ca. 48 KB), it is possible to write data of other track in a remaining area of the cache memory. Thus, with one and the same capacity of the cache memory, a greater quantity of track data can be held, leading to an enhanced availability of the cache memory and hence an increase in the hit ratio.

(2) Reduction or decrease in the data quantity for one track image means a corresponding reduction in the amount of data to be written in a physical disk. By way of example, when image data of one track is a half of the corresponding image data in the CKD format, the data transfer to the physical disks is accomplished by the data transfer to only the data disks 1 and 2 and the parity disk, while the data transfer to the data disks 3 and 4 can be spared unless the format write is of concern. This leads to reduction in the load imposed on a variety of internal buses in the subsystems.

It should however be noted that the area on the physical disk should be secured in conformance with an expected maximum quantity of data even when the memory capacity is reduced as described, because, if otherwise, the control will become much complicated. By way of example, let's assume that the track image on the memory is a half of the corresponding image in the CKD format, and that upon writing of that track image, other track data is written in an empty area. In that case, when the track is reformatted and the data amount of the track image is thereby increased, the latter can no more be written in consecutive areas on the disk and thus an empty area anywhere on the disk must be searched for the writing, which will of course involve complication in the control procedure.

When the data amount of the track image is reduced, it is of course preferred that a corresponding empty area on the physical disk can effectively be utilized. However, even in view of only the advantages (1) and (2) mentioned hereinbefore, reduction of the memory capacity is sufficiently attractive.

As will now be understood from the foregoing description of estimation of the memory capacities as required, the formatting with all the gaps being deleted is accompanied with a saving of the memory capacity several times as large as the formatting with all the gaps being retained, although it depend on the number of records involved in the formatting.

Now, description will turn to the estimation of the memory capacity for storing the record position information.

As the methods of determining the position of an aimed record (or record of concern), three methods <Case II-1>, <Case II-2> and <Case II-3> have been described, of which two methods <Case II-2> and <Case II-3> are adopted to hold or retain the control information indicating the record positions on the memory separately from the records themselves. In the following, estimation will be made to what degree the memory capacity (capacity of the FBA disk, to say in another way) is required for retaining the control information used for determination of the record positions in conjunction with the methods <Case II-2> and <Case II-3> while putting aside the method <Case II-1> from consideration.

Figure 19:
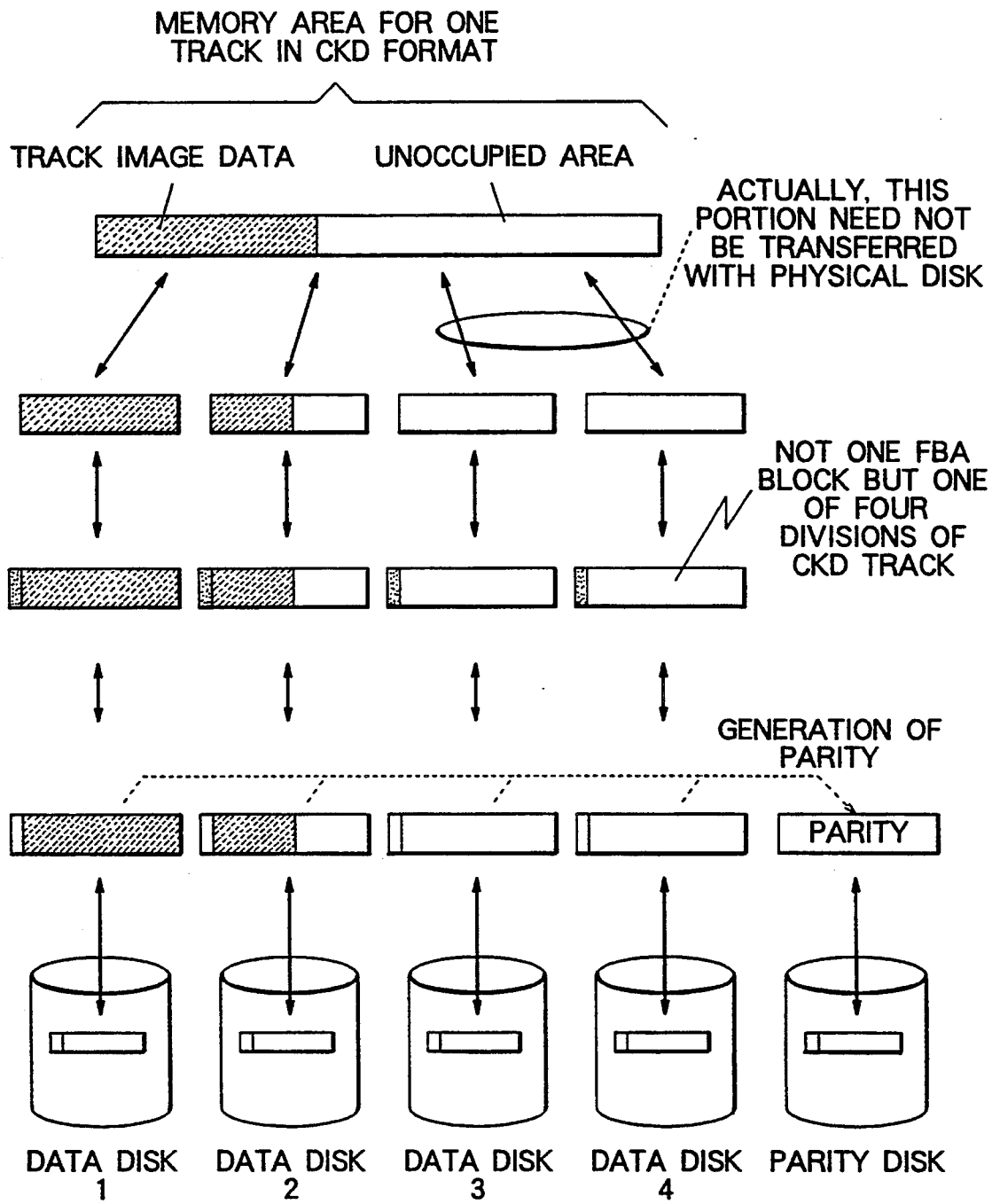
FIG. 19 is a diagram for explaining a merit when image data is decreased by an amount corresponding to one track.

In conjunction with the method <Case II-3>, there are two modes for carrying out the same, i.e., a mode in which the position information of all the records is retained en bloc at one location (e.g. at the start or forefront of the track) and a mode in which the record position information is held distributively among the individual FBA blocks (e.g. a mode in which information indicating position of a record is held at the start of a FBA block which includes that record). In the following description of the estimation, distributive holding of the record position information is assumed. The reason why estimation is not made for the case where all the record position information is held en bloc at a single location can be explained as follows. It is assumed that data of one CKD track is to be read from four data disks in an array type disk system such as shown in FIG. 19. In that case, even when data read from the disk storing an aimed record has been completed, it is nevertheless impossible to detect the storage position of the aimed record, whereby the data transfer with the host is inhibited from being started until data has completely been read out from the disk carrying the position information. As a result of this, unless the rotation synchronism can not be supported or when the synchronism is disturbed by a standby disk as added, the waiting time on an average will be increased.

As the conditions for the estimation, the following items are taken into consideration.

In the first place, it is presumed that information of 4 bytes mentioned below is held for each record:

Record ID No.: A record number of the CKD record as stored. This information is not necessarily required for the control in the method <Case II-2>. However, in the method <Case II-3>, this record ID number contained in the control information allows an aimed record to be detected at once without need for reading the count fields of the records one by one.

Sector value: The sector value for the CKD record as stored. With this sector value, comparison with a sector valued designated by the set sector command is made possible. Besides, on the basis of this sector value, the relative position of the relevant record relative to or from the start of the track and hence the consumed capacity can be determined. Since the sector is composed of seven segments, it is possible to arithmetically determine the segment numbers with the aid of the sector value. Namely, segment number=sector value×7.

Memory address: This is a byte address of the stored CKD record on the memory. With the memory address of 2 bytes, the memory can be addressed up to 64 KB. Accordingly, the memory address of 2 bytes is sufficient for the format shown in FIG. 33. The origin point of the address may be positioned either at the start of the CKD track or at the start of each FBA block which is a unit for management (management unit) for the position information without giving rise to any problem.

Furthermore, in conjunction with the management unit for managing the position information of the CKD record (i.e., unit for holding the record position information), estimation is made for two cases shown in FIG. 21.

In the above-mentioned two cases, the memory capacity is estimated which is required for storing the position information of the CKD records in conjunction with the methods <Case II-2> and <Case II-3>.

Results of the estimation are as follows.

<Case II-2>: Only the position information of the leading one of the records is held or retained.

In this method, only the position information for one record per management unit is retained independent of the size of the management unit of the position information. Accordingly, the memory capacity for the position information is 4 bytes for each management unit.

<Case II-3>: All the record position information is retained.

In the case of this method, the number of the CKD records capable of being stored in a management unit varies in depending on the size of the latter. Besides, the number of the CKD records which can be stored in the management unit differs as a function of the size of the management unit. Under the circumstances, the estimation will be made for the method <Case I-1> where all the gaps are deleted and where the number of the records is greatest of all the methods.

At this juncture, it should be noted that the minimum memory capacity per record is known to be 29 bytes from the size of Rn mentioned hereinbefore in "Format 1 (the case of maximum records of <Case I-1>)" in conjunction with the gap deletion method and evaluation of the memory capacity.

Accordingly, the maximum number NR capable of being recorded for each unit of management can be determined as follows:

$$NR = \{(\text{size of management unit}) - \alpha\} \div 29 \text{ bytes} \quad (1)$$

where $\alpha$ represents the memory capacity required for the position information.

The memory capacity $\alpha$ of the position information for each management unit can be determined by multiplying the record number NR by 4 bytes. Namely, $$\alpha = NR \times 4 \text{ bytes} \quad (2)$$

By solving simultaneously the above equations (1) and (2), $$NR = (\text{size of management unit})/33 \text{ (with decimal part being rounded off)} \quad (3)$$

Thus, by placing in the equation (3) the NR determined in accordance with the above expression (3), $\alpha$ can directly be determined. It should however be mentioned that the value of NR is "94" at maximum in the case of the track format shown in FIG. 33, because the number of records within one track can not exceed "94" (inclusive of R0).

The results are summarized in FIG. 22.

Figures 23, 24:
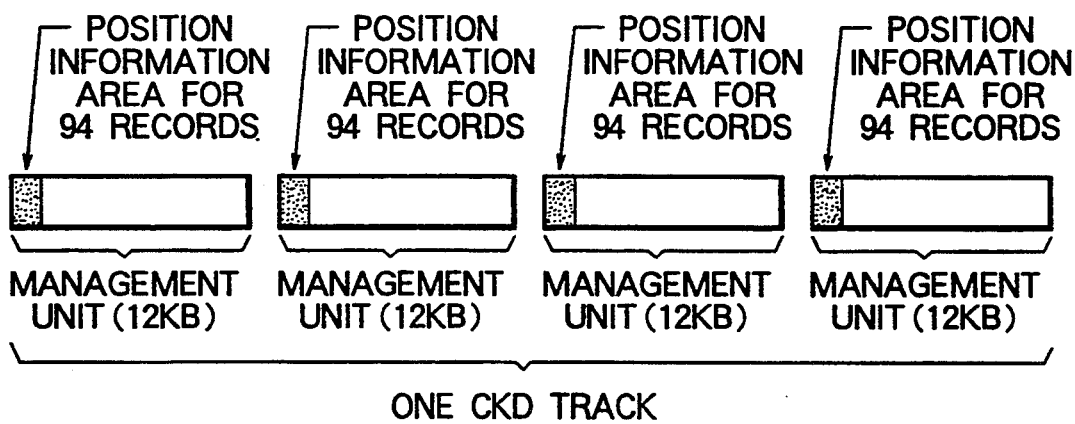
FIG. 23 is a diagram for explaining a maximum memory capacity required for records.
FIG. 24 is a diagram illustrating an example of the method of holding the position information.

As described previously in conjunction with the gap deletion method and evaluation of the memory capacity, the net memory capacity of a maximum value is required for storing the CKD record when the data field is longest in the track storing only one record (only R0). More specifically, the memory capacity as required in this case is such as shown in FIG. 23 for both HA and R0 on the assumption shown in FIG. 17.

When the capacity of the FBA disk to be prepared for one CKD track is 48 KB (=12 KB×4), the memory capacity which can be used for the control information can be determined as follows:

<Case I-1> 1024×48−48044=1108

<Case I-1> 1024×48−48796=356

<Case I-1> 1024×48−49020=132

As can be seen from comparison of these values with those shown in FIG. 22 (values listed in the rightmost column), there arises no problem of shortage of the memory capacity in the method <Case II-2> regardless of the size of the management unit.

In contrast, in the case of <Case II-3> where the management unit is of large size (12 KB) and the memory capacity for the position information is small (1504 bytes), the memory capacity which can be reserved for storing the position information is short of about 400 bytes when compared with <Case I-1> where the memory capacity for the records is minimum.

Since the method <Case II-3> is preferred over the known method (<Case II-2>) in that the number of memory accesses for searching the aimed record is small, some measures should be taken for coping with the above-mentioned shortage of the memory capacity. To this end, the measures mentioned below may be resorted to.

Measure 1: Capacity to be reserved for each physical disk is increased. By way of example, when the capacity is increased from 12 KB to 13 KB, the capacity capable of being used for one CKD track is then 52 KB, whereby the problem of capacity shortage can satisfactorily be solved. Of course, a physical disk of 52 KB/CKD track is required, involving a useless disk area when compared with the physical disk of 48 KB/CKD track. However, this method is a promising one in view of inexpensiveness (low cost) of the physical disk.

Measure 2: Quantity of control information required for one record is decreased. By way of example, when the quantity of control information is decreased from 4 bytes/record to 2 bytes/record, a total memory capacity required for the control information is 752 bytes, meaning that no shortage of the memory capacity occurs.

Measure 3: The number of control information is decreased. By way of example, in the case of the management unit 2 (of 12 KB in size), it is contemplated that each of four management units holds position information of 94 records at maximum. However, in reality, the maximum record number of "94" represents a total sum for four management units. Accordingly, it is believed that the total capacity required for the control information can be decreased by adopting some appropriate measure.

As is apparent from the foregoing analysis, results of the estimation of the memory capacity required for the record position information can be summarized below.

<Case II-2>: No shortage of memory capacity occurs, incurring no problem.

<Case II-3>: Some shortage of the memory capacity usable for storing the position information may occur in depending on the situations. Since the method <Case II-3> is advantageous in that the number of times for memory access involved in searching the aimed record is small, some measure for coping with the shortage of the memory capacity mentioned above should be devised.

Now, description will be turn to improvements of the control of the record position information.

The estimation methods described above suffer from problems mentioned below.

In the estimation of the memory capacity required for storing the record position information, it has been assumed that the storage area for the position information is secured in conformance with the maximum number of records capable of being stored in each unit for managing the position information of the CKD record (i.e., unit for holding the CKD record position information).

In more concrete terms, assuming that the size of the management unit is 12 KB, there can be recorded in that unit 94 CKD records at maximum, as shown in FIG. 24. Since the position information for one record is estimated to be 4 bytes, the size of the position information area for each management unit of 12 KB is estimated to be 376 bytes, because $$4 \text{ bytes} \times 94 = 376 \text{ bytes}$$

Since the track image of one CKD track is composed of four units for management each of 12 KB, the capacity required for storing the position information for each of the CKD tracks is $$376 \text{ bytes} \times 4 = 1504 \text{ bytes}$$

This means that the position information area for 376 records ($=94 \times 4$) is secured for each CKD track. In the case of the format shown in FIG. 33, the maximum number of records in one CKD track is 94 (inclusive of R0). Accordingly, even when the maximum number of records which can be held in each management unit of 12 KB is 94, there can arise no such situation in which 94 records are simultaneously held in all the units for management. Consequently, the area for the position information corresponds to 282 records ($=94 \times 3$).

This problem is ascribable to the fact that the position information area within the unit for record management is of a fixed size. Of course, the position information area of a fixed size can provide advantages mentioned below.

(1) Since the position information area which is to be skipped upon transfer of the data stored across the management unit is always of a fixed size, control for the data transfer is facilitated.

(2) Control for the format write operation is also facilitated because the memory area in which the CKD record can be written is fixed.

However, so long as the position information area is of a fixed size, it is indispensably required to select the area size so as to accommodate a maximum quantity of the position information. Consequently, in the case of the example mentioned above, the position information area corresponding to 94 records must be secured for each management unit.

In contrast, when the size of the position information area is made variable, such control can be realized that the position information area of a size required only for the actually recorded data is secured. In that case, however, the advantages mentioned above will basically be lost, giving rise to another problem. As will now be understood, although the size of the position information area in each management unit must necessarily be variable in order to decrease the total memory capacity required for the position information, it is important in that case to solve the problem described above.

Figure 25:
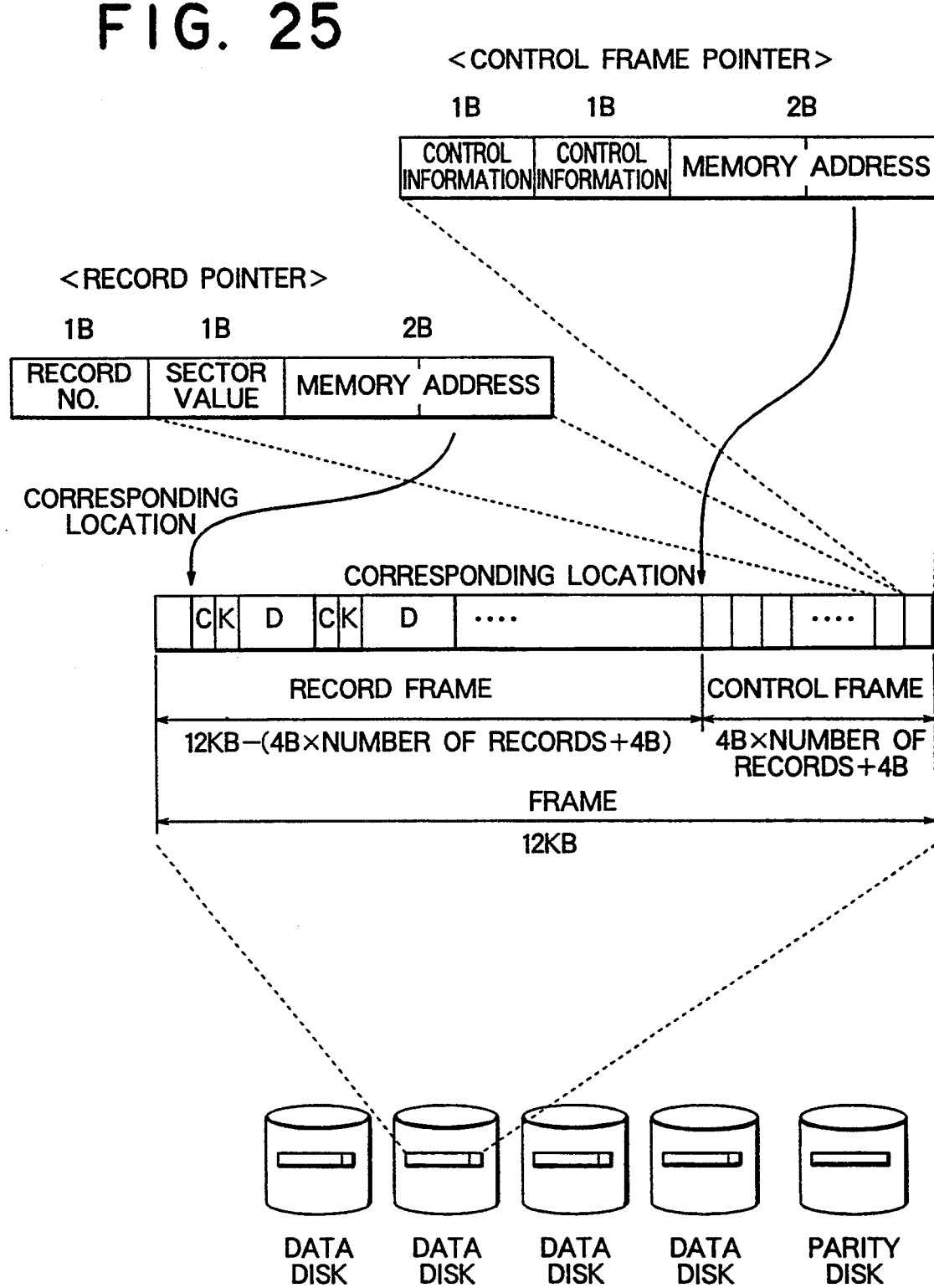
FIG. 25 is a diagram showing an improvement of a record position determining scheme.

FIG. 25 is a view for illustrating an improved method which is capable of making variable the size of the position information area according to an embodiment of the present invention. In the following, this improved method will be described by reference to this figure on the assumption that the size of the unit for management (management unit) of the record position information is 12 KB which is equal to the size of a unit of division for the data disks. This is because the efficiency is degraded when the size of the management unit is same as the block (sector) size of 1 to 2 KB of the FBA disk as in the case of the hitherto known scheme, as can be recalled from the description made hereinbefore in conjunction with the problems associated with the unit having the record position information.

In the following description, the management unit for the position information of the record is referred to as "frame", the area for recording or storing actually the CKD record is referred to as "record frame", the area for recording the control information is referred to as "control frame", and the position information of the record is referred to as "record pointer".

The improved method has features mentioned below.

(1) The record pointers are used only for the records actually stored. Thus, the size of the record pointer area for one CKD track is 376 bytes = 4 bytes × 94 at maximum.

(2) The size of the control frame including the record pointer is held separately as control information (shown as the control frame pointer in FIG. 25). Owing to this information, control is prevented from becoming complicated even when the size of the control frame is variable.

(3) The control information (control frame) is recorded at the rearmost end of each frame rather than at the leading end or start of the frame. Besides, the record pointers within the control frame are arrayed sequentially, starting from the rearmost end of the frame. (Consequently, for the records positioned closer to the start within the record frame, the corresponding record pointers are positioned closer to the rearmost end within the control frame.)

By virtue of the features mentioned above, the format write control can also be facilitated.

In the following, the intra-frame record positioning control method will be described in more detail in connection with actual read/write operations.

(1) In read/update write operation (a) When the frames are fetched from a physical disk to the cache memory, the CPS (Channel Path Server) reads the last control frame. In this conjunction, the size of the control frame can not be known until it has been read. Accordingly, as a temporary measure, a given number of bytes at the leading end of the frame are read out en bloc. (The number of bytes read at this time point need be selected to be an optimal value in consideration of the architectures of the CPS, cache memory and the bus.) By way of example, assume that the last 32 bytes of the frame are read out. In addition assume that most of the record sizes are of 4 KB. In that case, the number of records within one frame can not exceed three inclusive. This means that all the records pointers can be acquired with a single access to the cache memory.

(b) On the basis of the memory address of the last control frame pointer for the control frames as read out, decision can be made as to whether there are the control frames remaining to be read. If so, the CPS reads these control frames. In this way, the CPS can acquire all the record pointers with two memory accessed in the worst case.

(c) Subsequently, from the argument for search sent from the host computer and the record pointers as acquired, the memory address of an aimed record is detected, which means establishment of orientation.

(d) Before starting the data transfer with the host computer, the size of the count field, KL and DL is added to the memory address of the aimed record (the last memory address of the aimed record) and compared with the memory address indicating the start of the control frame in the control frame pointers. When the last memory address of the aimed record is partially contained in the control frame or intrudes the latter, or to this say in another way, the CPS interrupts or temporarily stops the data transfer with the host computer at a point before the control frame and advances or increments the memory address to the start of the succeeding frame, whereupon the CPS again starts the data transfer with the host system. On the other hand, in case the last memory address of the aimed record is accommodated within the record frame, the CPS can complete the data transfer of the aimed record without interruption of control mentioned above.

(e) When a command of the read/update write operation is issued by the host system in succession, the data transfer can be continued as it is without using the record pointer since the succeeding record exists continuously on the memory. It should however be mentioned that the comparison of the last memory address of the record with the start address of the control frame must be performed on a record-by-record basis.

(2) Format write operation (2.1) In the case where a record is additionally written in a same frame:

(a) When the frames are fetched from a physical disk into the cache memory, the last control frame is checked by the CPS.

(b) By checking the control frame pointers to acquire all the record pointers.

(c) Subsequently, on the basis of the argument for search coming from the host system and the record pointers as acquired, the memory address of the aimed record on the record is detected, which means that orientation has been established.

The procedure steps (a) to (c) described above are same as those involved in the read/update write operation.

(d) By checking the value of the count field of the write CKD supplied from the host system, decision is made as to whether or not a track overrun has taken place, procedure for which will be described in detail later on in connection with a track capacity checking method. Upon occurrence of the track overrun, the data transfer is performed up to a point of the track overrun, where the occurrence of the track overrun is messaged to the host system. Upon completion of the track overrun check, the CPS subtracts by 4 bytes the memory address indicating the start of the control frame in the control frame pointers held by the CPS itself (extension of the control frame by 4 bytes). Additionally, the record to be newly written is added to the start of the control frame held by the CPS.

(e) From the value of the count field of the write CKD, the last memory address of the record newly added is arithmetically determined and compared with the memory address in the control frame pointer updated in the step (d). In case the last memory address of the new record is partially contained in the control frame (i.e., intrudes the latter), the CPS once interrupts (temporarily stops) the data transfer with the host system before the control frame and advances or increments the memory address to the start of a succeeding frame, whereupon the data transfer with the host system is restarted. When the last memory address of the new record is accommodated within the record frame, the above-mentioned control is unnecessary. In other words, the CPS can complete the data transfer of the new record with the host system without interruption.

(f) When a CKD write command is issued in succession from the host system, the data transfer can be continued as it is without using the record pointer, since the succeeding record can be continued on the memory as well. However, in order to avoid occurrence of a track overrun, updating of the control frame pointer, addition of the record pointer, and the comparison of the last memory address of the record with the start address of the control frame must be carried out on a record-by-record basis.

(g) Upon completion of execution of the commands, the control frames updated and held by the CPS are written in the cache memory.

Figure 26:
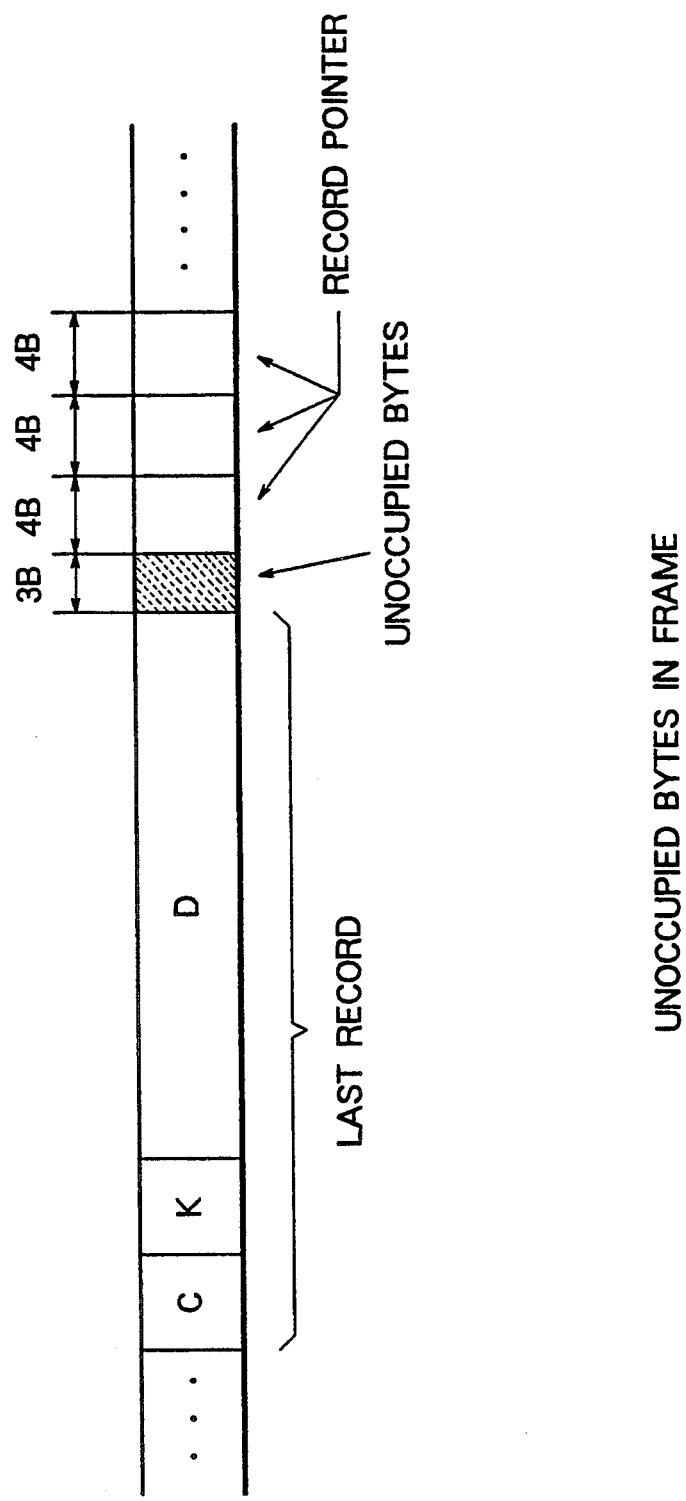
FIG. 26 is a diagram showing empty or unoccupied bytes in a frame.

In the case of a record frame shown in FIG. 26, there exists an empty area of three bytes (unoccupied bytes). In that case, if a record pointer is added in an attempt to add a record in the same frame, the record pointer intrudes the preceding record at a rear end portion. In other words, when the empty or unoccupied capacity of the frame is less than four bytes inclusive, any new record can not be added to the same record, but a succeeding frame must be used for the addition of the new record.

The empty bytes (less than four bytes inclusive) thus produced should preferably be included in the control frame for management in view of easiness of the control for skipping the control frame in the data transfer involved in the procedure step (e).

Thus, the memory address in the control frame pointer indicates the start address of the unoccupied area. An offset (of zero to four bytes) from the start of the unoccupied byte area to the start address of the record pointer is held as the control information in the control frame so that for acquisition of the record pointer in the procedure step (b), the start address of the record pointer can be determined by subtracting the offset value in the control frame pointer from the memory address.

(2.2) In the case where the record is written at first in a same frame:

When the frame is to be reformatted utterly from the start of the track or when record is written newly in a frame containing no record through the format write procedure, the CPS creates newly the control frame.

Accordingly, in this case, the procedure for establishing the orientation through acquisition of the control frame as described in conjunction with the procedure steps (a) to (c) in the section (2.1) is rendered unnecessary.

(d) The check of the track overrun is performed in the same manner as described in the section (2.1).

(e) Upon completion of check as to the track overrun, the CPS creates on a memory incorporated therein a control frame pointer (the start address of the control frame designates one record pointer) and writes the record pointer of a frame to be newly written at the start of the control frame which is held by the CPS.

(f) On the basis of the value of the count field of the CKD write command, the last memory address of the record to be newly written is computed and compared with the memory address in the control frame pointer generated at the above-mentioned step (e). When the last memory address of the new record intrudes the control frame, the CPS once stops the data transfer with the host system immediately before the control frame and restarts the data transfer after having incremented the memory address up to the start of the succeeding frame. So long as the last memory address of the new record is accommodated within the record framer the control mentioned above is unnecessary. Then, the CPS can complete the data transfer of the new record without interruption.

(g) When the CKD write command is issued in succession from the host system, same procedure as described in the section (2.1) is performed.

(h) upon completion of execution of the command, the new control frame held by the CPS is transferred to the cache memory.

In the format write processing, the size of the control frame can not be determined so long as the number of frames to be recorded in that frame is unknown. Accordingly if the control frame is placed at the start of the frame, it can not be determined where the writing of the first record is to be started in the frame. This problem can be overcome by writing the records sequentially from the start of the frame while writing the control frames sequentially from the last of the frame according to the teaching of the present invention.

Next, the memory capacity required for the position information in the improved method described above will be estimated.

In this conjunction, the management unit (or management unit) 2 shown in FIG. 22 will be considered.

In this case, it is assumed that the size of the management unit (frame) is 12 KB and that the number of records is 94 records per CKD track, in which case the position information or the record pointers are greatest. In this case, all the records can be accommodated within a first frame when all the gaps are eliminated although it depends on the gap deleting method as adopted (as described hereinbefore in conjunction with the gap deleting methods and evaluation of the memory capacity). According to the improved method taught by the invention, 94 record pointers and one control frame pointer are accommodated within the first control frame while any other frames have no control information of any sort (to say more properly, any other frames are rendered unnecessary). Thus, the memory capacity required for the control of the position information is:

4 bytes×95=380 bytes

FIG. 27 shows comparison of the results obtained in accordance with the improved method with the results of the estimation described hereinbefore in conjunction with the method of estimating the memory capacity required for storing the record position information.

In FIG. 27, the record position determining scheme <Case II-2> known heretofore is shown, according to which only the position information of the record located at the start of each FBA block (each frame in this case) is retained. On the other hand, according to the scheme <Case II-3>, the position information of all the records is retained. What is concerned here is the case labeled "<Improved Case II-3>".

As pointed out hereinbefore in conjunction with the estimation of the memory capacity required for the record position information, the net memory capacity for recording the CKD record assumes a maximum value, when one track contains only one record (only R0) and when the data field thereof is of the greatest length.

FIG. 28 is a view showing a table listing the maximum memory capacities in dependence on the gap deletion methods, which are recited from the table shown in FIG. 23.

Assuming that the capacity of a FBA disk prepared for one CKD track is 48 KB (=12 KB×4), the memory capacity which can be used for storing the control information is as follows:

In the <Case I-1>, 1024×48−48044=1108.

In the <Case I-2>, 1024×48−48796=356.

In the <Case I-3>, 1024×48−49020=132.

Comparison of these capacities with the memory capacity of 380 bytes for the position information in the <Improved Case II-3> shows in appearance that shortage or deficiency occurs in the memory capacity except for the method <Case I-1> where all the gaps are deleted. It should however be noted that the values shown in FIG. 27 are those when the number of records is 94 with the memory capacity for the position information (control frame) being greatest, while the values enumerated above are those when one track contains one record with the memory capacity for the CKD record being maximum. According to the improved method, the memory capacity of the control frame diminishes in proportion to the decrease in the number of records, and in the case where one track contains one record, the demanded memory capacity amounts to only 20 bytes (with one record pointer and four control frame pointers).

In conclusion, it is safe to say that according to the improved method of the present invention, no shortage or deficiency occurs in the memory capacity in any one of the <Case I-1>, <Case I-2> and <Case I-3>. (It should however be mentioned that in the case of the track capacity check method <Case III-3> in which gap adjustment is adopted for compensating for the deletions of the ECC and the padding data for retaining the relative positions of the individual record in the CKD format, shortage of the memory capacity may occur.)

Further, one or most two memory accesses are sufficient for the purpose of determining the position of the aimed record. In that case, once the CPS has acquired the control frame from the cache memory, the memory access is no more required in the succeeding control procedure, because the control frame as acquired may be used to this end. Further, in the case where the intra-frame record structure has undergone a change as a result of the format write operation, then the control frame acquired by the CPS may be correspondingly updated to be finally transferred to the cache memory.

The control of the control frames in the course of the data transfer with the host system and the control involved in the format write operation can be effectuated simply by checking the memory address in the control frame pointer held in the CPS. Since such control can be executed during a period corresponding to the inter-record gap, no overhead will be involved.

It is thus believed that an object of the invention can be achieved by the improved method described above.

Next, discussion will turn to a method of checking the track capacity by using the segment number.

As three features which characterize the CKD-to-FBA conversion method, there have been enumerated
<I> the gap deleting method,
<II> the record position determining method, and
<III> the track capacity checking method.

In the following, control procedure involved in the track capacity check method <III> mentioned above will be described in conjunction with the method of checking the track capacity by using the segment identification (ID) number in the <Case III-3>.

Parenthetically, there are conceivable three methods <Case III-1>, <Case III-2> and <Case III-3> concerning the track capacity checking method <III>.

Figure 29:
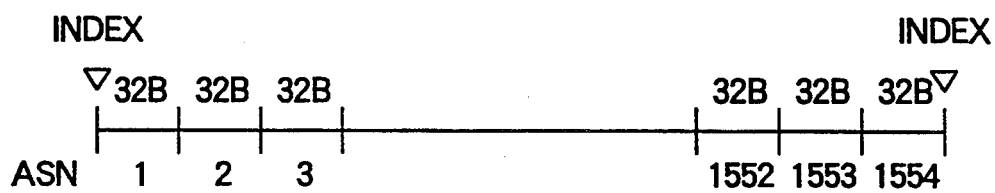
FIG. 29 is a view for explaining the segment number of E1880 series.
Figure 35:
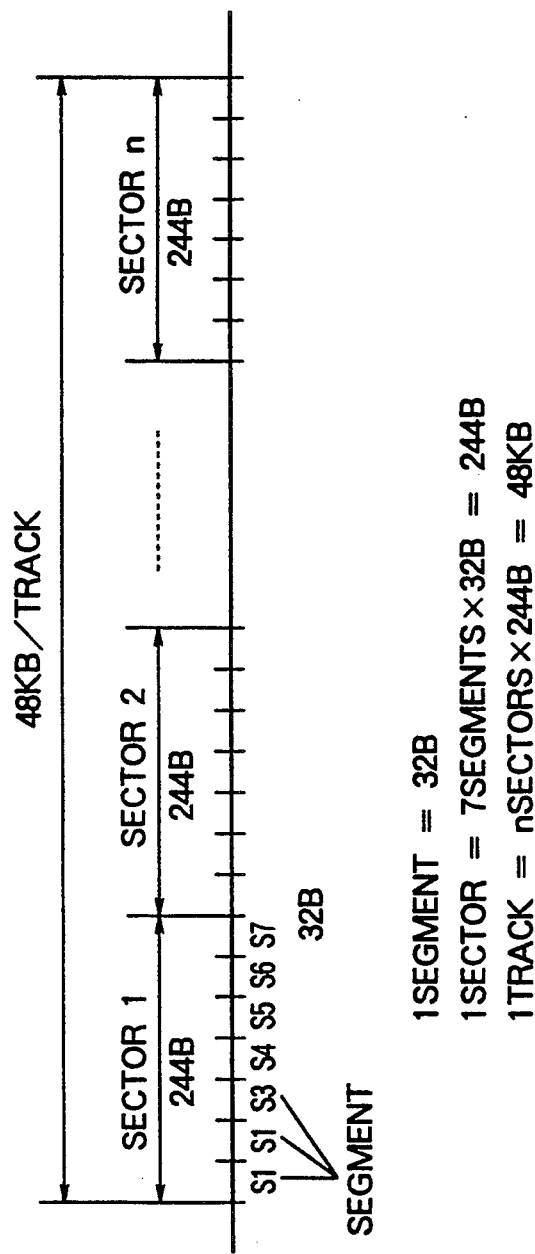
FIG. 35 is a view for illustrating relations among a track, a sector and a segment.
Figure 36:
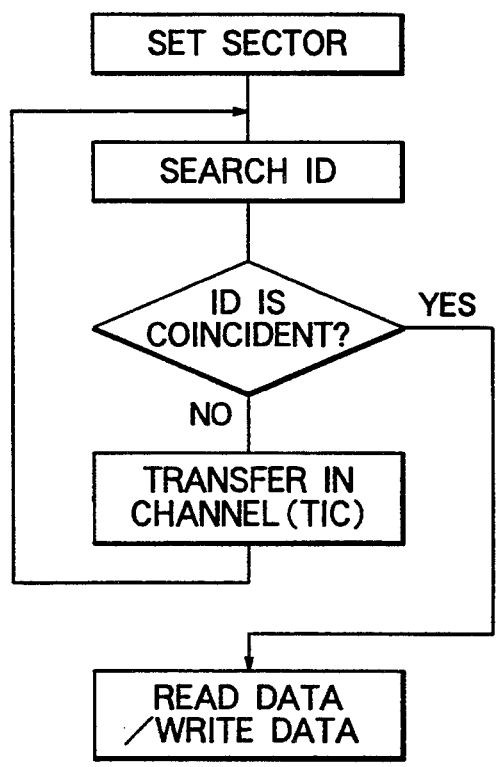
FIG. 36 is a view which shows, by way of example, a command sequence issued by a conventional software in accordance with a CKD record scheme.
Figure 37:
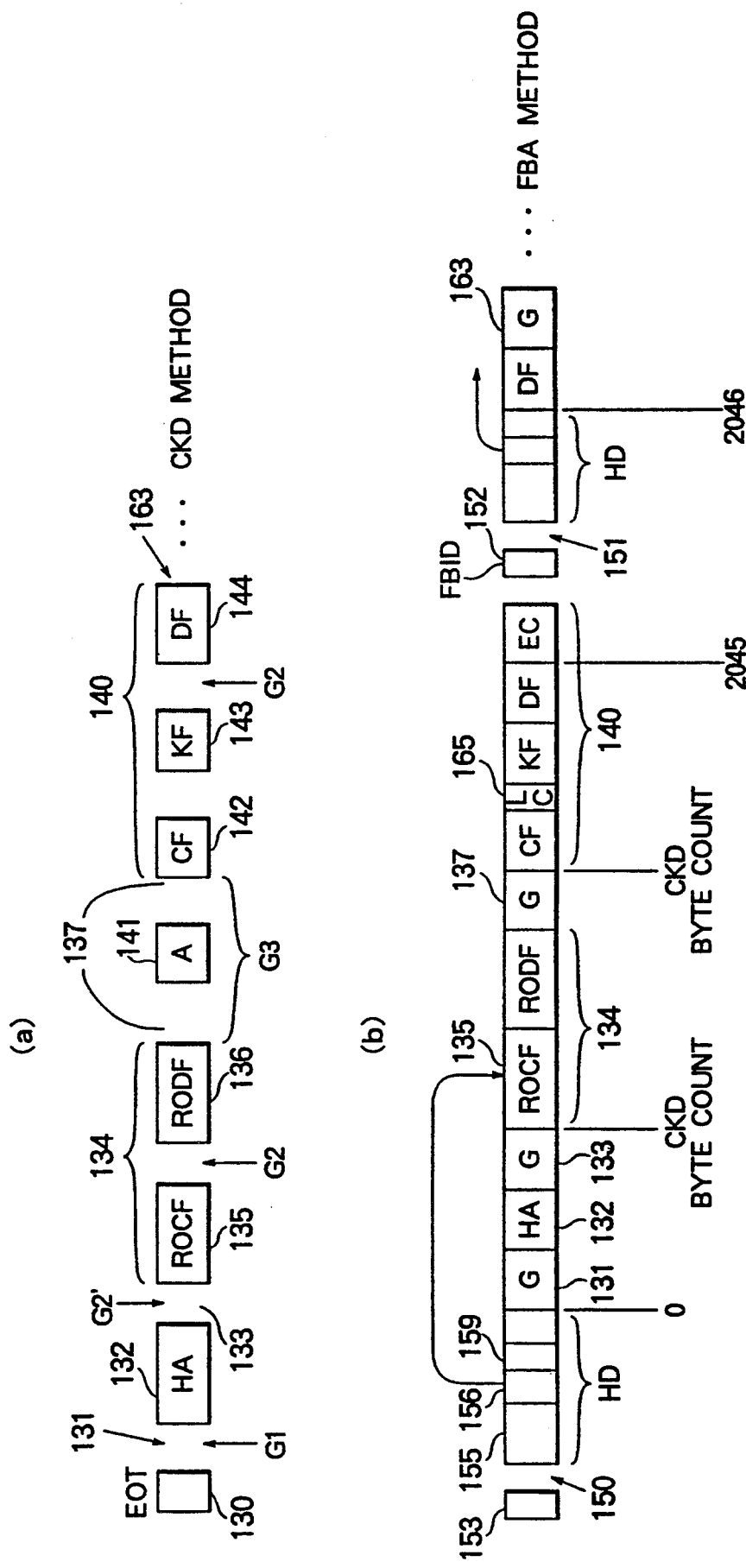
FIG. 37 shows a prior art relationship of inter-record gaps in FBA blocks.

In the first place, as the prerequisite conditions, it is assumed that one segment consists of 32 bytes, as shown in FIG. 35, the segment numbers are absolute segment numbers (ASN) assigned serially, starting from "1", as shown in FIG. 29, and that the numerals as used are all decimal notation.

Now, the control method or procedure will be described by assuming as the basic conditions that:

(1) because the segment number of the home address HA can be read/written from Software (S/W), two cases where the home address HA is in the ordinary position (ASN=17) and the home address HA is moved (ASN=23), respectively, can be supported, and (2) because neither the segment number nor SC (skip control) can be issued from the S/W for the other records containing R0, there is required no control for "move" and "split".

(1) Method of allocation of the segment numbers

In the light of this, the segment numbers are imparted to the individual records in such manners as mentioned below.

(a) In accordance with the absolute segment number converted from the value written from the S/W, the segment number ASN of HA is either "17" or "23" (with the ASN being equal to "17" upon initialization).

(b) The segment number ASN of R0 is always equal to "26" regardless of the segment numbers of HA.

(c) The segment number for the records (Rn) succeeding to R1 are determined as follows:

In case the key field is present in a preceding record (Rn−1), $$ASN \text{ of } Rn = ASN \text{ of } Rn-1 + [(KL+12)/32] + [(DL+12)/32] + 22.$$

In case the key field is absent in the preceding record (Rn−1), $$ASN \text{ of } Rn = ASN \text{ of } Rn-1 + [(DL+12)/32] + 15.$$

In the above expressions, "12" is a byte number of the ECC and the space, "32" is a byte number of the segment, "23" is a number of segments in the gaps G2 (224 bytes), G2 (224 bytes), G3 (216 bytes) and the count field (40 bytes), "15" is a number of segments in the gaps G2 (224 bytes) and G3 (216 bytes) and the count field (40 bytes), wherein the parentheses indicates the rounding off of the decimal parts.

(2) Method of checking the track capacity (track overrun)

On the basis of the segment number determined in the method (1) and the KL and DL supplied from the host system, the track overrun is checked in accordance with the conditions given by the following expressions. If the conditions mentioned below is satisfied, there is no problem and if otherwise, it is then decided that the track overrun occurs.

When the key field is present in the record (Rn) to be added,

*ASN* of
$Rn + [(KL+12)/32] + [(DL+12)/32] + 14 \leq 1533$, and when the key field is absent in the record (Rn) to be added, $ASN$ of $Rn + [(DL+12)/32] + 7 \leq 1533$ where "14" is the segment number of G2 (224 bytes), "7" is the segment number of G2 (224 bytes), "1533" is a maximum segment number, and " " indicates the round-off of the decimal part.

The track overrun check procedures in the format write operation can be summarized as follows.

In accordance with the method (1), the segment number of the record to be added is determined. On the basis of the value of the segment number as determined and KL and DL supplied from the host system, it is checked in accordance with the method (2) whether or not the addition of the record to be written brings about a track overrun.

The expressions mentioned in association with the methods (1) and (2) are valid, regardless of whether the HA (home address) moves or not. In other words, regardless of whether or not HA has moved on the virtual CKD track and regardless of the value of SC (abbreviation of skip control) in HA, all defects are located at the rearmost part of the track, as is shown in FIG. 30.

By virtue of the control described above, the track overrun check can always be performed by resorting to the same method without taking into account the value of SC (skip control). Thus, the control can be much simplified.

In case R0 is displaced in accompanying the move of HA, it will become necessary for the track overrun check to read out the segment number of HA at the start or forefront of the track or otherwise to hold for management the SC (skip control) in each record as in the case of the actual disk.

Basically, in the format write operation, the jobs performed during the gap such as the track overrun check according to the method (2) tend to become voluminous. Accordingly, what can be simplified should be.

As is apparent from the foregoing, the method <Case III-3> for checking the track capacity by using the segment number can be realized through relatively simple control.

Accordingly, differing from the hitherto known method <Case III-2>, the byte positions of the individual records relative to the forefront of the track need not be maintained as they are in the original CKD track by adjusting the gap length after conversion of the track image of the CKD format to that of the FBA format.

Since the segment number itself has to be supported in the S/W interface (at least for HA), the method <Case III-3> which positively utilizes the segment number is remarkably advantageous in respect to the utilization efficiency or availability of the cache memory when record size is small as compared with the method <Case III-2> in which the gaps corresponding to those existing in the original CKD format must be retained, as suggested hereinbefore in conjunction with the gap deleting method and evaluation of the memory capacity.

Further, the method <Case III-3> is excellent in respect to the number of memory access times over the method <Case III-1> in which KL and DL of all the records are read out to calculate the remaining track capacity. Thus, the method <Case III-3> is considered most preferable and profitable.

The CKD-to-FBA format conversion schemes were examined with regards to the three features:
<I> gap deleting method,
<II> record position determining method, and
<III> track capacity checking method.

Concerning the gap deleting method <I>, the memory capacity was evaluated through the procedure described hereinbefore in conjunction with the gap deleting method and the memory capacity evaluation. As a result of this, it has been found that the conversion method or scheme <Case I-1> in which all the gaps are deleted is advantageous.

Concerning the record position determining method <II>, the memory capacity for holding the position information was evaluated by resorting to the two record position information holding methods also described hereinbefore in conjunction with the estimation of the memory capacity for the record position information. As the result, it has been found that the method <Case II-3> in which all the record position information is retained and which is considered to be advantageous in respect to the number of memory access times over the method <Case II-2> where only the position information of the first record in the FBA block is retained requires excessively large memory capacity for holding the record position information. Accordingly, it was examined whether or not the method <Case II-3> can be improved in such manner as described hereinbefore in conjunction with the improvement of the record position information control method. This examination showed that by adopting an appropriate control method, the memory capacity for holding all the record position information in the method <Case II-3> can be diminished sufficiently.

Concerning the track capacity check method, the possibility of realizing the scheme <Case III-3> in which the relative position information of the individual records in the CKD format is held by using the segment numbers, etc., and which is advantageous in that the gaps are not used was examined in the same manner as described hereinbefore in conjunction with the method of checking the track capacity by using the segment numbers. As the result, it has been found that the track capacity check by using the segment number can easily be carried out. The procedure to this end has been described previously.

On the basis of the results of the examinations described above, it has been determined that the <1, 3, 3>-type format conversion method which has gained the highest score, as shown in FIG. 19, should preferably be adopted.

According to this conversion scheme, all the gaps are deleted. Consequently, a relatively small memory capacity is sufficient for storing the track image particularly when the record is of a small size as in the case of the journal file. Further, because all the record position information is held, the number of times the access is to be made to the memory for searching the record of concern can be decreased. It is however noted that the method <Improved Case II-3> described hereinbefore in conjunction with the improvement of the record position information control should be adopted in order to reduce the memory capacity required for holding the position information. Since the segment number is used for checking the track capacity, there is no necessity of providing the gaps for retaining the relative positions of the individual records as they are in the CKD format. The method of deleting all the gaps can be adopted in combination.

In the following, other conversion methods which have gained high scores will be described in comparison with the <1, 3, 3>-type format conversion.

<2, 3, 2>-Type Format Conversion (scored 54 points)

In the case of the <2, 3, 2>-type conversion scheme which marked the second highest score, as shown in FIG. 9, the segment number is not used in the track capacity check method, while the relative positions of the individual records in the CKD format are maintained by adjusting the gap size as in the case of the hitherto known method. Accordingly, all the gaps can not be deleted but a part of the gaps are necessarily left.

An advantage of this <2, 3, 2>-type format conversion is seen in that because the relative positions of the individual records are maintained as they are in the CKD format, it is unnecessary to arithmetically determine the segment number or to check thereby the track capacity upon format write operation, which in turn means that the segment number can also be omitted.

On the other hand, a disadvantage of this conversion method is seen in that because the relative positions of the records in the CKD format are maintained by extending the gap lengths, the track capacity on the memory always corresponds to approximately one CKD track, which leads to degradation in the utilization efficiency of the cache memory and increase in the load of the inner bus in staging/destaging operation, particularly when the record size is small as in the case of the journal file. Besides, because the method of holding the position information of all the records is adopted in combination as the record position determining method, there arises a possibility of shortage in the memory capacity in case where the record size is smallest with the greatest record number of 94 records per track, even when the improvement described hereinbefore in conjunction with the method of checking the track capacity using the segment number is adopted.

It should further be pointed out that although this conversion method differs from the known one in respect to the record positioning scheme, the track capacity check method can remain same as that used in the known method.

<2, 3, 3>-Type Format Conversion (scored 53 points).

This conversion scheme is same as the <1, 3, 3>-type conversion except that the gaps are partially left. However, since the gaps as left are not used for any purpose, it is meaningless to leave the gaps. Accordingly, when compared with the <1, 3, 3>-type conversion, this method is not worthy to be adopted.

In the foregoing description of the <1, 3, 3>-type conversion, the array type disk system (RAID) was assumed as the prerequisite. It should however be understood that the <1, 3, 3>-type format conversion can equally be adopted in association with the ordinary disk system.

In this case, concerning the gap deleting method, it is noted that reduction of the requisite memory capacity owing to deletion of the gap leads to enhancement of the utilization efficiency of the cache memory even in the ordinary disk system as in the case of the RAID system. Accordingly, the method <Case I-1> of deleting all the gaps should be adopted in the <1, 3, 3>-type format conversion as well.

Concerning the record position determining method, it is preferred to transfer the data of a relatively large amount through a single bus acquisition in order to increase the transfer rate while mitigating the load imposed on the bus. In other words, access capability to the record position information en block is preferred over the access to the count filed on a record-by-record basis. Consequently, as the record position determining method, the <Case II-3> method of holding the position information of all the records is preferred over the known method <Case II-2> where only the position information of the first or leading record in the FBA block.

In connection with the track capacity check method, the method which can render the gaps unnecessary is preferred in view of high utilization efficiency of the cache memory even in the other disk systems than the RAID system. Accordingly, the method <Case III-3> where the relative position information of the individual records in the CKD format is held by using the segment number with no gaps being left is preferred over the known method <Case III-2> where the relative positions of the individual records in the CKD format are maintained on the memory by adjusting the gap size.

Next, discussion will turn to command emulation in the CKD-to-FBA conversion for each of commands typical in the actual S/W interface.

1. SET SECTOR Command

<Function>

Sector information of one byte is received from a channel to search a sector. (Sector information: X'00'~X'DD', X'FF' which represents hexadecimal digits)

<Realization>

In the disk subsystem, the sector value is used for determining which of the frames resulting from division of the CKD track by four contains a record of concern (or aimed record).

After detection of the frame, the sector value is compared with the segment numbers of the individual records written in the record pointers contained in the control frame, to thereby assure the position determination with higher accuracy. Outlines of the frame as well as the control frame and the record pointer are illustrated in FIG. 25. For more particulars thereof, reference may be made to the description made hereinbefore concerning the improvement of the method of controlling the record position information.

(a) Determination of the frame where an aimed record is present

In a disk using CKD format, as opposed to emulating CKD, one sector consists of 224 bytes. Accordingly, on the basis of the sector value, the corresponding absolute byte address on the track in the CKD format can be calculated at once. However, since the gaps, ECC and the padding data are deleted in the frame, it can not be determined which of the frames contains the absolute byte address unless the deleted bytes are taken into account. The amount of deletion also depends on the number of records.

The following description is directed to determination of the frame in which the record of concern is present.

Unless the details of the track format in the frame are known, it can not be determined how many bytes have been deleted from the track of CKD format in the frame. For convenience sake, a format shown in FIG. 33 is considered. In this case, the number of bytes deleted on a field-by-field basis is such as shown in FIG. 31 in the frame.

Since there exist a number of records (equal to the record ID number of the aimed record minus one) in precedence to the aimed record exclusive of R0, the position on the track of CKD format as indicated by the sector value corresponds to a position in the frame which is indicated by a byte number (byte count) BC1 from the forefront of the track, the byte number BC1 being determined as follows:

$$BC1 = 224 \times \text{sector value} - 1038 - 752 \times (\text{record number} - 1)$$

For storing the records, there are required in the frame a number of record pointers which corresponds to the number of records inclusive of R0. Since it is assumed that one record pointer consists of four bytes, the byte number BC2 inclusive of the pointer bytes is determined as follows:

$$BC2 = BC1 + 4 \times \text{record number}.$$

Since one frame can record therein bytes in a number of (12 KB − 4 bytes) inclusive of the record pointers except for four bytes for the control frame pointer, it can be expected that the position corresponding to the set sector value is located in N-th frame which is determined as follows:

$$N = [BC2/12284]$$

where "[ ]" represents round-up of a decimal part.

The above expressions can be rewritten as follows:

$$N = [(224 \times \text{sector value} - 286 - 748 \times \text{record number})/12284]$$

where the "[ ]" represents round-up of a decimal part. When N is a negative value, it is considered that N assumes "1".

The above expression represents only a rough estimation because the number of bytes deleted in the frame differs in dependence on whether or not the key field exists in each record as well as the number of the bytes of "0s" padded to KL and DL so that they includes each a number of bytes corresponding to an integral multiple of "32".

Since the above expression is defined such that the number of bytes deleted becomes maximum for an indeterminate part, the ID number of the frame exhibits a tendency to occupy a position close to the forefront than the actual position. Under the circumstances, when the aimed record can not be found in the frame determined in accordance with the above expression, then a succeeding frame is searched for the aimed record.

However, concerning the accuracy of the above expression, there arises practically no problem since the frame is originally 12 KB in size, whereas error is on the order of 286 bytes (=224+31+31) for one record at maximum.

When the record number is not available because the SEARCH command represents a SEARCH KEY command, identification of the frame is given up, and a procedure of checking the segment numbers of the records contained in the frame for which the staging has first been completed is performed, as will be described below.

(b) Search of aimed record

When the frame in which the aimed record is included has been specified through the procedure described above, then the record pointers with the frame is checked to find out the aimed record. For further detail of the procedure to this end, reference may De made to the description concerning improvement of the control for the record position information made hereinbefore.

At first, the sector values recorded in the record pointers are checked in a sequential order, starting from the record pointer of the leading record in the frame (note that this record pointer is located at the rearmost end in the case of the control frame), to thereby find a record pointer of a first record which has a greater sector value than that received from the channel. When all the records in the frame have the respective sector values smaller than that received from the channel, the similar search is performed for a succeeding frame.

Upon finding of the record pointer of the first frame which meets the imposed conditions, then an argument of a SEARCH ID command is compared with the count field of that record. When coincidence is resulted from the comparison, orientation to that record is established. When no coincidence is found, the comparison with the count field of the succeeding frame is performed. This comparison is repeated until a first record which coincides with the argument is found. After establishing orientation to the first record for which the coincidence has been found, processing proceeds to a next command. Concerning the processing to be performed when no record is found which coincides with the argument even after the search performed to the last of the logical track in the CKD format, description will be made later on.

Parenthetically, when it is known that the aimed track exists on the cache memory as a result of bit check performed precedingly in response to a SEEK command (i.e., when hit), the processing may immediately proceed to a next command. However, when mishit is resulted or when only a portion of the track as hit exists on the cache memory with the frame containing the aimed record being absent on the cache, only a channel end (CE) signal is fed back, whereupon the channel is once disconnected. Subsequently, after the aimed frame is staged from the physical disk, a device end (CE) signal is sent back, whereupon the processing proceeds to a next command.

2. SEARCH IDENTIFIER EQUAL (SEARCH ID EQ Command)

<Function>

Search information of 5 bytes is received from the channel and compared with CCHHR of the count field (inclusive of the R0 field) read out from the device.

<Realization>

(a) In the case where this command is chained from the SET SECTOR command:

Through the procedure described in the section titled "1. SET SECTOR Command", orientation is established to the record for which coincidence of CCHHR has been found.

In the case of the actual CKD disk, when discrepancy of CCHHR is found for the record first encountered in execution of the SET SECTOR command, a discrepancy message is issued (CE, DE), whereon reissuance of the SEARCH ID EQ command from the host by using a transfer-in-channel (TIC) is waited for. In contrast, in the case of the subsystem now under consideration, the whole track is searched in response to one SEARCH ID EQ command as described hereinbefore in conjunction with the SET SECTOR command. For strictness of emulation, the search of only one record should be performed with a single SEARCH ID EQ command. However, in view of high efficiency of the processing, the en-block search described in the preceding section "1. SET SECTOR Command" may better be adopted.

Unless the record for which coincidence is found is present in succession to the sector designated by the SET SECTOR command, discrepancy message (CE, DE) is issued if a multi-track bit is set. However, when the record itself is absent, processing is switched to the succeeding track. When the aimed record is not found after the sector designated by the SET SECTOR command (including the case where the record itself is not present) and when the multi-track bit is not set, return is made to a first record (including R0) of the first frame of the same track, whereon the comparison processing is repeated. Unless the record hitting the coincidence is nevertheless found, the message of "No Record Found" is issued.

(b) In case the command is chained from READ, WRITE, SEARCH or the like command or SPACE COUNT command:

The comparison with CCHHR is performed for a record succeeding to that for which orientation has been established by the preceding command. In this case, since the orientation has already been established, the record to be searched should preferably be limited to the succeeding one only as in the case of the actual CKD disk, differing from the case where the command is chained from the SET SECTOR command. When no record is found at the rear side of the record for which the orientation has been established, the check proceeds to the next track provided that the multi-track bit is set, while return is made to the start of the same track unless the multi-track bit is set, whereon the comparison is performed. In case the comparison process proceeds to the rearmost end of the track once again in the same CCW chain, the message of "No Record Found" is issued.

(c) In the case where the command is chained from other command or when leading the command chain:

Search operation is performed for the record found first at the current track in the case of the actual CKD disk. However, in the subsystem now under consideration, the search is always performed sequentially from the filed R0. In other respects, search operation is substantially same as in the case of the search performed when the command under consideration is chained from the SET SECTOR command.

Unless the staging is not completed-due to the mishit or when the succeeding track is mishit because of the multi-track bit being set, the staging is completed in response to this command.

Further, for the recognition of the current track in the case where no SEEK command is issued in precedence, the last accessed track for the volume must always be memorized.

3. READ DATA Command

<Function>

The information of the data field read out from the disk is transferred to the channel.

<Realization>

(a) When chained from READ, WRITE or SEARCH command or from SPACE COUNT command, the information of the first data field succeeding to the field for which orientation has been established in the frame is transferred to the channel to maintain the orientation.

Unless the data field exists in succession to the field where the orientation has been established, data field of R1 (succeeding to R0) of the next track is transferred provided that the multi-track bit is set. Unless the multi-track bit is set, the data field of R1 of the same track is transferred without effecting head switch. Transfer of the data field of R0 is performed only when the command is chained from the SEARCH command which has satisfied the comparison with the R0 field or from the SPACE COUNT command which bypassed R0C.)

(b) When this command is chained from other command(s) or leading the chain, it is indeterminate which of the records is to be detected even in the actual CKD disk because of the state in which no orientation has been established yet. Accordingly, there arises no problem in the transfer of information of the data field of R1 (command succeeding to R0) so far as R1 exists. After the transfer, orientation is established.

When R1 is absent and when the multi-track is set, the data field of R1 of the next track is transferred (this corresponds to the transfer performed in response to detection of index without finding out the address mark). Unless the multi-track bit is set, the message of "No Record Found" is issued.

It goes without saying that unless the next track exists on the cache memory, the data transfer to the channel is performed after the staging.

In case no SEEK command is issued in precedence in the sam CCW chain, a command "RD DATA" is executed for the track accessed last in the same volume.

4. WRITE COUNT KEY AND DATA Command

<Function>

Information received from the channel is written on the disk as Rn fields (excluding R0 field).

<Realization>

Since this command is rejected when it is changed from the other commands than the SEARCH ID EQ command (which may be followed by RD D, RD KD or WR KD0 for which coincidence in CCHHR has been found or SEARCH KEY EQ command (which may be followed by RD D or WRD for which coincidence in all the keys has been established) or WR R0 command or WR CKD command. Thus, when this WRITE COUNT KEY AND DATA command is executed, this means that orientation has already been established without exception. Accordingly, upon reception of information from the channel, operations mentioned below are immediately executed (refer to FIG. 5).

(1) Reception of the count field

CCHHRKLDL of Rn is received from the channel and added with other information of the count field of $R_{n-1}0$. No writing is performed on the cache memory.

As the other information of the count field of R0, there may be mentioned SC (skip control), SN (segment number), PA (physical address), F (flag), etc. The SC is set to a predetermined value in the subsystem now under consideration, since the skip control is not supported. However, the area for this SC should be secured for possible use in the future).

The SN is also set to a value computed on the basis of the value of SC in the preceding record. (The method of computation to this end has been described hereinbefore in conjunction with the analysis in the method of checking the track capacity by using the segment number.) At the same time, the sector value is also determined on the basis of the SC value and written in the record pointer in the control frame, as will hereinafter be described in "(3) Addition of record pointer".

PA and F may be of a same value as that of HA.

(2) Check of track overrun

Occurrence of the track overrun is checked on the basis of KL, DL and the segment number received from the channel. (The check method to this end has already been described in detail in conjunction with the method of checking the track capacity by using the segment number.)

When track overrun takes place, the data transfer is performed up to the point where the track overrun occurs, whereupon occurrence of the track overrun is messaged to the host system.

(3) Addition of record pointer

Upon completion of the track overrun check, the memory address indicating the start of the control frame in the control frame pointer (held by the CPS) for the frame to which orientation is currently established is subtracted by four bytes (i.e., the control frame is extended by four bytes), and at the same time the record pointer of the Rn is added to the start of the control frame (held by the CPS).

In case the control frame intrudes the record frame as the result of the subtraction of four bytes, addition of record to that frame is given up, and the record pointer is added to the control frame of the succeeding frame. An area for the succeeding frame is secured by the manager, when it is necessary.

(4) Check of frame boundary

The rearmost memory addresses of the individual field of Rn are calculated from KL and DL received from the channel and compared with the memory address in the control frame pointer updated through the operation (3) described above. When it is found that the last memory address of any one of the fields of Rn intrudes the control frame, the data transfer with the host system is once interrupted before the control frame, and the memory address is then advanced to the start of the succeeding frame, whereupon the data transfer with the host system is restarted. This process is controlled by the CPS.

So far as the last memory address of Rn field is contained within the record frame, the control mentioned above is unnecessary. The transfer of data of Rn can be performed without interruption.

(5) Write of count field onto cache memory

When a series of checks mentioned in the foregoing have been completed, data of the count field held in the CPS is transferred to th cache memory to be written at the relevant address thereof. In case a frame boundary is found in the count field, the data writing to the cache memory is stopped once, and the memory address is advanced or incremented to the start of the succeeding frame, whereupon the memory write operation is restarted.

(6) Reception of key field and data field

When it is found as the result of the frame boundary check (4) that the rearmost end of Rn is resident with in the record frame, data of the key field is received from the channel and written onto the cache memory. Then, after lapse of a time corresponding to the gap data of the data field is received from the channel to be written onto the cache memory.

On the other hand, when the frame boundary check (4) shows that a frame boundary is encountered in the course of data transfer, the latter is once interrupted. So long as the frame for which orientation is currently established is not the last frame, the CPS knows the address of the succeeding frame on the cache memory. Accordingly, the memory address for the data transfer is advanced or incremented up to the start address of the succeeding frame, whereupon the data transfer with the channel and the data write onto the cache memory are restarted. On the other hand, when the frame for which orientation is currently established is the last frame, this means that areas for the succeeding frames are not secured on the cache memory. Accordingly, the CPS issues to the manager a request for securing the memory area for the succeeding frame. After having received the address of the memory area as secured from the manager, the CPS restarts the data transfer. (At this juncture, it should be mentioned that the processing for securing the memory area for new frame mentioned above may be executed in the timing set in consideration of the gaps during a period for which the data transfer is interrupted.)

For the frame undergone the data transfer processing, an updated flag is set to the relevant FBA block in the control frame.

(7) Message of CE (Channel End)

At this stage, the CPS messages to the channel a channel end (CE) indicating completion of the data transfer with the channel for the purpose of confirming the presence or absence of the chaining command.

In the case of absence of the chaining command, following operations are performed.

(8) Destage request from CPS to manager

In the case of absence of chaining command, the CPS pads a remaining portion of the rearmost frame of Rn field with bytes of zero, and sets an updated flag to the FBA block which corresponds to the portion padded with zero. Subsequently, the control frame of the updated frame is written onto the cache memory. Thereafter, the CPS issues a destage request to the DPS (Disk Path Server) via the manager.

When an intrinsically last frame exists in succession to the frame written at the rearmost end of Rn, the CPS informs the manager of the fact that the frame(s) succeeding to the rearmost frame of Rn are invalidated. In that case, if the last frame is located before the frame written at the rearmost end of Rn (when the former is same as the latter), no message of invalidity of the succeeding frame is issued, because the succeeding frame is intrinsically absent or invalid.

(9) Destage request from manager to DPS

In response to reception of the message of the presence of invalidated frame, the manager erases the invalid frame of the relevant track on the cache memory (while correcting the managing information for maintenance) and issues to the DPS a command for destaging the relevant track.

In that case, the-manager informs the DPS of the address of a frame having valid data on the cache memory as an address at which data is to be written onto a physical disk. When an invalid frame is newly generated, the manager prepares data to be written in the invalid frame at one appropriate location, and informs the address of that location to the DPS. (Thus, with the invalid frame, the data prepared for the invalid frame on the cache memory is written onto the physical disk. The data for the invalid frame may be prepared on the cache memory by the manager or alternatively provided in each DPS.)

Unless invalid frame is newly generated, no command is issued to the DPS for rewriting the frame which is originally invalid.

(10) Destaging

In response to the command from the manager, the DPS writes the data on the cache memory to the physical disk. More specifically, the DPS performs this write operation for the FBA block for which the update flag of the frame indicated by the manager is set.

(11) Message of completion of destaging

Upon completion of write operation to the physical disk, the DPS issues a message of completion of the destaging to the CPS via the manager.

(12) Message of DE (Device End)

The CPS issues a message of device end or DE indicating completion of all the processings.

In the case of the presence of the chaining command, following operations are performed.

(8)' When presence of the chaining command is indicated, the CPS issues the message of DE and receives a succeeding command.

(9)' When the succeeding command is "WR CKD" or "ERASE", the corresponding processing is carried out.

In case the succeeding command is other than the above-mentioned command, the CPS issues CE-, UCK- and SM-messages while requesting a command retry.

(10)' Subsequently, the operations or processings (8) to (11) described previously are executed.

(11)' When the end of write operation to the physical disk is messaged from the DPS, the CPS issues the DE-message and receives a command which the CPS requested with the command retry, to execute the received command.

5. WRITE DATA Command

<Function>

On the basis of information received from the channel, the data field of record is updated.

<Realization>

Since this command is rejected unless it is chained from the SEARCH ID EQ command for which coincidence in CCHHR have been verified or the SEARCH KEY EQ command for which coincidence has been found in all the keys, orientation has already been established without exception when this command WRITE DATA is executed. Accordingly, upon reception of information from the channel, operations described below are immediately executed.

(1) Check of frame boundary

The rearmost memory address of Rn is arithmetically determined on the basis of KL and DL of the count field of the record in which data is to be written and then compared with the memory address in the control frame pointer of the frame for which orientation is currently established. In case the rearmost memory address of Rn intrudes the control frame, the data transfer with the host system is once interrupted in precedence to the control frame and the memory address is advanced or incremented to the start of the succeeding frame, whereupon the data transfer with the host system is restarted (under the control of the CPS).

So far as the rearmost or last memory address is accommodated within the record frame, the control mentioned above is of course unnecessary. The Rn data transfer can be executed without interruption.

(2) Reception of data field

When it is found as the result of the abovementioned frame boundary check (1) that the last memory address of Rn lies within the record frame, data of the data field is received from the channel and written in the cache memory.

In case the frame boundary check (1) shows that a frame boundary is encountered on the way, the data transfer is interrupted. Since there necessarily exists a succeeding frame in the update write operation, the CPS increments the memory address for data transfer up to the start of the succeeding frame and then restarts the data transfer with the channel and the cache write operation.

For the frame which has undergone the data transfer, an update flag is set for the corresponding FBA block in the relevant control frame.

(3) Message of CE (Channel End)

At this stage, the CPS messages to the channel a channel end (CE) indicating completion of the data transfer with the channel for the purpose of confirming the presence or absence of the chaining command.

In the case of absence of the chaining command, the following operations are performed.

(4) Destaging request from CPS to manager

When no chaining command is present, the CPS issues a destaging request to the DPS via the manager.

In the case of the update write operation, no invalid frame can newly be generated.

(5) Destaging request from manager to DPS

The manager informs the DPS of the address of the frame for which valid data exists on the cache memory as the address of the data to be written onto the physical disk and commands the destaging.

(6) Destaging

In response to the destaging command form the manager, the DPS writes the data on the cache memory onto the physical disk. In the frame designated by the manager, the DPS rewrites only the FBA block affixed with the update flag.

(7) Message of completion of destaging

Upon completion of data write operation to the physical disk, the DPS issues a corresponding completion message to the CPS via the manager.

(8) Message of DE (Device End)

The CPS issues to the channel a device end (DE) message indicating completion of all the processings.

In case the chaining command exists, the following operations are performed.

(4)' When the command chaining is commanded, the CPS issues a DE message to make preparation for receiving a succeeding command (5)' In case the succeeding command is for SEARCH operation or for format write operation, the commanded processing is performed.

When other command than "SEARCH" or "WRITE" command is issued in the same command chain, the CPS issues a command retry request with CE, UCK or SM.

(6)' Subsequently, the operations or processings (4) to (7) described previously are executed.

(7)' In response to the message of completion of the write operation to the physical disk form the DPS, the CPS issues the DE message and receives newly a command which the CPS requested with the command retry request, to execute that command.

As will now be understood from the foregoing description, according to the illustrated embodiment of the present invention, all the gaps inclusive of the inter-record gaps, the inter-field gaps, etc., are deleted from one track of a variable length record format, and the data of that track is divided into units for management (or management units) each having a size corresponding to an integral multiple of a fixed block size or length of a fixed length record format, wherein the control information indicating the positions of all the variable length records contained in each management unit is written in that management unit in the sequential order from the rearmost end thereof, which management unit is then divided into fixed length records each of a fixed block size, and the information indicating the relative positions of the records from the start of the track in the variable length record format is held in each of the fixed length records. By virtue of this arrangement, the number of times the memory access is required for verification of the position of variable length record of concern (or aimed record) in the fixed block can be diminished with the load imposed on the memory being correspondingly reduced, to an advantageous effect. Besides, because all the gaps are deleted, the memory capacity for holding the track data can significantly be decreased, to another advantage. Thus, the embodiment of the invention described above can find profitable application to a disk subsystem structured on the basis of a disk cache with the cache hit ratio being increased. Furthermore, because the size of control information storing area is variable and because it is sufficient to provide the control information areas in a number corresponding to that of the variable length records, the memory capacity as required can be decreased.

EMBODIMENT 2

In the case of the first embodiment, the length of the control frame provided at the rearmost side of the management unit is made variable, as shown in FIG. 25. However, the control frame or the position information area can be provided at the start of each management unit, as shown in FIG. 24. In this case, however, when one management unit is composed of 12 KB, shortage in the capacity will occur because the position information area which can accommodate 94 records must previously be set. Accordingly, it is necessary to compose one management unit of 13 KB. As a consequence, the control frame is so determined as to have a fixed size which is capable of containing 94 records each of 4 bytes. With this control frame structure of the fixed size having the record frame or position information area also of a fixed size, the access method to the management unit can be simplified.

EMBODIMENT 3

In the case of the first embodiment, the sector value is used as the relative position information from the forefront of the track in the variable length format. This is because the use of the sector value is desirable in view of the fact that the relative position information used in the set sector command (SET SECTOR command) is the sector value. In case the set sector command uses the other relative position information or parameter such as a segment value counted from the forefront of the track in the variable length format, the relative position may be represented by the segment value instead of the sector value. In other words, the sector value of the record pointer shown in FIG. 25 may be replaced by the segment value substantially to the same effect.

EMBODIMENT 4

In the case of the embodiment 1, the CKD records are allocated with the respective segment values for allowing the track capacity to be calculated. However, the track capacity may be managed on a sector basis instead of the segment basis. In that case, each of the CKD records is allocated with a sector value in place of the segment value.

EMBODIMENT 5

In the embodiment 1, the record pointer in the control frame is assigned with the sector value, while the segment value is allocated to each of the CKD records within the record frame. However, since the sector value and the segment value bear a predetermined relationship to each other (i.e., sector value$\times 7$=segment value), either one of the sector value or the segment value can be employed. In other words, when the sector value is assigned to the record pointer, it is unnecessary to store the segment value in association with each of the CKD records. In that case, the consumed track capacity can be determined only on the sector basis.

On the other hand, when the segment value is imparted to each of the CKD records within the record frame without imparting the sector value to the record pointer, the consumed track capacity can be determined on the basis of the segment values. In that case, however, when the sector value is designated by the sector command, the sector of concern can be identified only by searching the CKD record on the basis of the memory address of the record pointer and then calculating the sector value from the segment value contained in the searched CKD record, because the record pointer has no sector value.

EMBODIMENT 6

Although not described clearly in conjunction with the first embodiment, the FBA disk 9 may be constituted by a single disk or an array-type disk system. It should further be added that the FBA disk 9 may be a magnetic disk or an optical disk or other media capable of recording data.

EMBODIMENT 7

Figure 32:
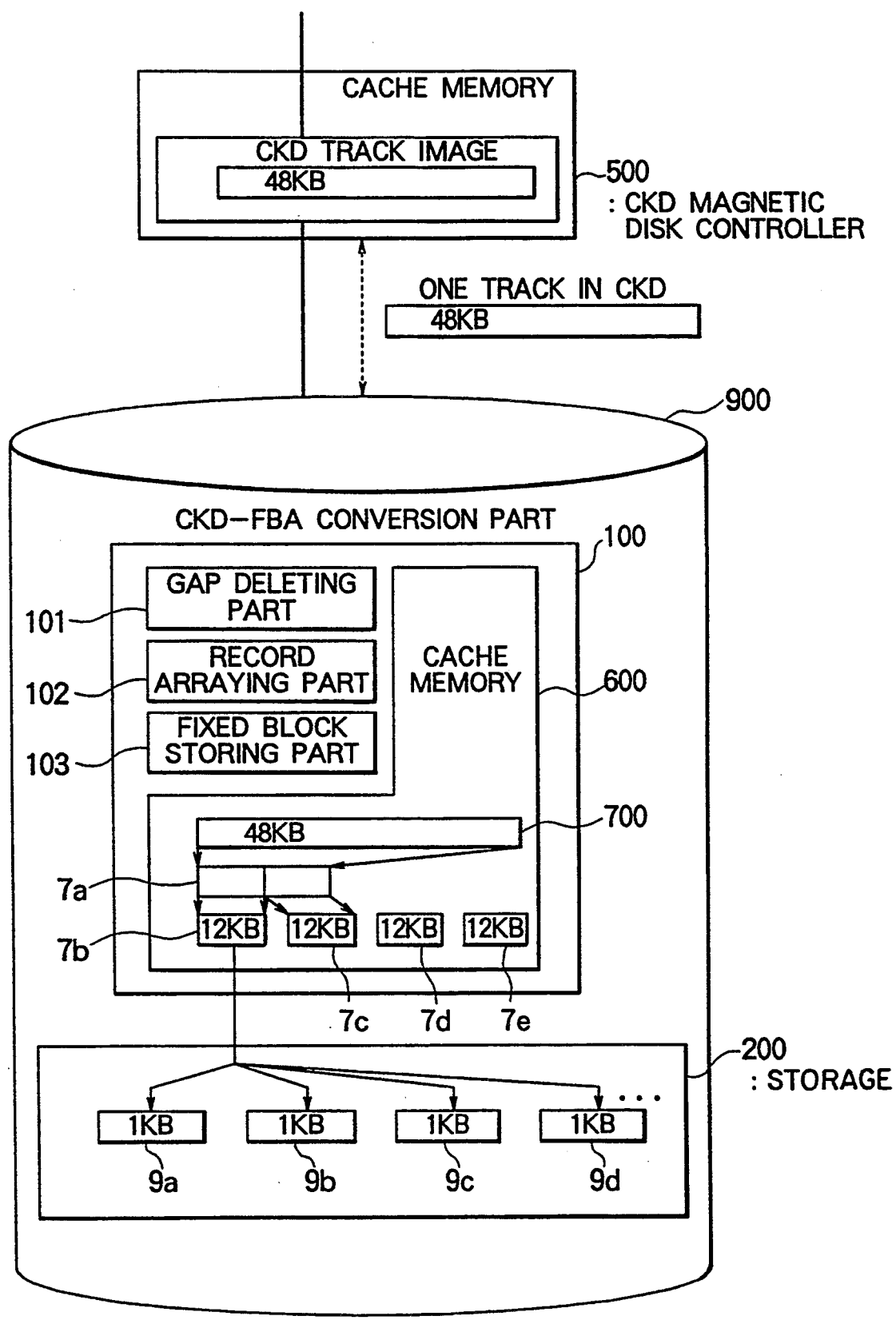
FIG. 32 is a view showing another embodiment of the present invention.

In the conjunction with the first embodiment, it has been described that the CKD-to-FBA format conversion system is incorporated in the magnetic disk controller 5. It should however be understood that the CKD-to-FBA format conversion is never limited to the magnetic disk controller but may be carried out by the channel system of the host computer 1. Alternatively, this format conversion can be realized by or on a storage unit itself such as a magnetic disk system or the like. FIG. 32 is a view showing a CKD-to-FBA conversion executed by the storage unit itself such as the magnetic disk system according to the instant embodiment of the present invention. As shown in this figure, a CKD magnetic disk controller 200 includes a cache memory which stores variable length records. A CKD-to-FBA conversion unit 100 provided in association with a FBA disk 900 serves for storing the variable length records in a FBA disk 900 having fixed length blocks through the CKD-to-FBA format conversion.

A gap deleting unit 101 reads out the variable length records from the cache memory of the magnetic disk controller to write them in a cache memory 600. In that case, all the records of one track in the cache memory 1 of the magnetic disk controller 500 is read into the cache memory 600. From the variable length records of one track, all the inter-record gaps and the inter-field gaps are deleted. A track image of the CKD format read into the cache memory 600 is thus converted to track data 7a from which all the gaps mentioned above have been deleted or eliminated.

Subsequently, a record arraying unit 102 arrays the track data 7a in units for management (or management units which are also referred to as frames) 7b, 7c, 7d and 7e in a sequential order. Each of the management units 7b to 7e referred to as the frames is each of a size, for example, of 12 KB, assuming that the CKD track image 7 is of 48 KB in size (because 48 KB÷4=12 KB). The variable length records of the track data 7a are arrayed sequentially in the frames 7b to 7e, starting from the frame 7b, by the record arraying unit 104. In that case, the address information indicating the positions of the variable length records contained in each frames is also stored in the frame. Additionally, the sector information indicating the relative position (sector value) of the records from the forefront of the track in the CKD disk 10 is stored as well.

A fixed block storage unit 103 stores the frames in a storage 200 of the FBA disk system 900. Assuming that the size of the fixed length block of the FBA disk 9 is 1 KB, one frame can contain therein 12 fixed length blocks because each of the frames 7b, 7c, 7d and 7e is 12 KB in size.

In this manner, data of one track outputted from the CKD-type magnetic disk control apparatus are stored in the FBA-type storage unit. Data reading from the storage 200 of the FBA disk system 100 may be carried out through the operations mentioned above but in the reversed sequence.

As will be understood from the foregoing description, according to the present invention, the capacity of the memory for holding the track data can significantly be reduced owing to deletion of the inter-record and inter-field gaps. Besides, the number of times the memory access in to be performed for detecting the position of a CKD record of concern can remarkably be decreased owing to the availability of the corresponding position information.

Many features and advantages of the present invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

I claim:

1. A data storage format conversion system for converting a track of records of a variable length CKD format into records of a fixed length FBA format for storage thereof, each CKD record having inter-field gaps between fields of the record and inter-record gaps at each end of each record, said system comprising:

gap deleting means for deleting said inter-record gaps and said inter-field gaps from said CKD records of said track so as to generate track data;

record arraying means for arraying the track data in a unit for management of a predetermined size, the record arraying means including means for storing in said unit for management first position information indicating the positions of all the CKD records included in said unit for management and for storing in said unit for management second position information indicating relative positions of the CKD records included in said unit for management, the relative positions being relative to the start of said track; and fixed block storage means for storing said unit for management after dividing it into fixed length record blocks each having a predetermined fixed block size corresponding to the fixed length FBA format.

2. The data storage format conversion system according to claim 1, wherein said record arraying means arrays the track data such that the track data is recorded sequentially from one end of said unit for management and wherein said means for storing said first and second position information stores the first and second position information sequentially from the other end of said unit for management.

3. The data storage format conversion system according to claim 1, wherein said record arraying means stores said first and second position information in a first area and stores said CKD records in a second area within said unit for management.

4. The data storage format conversion system according to claim 1, wherein said first position information is represented by memory addresses of said CKD records within said unit for management, while said second position information is represented by sector values as counted from the start of said track.

5. The data storage format conversion system according to claim 1, wherein said CKD record includes segment information indicating relative position from the start of the track in the variable length record CKD format.

6. An apparatus for controlling access to a storage according to an access instruction corresponding to a variable length format, wherein said storage operates according to a fixed length format with fixed length record blocks, wherein variable length records that have gaps deleted therefrom are arrayed as a management unit which is stored on said storage as a plurality of fixed length record blocks, wherein said management unit includes address information indicating the positions of the variable length records included in said management unit and wherein the management unit also includes relative position information indicating relative positions of the variable length records included in said management unit, the relative position being relative from the start of a corresponding track of said variable length records, said apparatus comprising:

read/write means for reading data from and/or writing into said storage on a management-unit basis;

a memory for storing the data read from and/or written by said read/write means;

input means for receiving said access instruction;

position calculating means for estimating a position of said storage which is substantially likely to hold the fixed length record blocks having the management unit having the variable length record corresponding to said access instruction; and record searching means for reading from said storage the management unit located at the position estimated by said position calculating means, said management unit being read into said memory through said read/write means, wherein said record searching means includes means for detecting in said memory the variable length record of the access instruction.

7. The apparatus according to claim 6, further comprising means for determining a capacity consumption of the corresponding track of said variable length records said consumption determined on the basis of said relative position information.

8. The apparatus according to claim 6, wherein said input means receives relative position information of a variable length record to be accessed, and wherein said record searching means includes:

management unit searching means for comparing the received relative position information with the relative position information of the management unit being searched by the record searching means, and wherein the management unit searching means includes means for sequentially reading management units through said read/write means until the comparison is successful as detected by the means for detecting the variable length record; and wherein said record searching means further includes record specifying means responsive to the management unit searching means for detecting said management unit so as to specify the variable length record corresponding to the access instruction.

9. A data storage format conversion method, comprising the steps of:

(a) deleting inter-record gaps and inter-field gaps from a variable length record having data fields, the inter-record gaps and the inter-field gaps, so as to interconnect the fields of the variable length record to one another;

(b) arraying the variable length record interconnected in step (a) in a sequential order within a frame having a predetermined size and storing within said frame access information for making access to all of the variable length records stored in said frame; and (c) storing said frame as a plurality of blocks each of a fixed length for storing the same in a fixed length format.

10. The data storage format conversion method according to claim 9, wherein step (b) stores position information of the frame in which the variable length records are arrayed and stores position information of the variable length records as said access information.

11. A data access method for accessing data of a variable length format stored in a fixed length format, comprising the steps of:

(a) receiving a command for making access to a record of a variable length format;

(b) estimating position information of a frame in which the record of variable length format is likely stored, the estimating performed from the basis of search information of the command received in step (a); and (c) regenerating from a plurality of fixed length blocks stored in the fixed length format frames succeeding to the frame corresponding to the estimated position information so as to search the frames for the record to be accessed.

12. A data storage system for emulating a variable length record format in which CKD records have gaps between record fields and gaps at each end of each record, said system comprising:

a fixed block storage having record blocks of a fixed length;

means for deleting the gaps between the record fields and the gaps at the end of each record so as to generate track data; and means for arraying the track data into a frame having a size that is a plurality of the fixed length, wherein the means for arraying includes means for storing the track data sequentially from a first end of the frame and wherein the means for arraying includes means for storing first and second position information sequentially from a second end of the frame, said first position information being an address and said second information being a sector value.

13. A data storage system for emulating a variable length record format in which CKD records have gaps between record fields and gaps at each end of each record, said system comprising:

a fixed block storage having record blocks of a fixed length;

a memory;

means for accessing said storage on a management-unit basis, a management unit being of a size that is a plurality of the fixed lengths;

means for receiving an access instruction to access a record of the variable length record format;

means for estimating a position of said storage that is substantially likely to hold data corresponding to said access instruction, means for searching responsive to said means for estimating, wherein said means for searching includes means for instructing the means for accessing to read into said memory a first management unit from said storage at the position estimated by the means for estimating, and wherein said means for searching includes means for the detecting whether the data corresponding to the access instruction is present within the management unit read into the memory, and wherein the means for searching includes means for initiating a new read of a management unit if the means for detecting indicates that the record is not present.

* * * * *